United States Patent [19]

Kaburagi et al.

[11] Patent Number: 5,434,602
[45] Date of Patent: Jul. 18, 1995

[54] RECORDING APPARATUS WITH MAGNETIC LINEAR ENCODER

[75] Inventors: Yoshiaki Kaburagi; Shigemitsu Tasaki, both of Kawasaki; Shigeo Takenaka, Kamakura; Makoto Kashimura, Yokohama; Nobuaki Iwakami, Machida; Shinya Matsui, Tokyo; Masafumi Wataya, Kawasaki; Toshiyuki Onishi, Yokohama; Yasuhiro Unosawa, Tokyo; Hajime Yoshida, Yokohama; Yuichi Hirai, Kawasaki, all of Japan

[73] Assignee: Canon Kabushiki Kaisha, Tokyo, Japan

[21] Appl. No.: 50,569

[22] Filed: Apr. 21, 1993

[30] Foreign Application Priority Data

Apr. 23, 1992 [JP] Japan .................................. 4-129954
May 20, 1992 [JP] Japan .................................. 4-152806
Jun. 11, 1992 [JP] Japan .................................. 4-176032
Aug. 31, 1992 [JP] Japan .................................. 4-255955

[51] Int. Cl.⁶ ............................................ G01D 15/24
[52] U.S. Cl. .................................. 346/139 R; 318/653; 341/15; 347/37; 400/322
[58] Field of Search .................... 346/139 R; 400/705, 400/705.1, 322; 318/653, 647; 341/15; 347/37

[56] References Cited

U.S. PATENT DOCUMENTS

| | | | |
|---|---|---|---|
| 3,768,094 | 10/1973 | Henrich | 344/15 |
| 5,075,609 | 12/1991 | Ito | 346/140 X |
| 5,297,881 | 3/1994 | Ishiyama | 400/322 X |

FOREIGN PATENT DOCUMENTS 62-057929 12/1987 Japan .......................... G01D 5/245

*Primary Examiner*—Joseph W. Hartary
*Attorney, Agent, or Firm*—Fitzpatrick, Cella, Harper & Scinto

[57] ABSTRACT

A recording apparatus, which is provided with a carriage supporting a recording head or reciprocating along a platen, includes a magnetized scale of a magnetic linear encoder positioned along a moving direction of the carriage, and a magnetic head of the magnetic linear encoder, mounted on the carriage and adapted for reading the magnetized pattern of the scale. The scale is provided with at least two magnetized lines of mutually different pitches of magnetization, for recording position information relating to the recording operation, and position information relating to other functions.

18 Claims, 53 Drawing Sheets

| CODE | MODULE | CODE | MODULE |
|------|--------|------|--------|
| 0 | 0 0 1 1 0 | 5 | 1 0 1 0 0 |
| 1 | 1 0 0 0 1 | 6 | 0 1 1 0 0 |
| 2 | 0 1 0 0 1 | 7 | 0 0 0 1 1 |
| 3 | 1 1 0 0 0 | 8 | 1 0 0 1 0 |
| 4 | 0 0 1 0 1 | 9 | 0 1 0 1 0 |

| FIG. 32A |
| FIG. 32B |

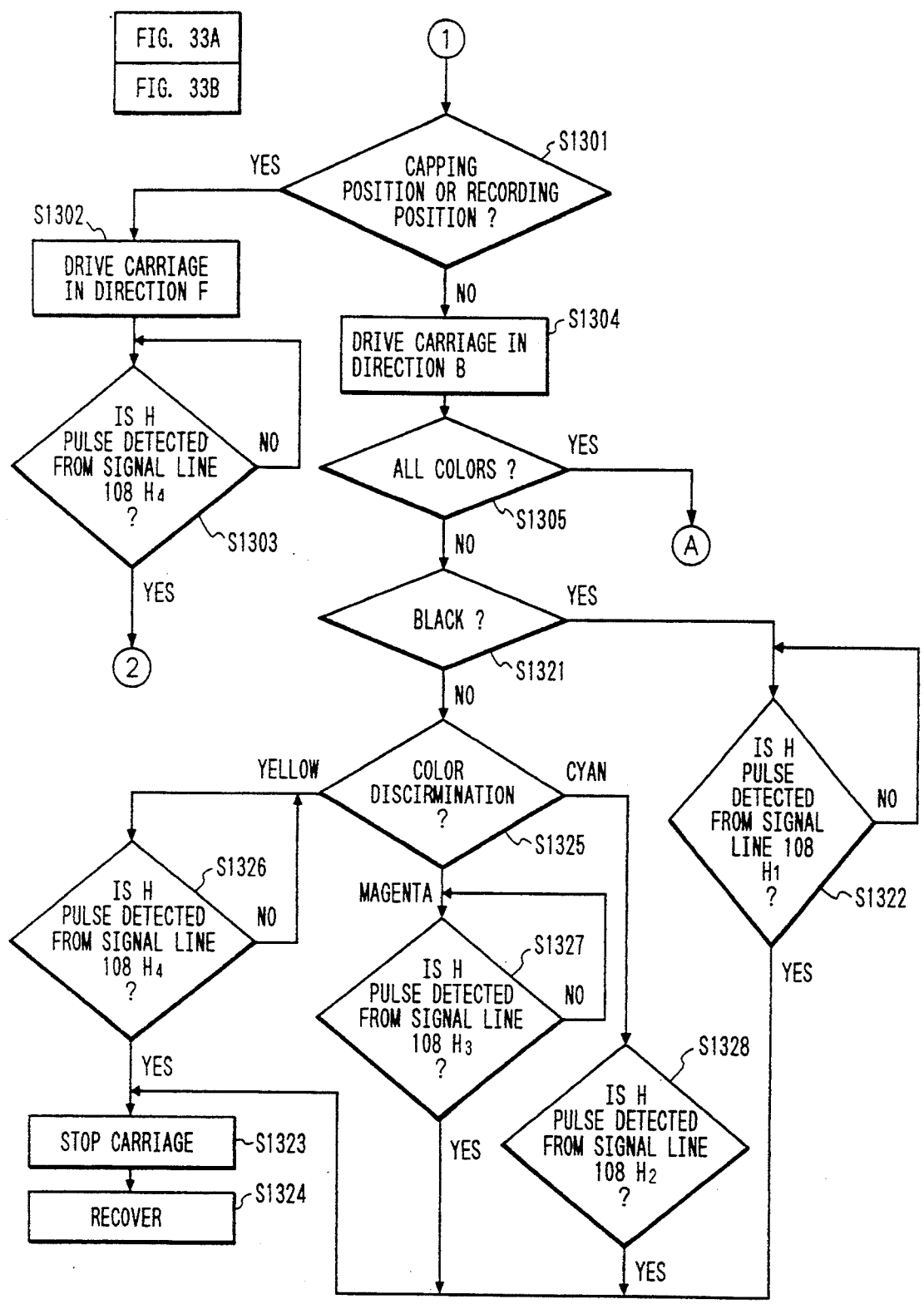

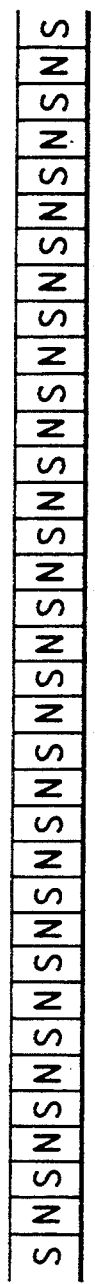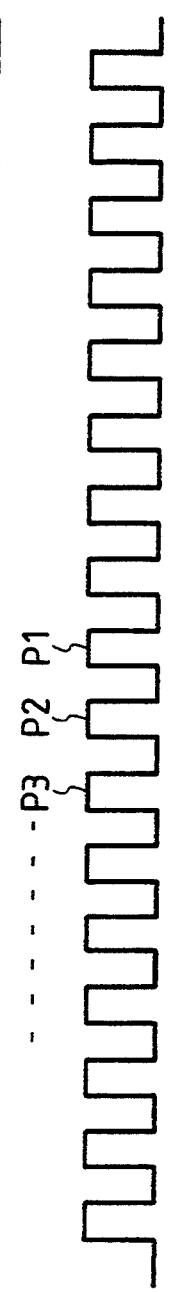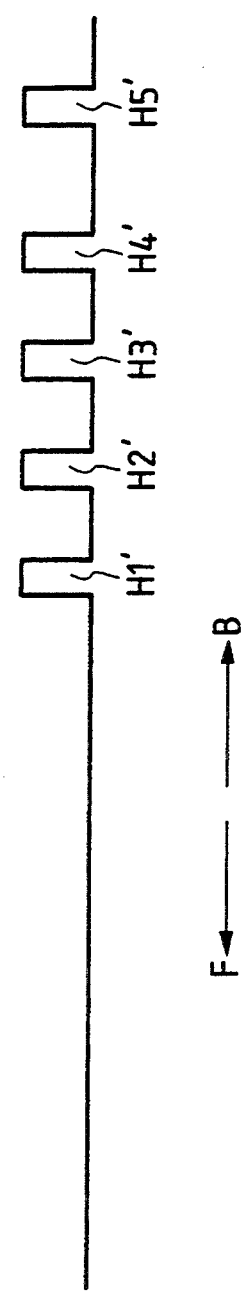
FIG. 35(a1)
FIG. 35(a2)
FIG. 35(b1)
FIG. 35(b2)
FIG. 35(c1)
FIG. 35(c2)

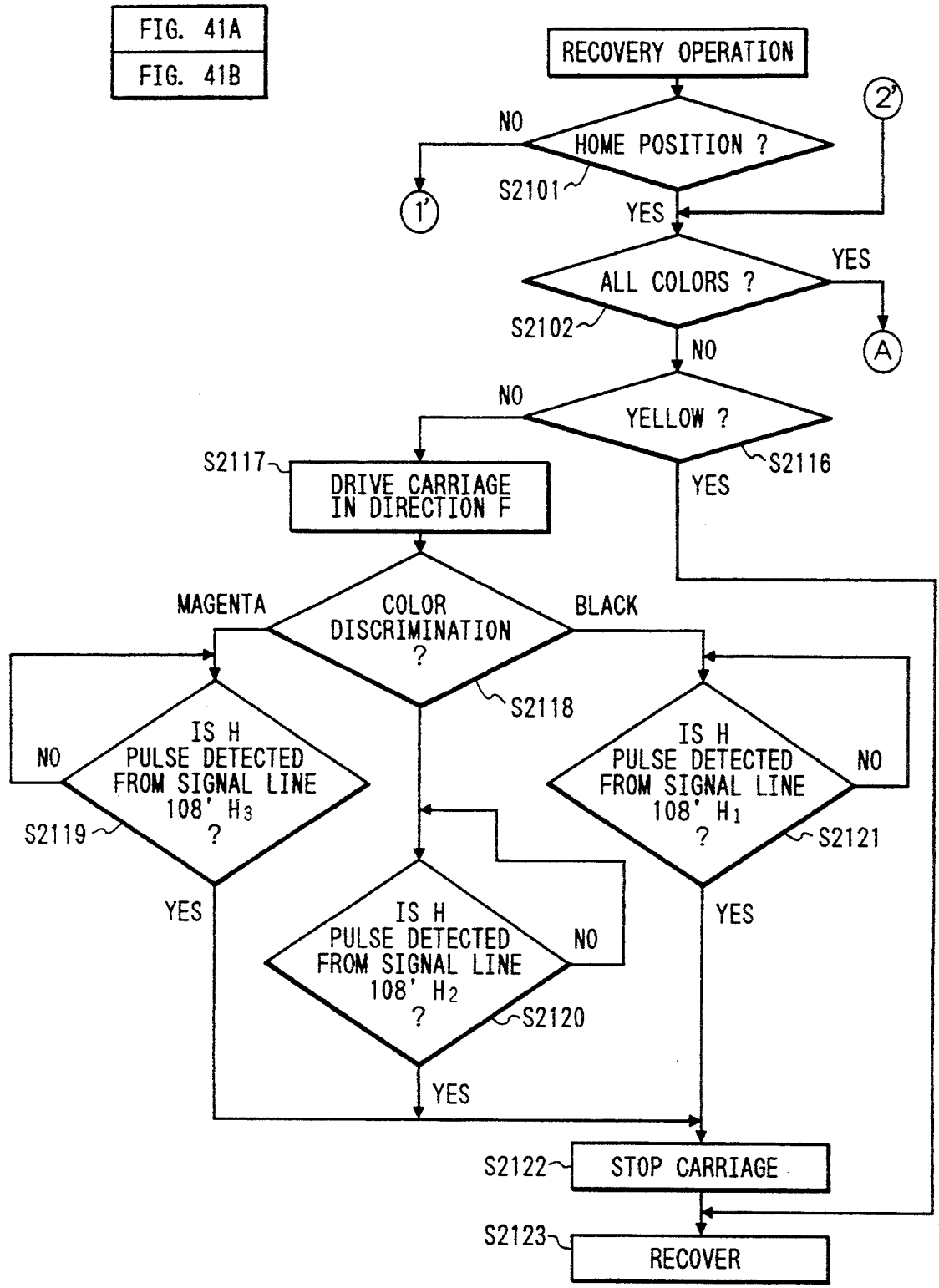

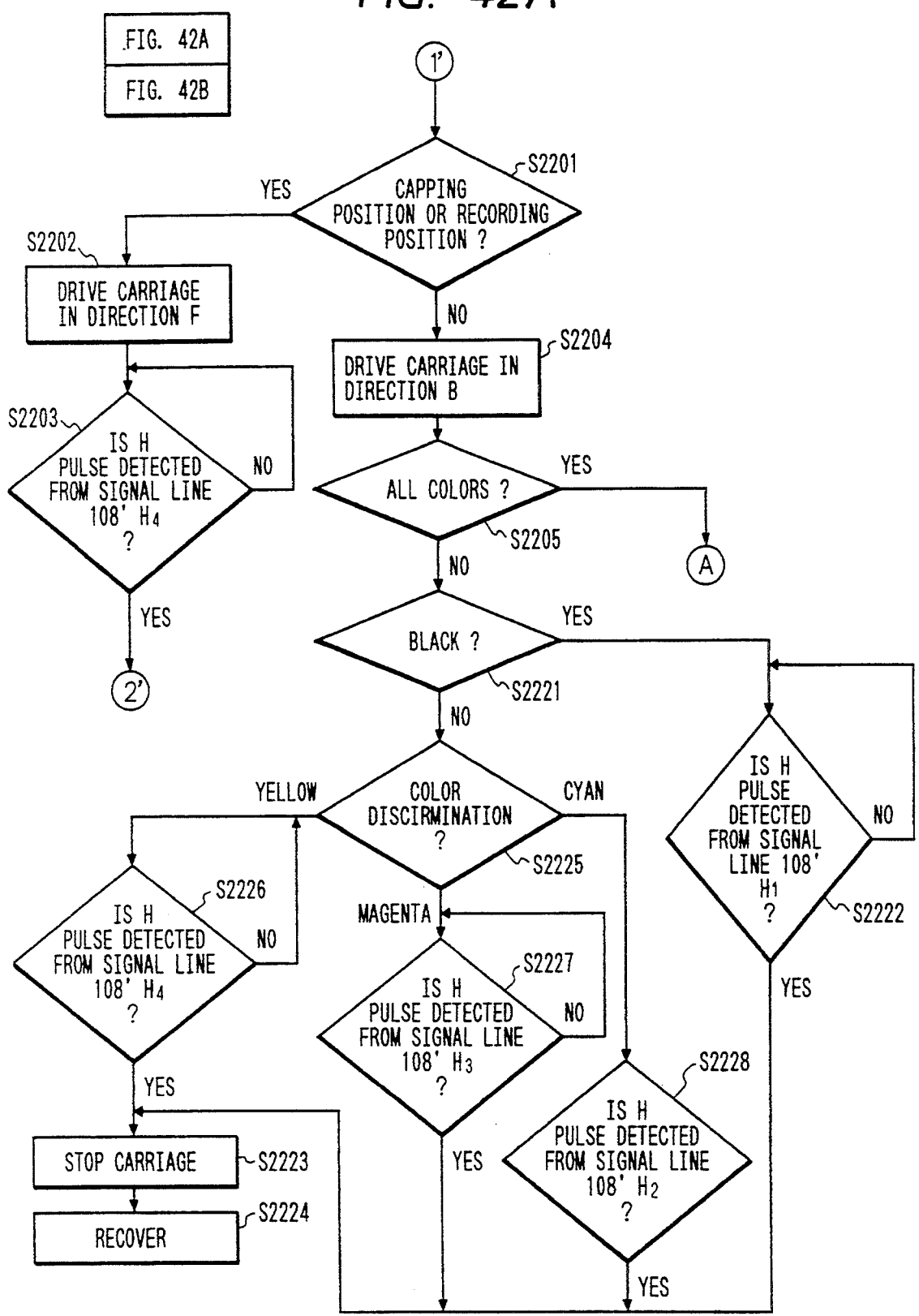

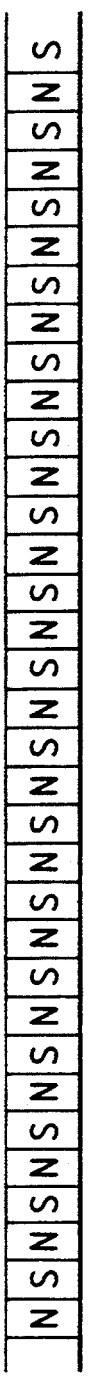
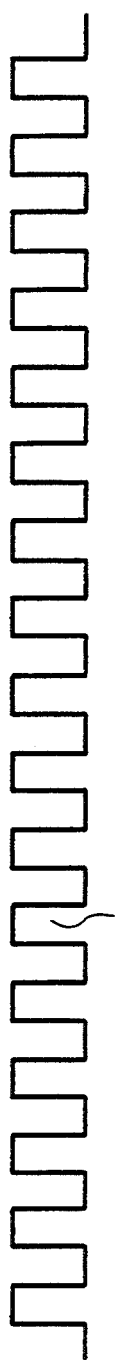
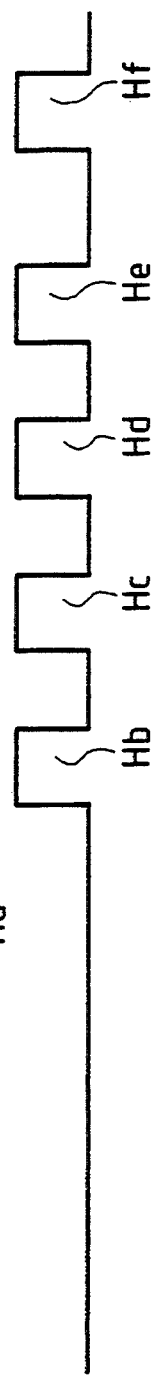
FIG. 44(a1)
FIG. 44(a2)
FIG. 44(c1)
FIG. 44(c2)

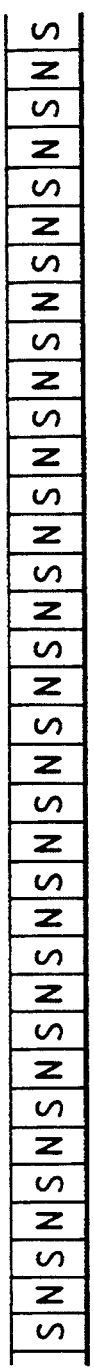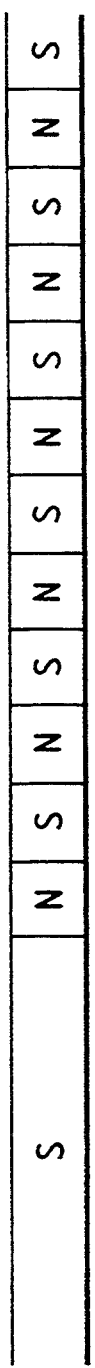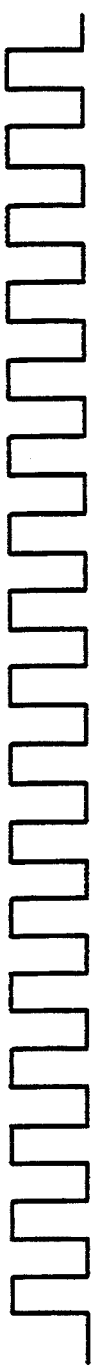
FIG. 45(a1)  FIG. 45(a2)  FIG. 45(c1)  FIG. 45(c2)

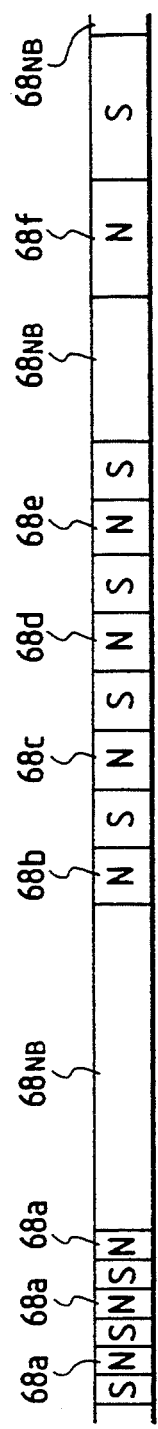
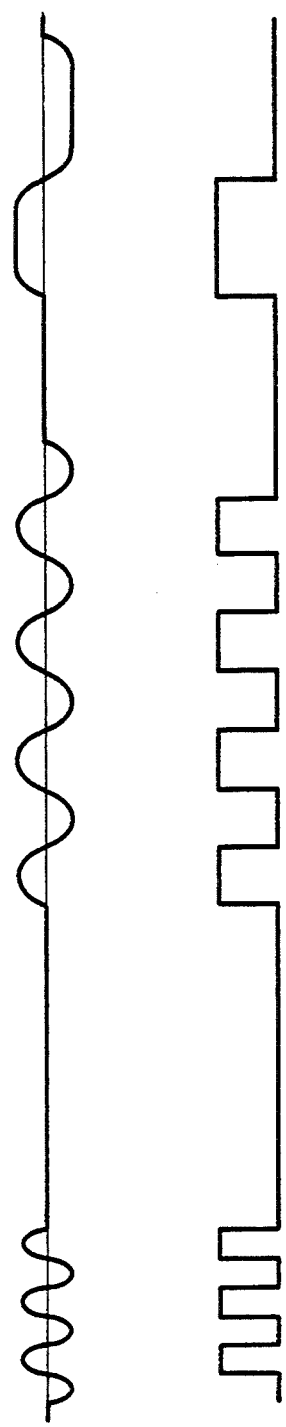
FIG. 46(a)
FIG. 46(b)
FIG. 46(c)

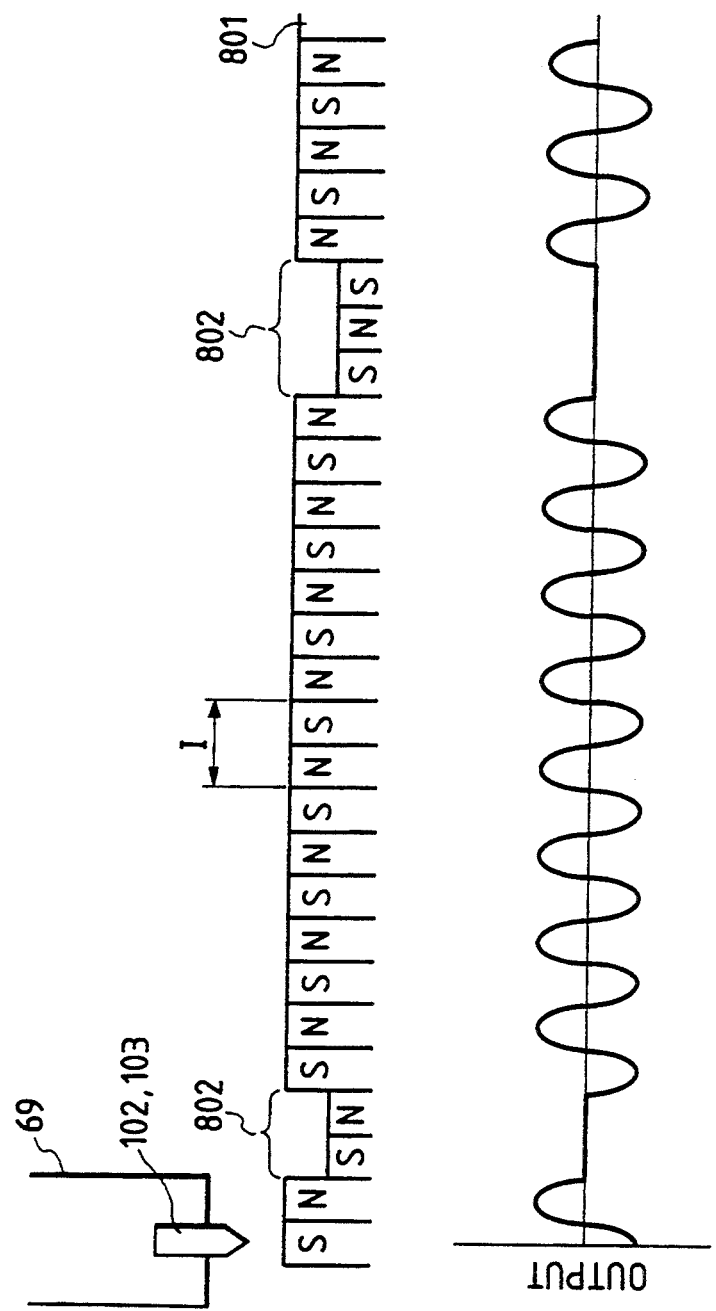

RECORDING APPARATUS WITH MAGNETIC LINEAR ENCODER

BACKGROUND OF THE INVENTION

Field of the Invention

The present invention relates to a recording apparatus employing a magnetic linear encoder, and more particularly to a serial recording apparatus provided with a magnetic linear encoder along the moving direction of the carriage.

Related Background Art

The serial recording apparatus effects recording (printing) operation by causing a carriage which supports a printing head constituting recording means to effect a lateral scanning motion to a recording medium or a recording sheet, and, in such apparatus, the density of the obtained record becomes uneven if the speed of the carriage fluctuates for some reasons. Particularly in the color printer, such fluctuation in the carriage speed is a problem because the registration of the colors is aberrated.

For avoiding these drawbacks, there is conventionally known a configuration of detecting the amount of movement of the carriage supporting the recording means with respect to the main body of the recording apparatus and effecting the recording operation by the recording means in synchronization with the movement of the carriage, based on the result of said detection. More specifically, the scale of the linear encoder is fixed on said main body while the detecting unit of the linear encoder is loaded on the carriage which moves relative to said scale, and the recording signal is generated in synchronization with the amplified output signal of said detecting unit, whereby the uneven print density and the aberration in color registration are avoided.

In such recording apparatus there has principally been employed the optical linear encoder in which translucent portions and opaque portions alternately formed on a film or a thin plate are detected by a photodiode or a phototransistor, but such optical linear encoder is very expensive when a high resolving power is looked for, and is susceptible to dusts, such as those from recording paper, inevitable in the recording apparatus. In fact, such optical linear encoder is practically unapplicable to the ink jet recording apparatus or the like of a resolving power in the order of 360 dot/inch.

For avoiding these drawbacks, the magnetic linear encoder, disclosed in the Japanese Patent Publication No. 62-57929, has reached the stage of practical application. The scale of said magnetic linear encoder has magnetic anisotropy in the vertical direction, and a predetermined portion of said scale is magnetized with a constant pitch and utilized for generating the carriage control signal, triggering the driving of the recording head or the position detection.

FIG. 1 is a schematic view of a recording apparatus employing the conventional magnetic linear encoder. A recording head 1, integrally containing an ink jet head and an ink tank, is preferably detachably mounted on the recording apparatus and is replaced by a new head when the ink in the ink tank is exhausted.

A carriage 2, supporting the recording head 1, is provided with a pin (not shown) engaging with a spiral groove of a lead screw 3 which is rotated, through a transmission mechanism (not shown), by the forward or reverse rotation of a carriage motor (not shown), and is reciprocated in the directions a, b by the rotation of said lead screw 3. The magnetized portion of a scale 11 is read by a magnetic head, provided with an MR (magnetic resistance) device (not shown in FIG. 1).

A transport roller 4 advances a recording sheet 5 in a direction c, intermittently at the recording operation. The magnetic head 12 is provided, for extracting the output signal of the MR device, with a flexible circuit board 13, which is connected to a circuit board 6 on the carriage 2, by connecting a contact portion 14 with a connector (not shown).

The magnetic head 12 is integrally constructed with a housing 12'.

Such conventional configuration has however been associated with the following drawbacks because the scale of the linear encoder is merely magnetized in continuous manner with a single pitch:

(1) As the position signal can be obtained only with a single pitch, there are required increased hardware such as frequency dividers and counters and increased burden on software in order to achieve two or more recording densities on the same recording apparatus;

(2) The cost of the linear encoder becomes high since a linear encoder cannot be used in the recording apparatus of different recording densities; and (3) An inexpensive recording apparatus with a high effective recording speed cannot be realized since a trigger signal for controlling the apparatus cannot be obtained at an arbitrary position, without an increase in the hardware such as timer and an increase in the burden of the software.

Also in the conventional linear encoder, the scale is often shaped as a rod with a circular cross section, and is longitudinally magnetized in a part of the external periphery thereof. Such scale involves considerable difficulty in the mounting on the main frame of the recording apparatus, as the magnetized portion of the scale has to be positioned in a certain direction opposed to the magnetic head.

Furthermore, in the above-mentioned conventional example, the magnetic linear encoder is magnetized with a constant pitch only, for the purpose of generating the position signal for recording, the administrative information such as the serial number of the apparatus has to be recorded on the package or the outer casing of the apparatus, and these facts have lead to the inferior assembling efficiency and the increased cost.

Also the data specific to each unit of the apparatus, if stored in a ROM, will lead to a significant increase of cost, because the ROM has to be modified in the content for each unit and cannot be prepared by a single mask.

The conventional magnetic linear encoder, being generally magnetized with a single pitch as explained above, is excellent for relative position control but is unable to detect so-called absolute position. Such magnetic linear encoder is unable to detect, for example, the absolute position of the carriage home position, the absolute position for capping of the recording head for preventing the evaporation of ink therefrom in order to maintain the satisfactory printing ability, or the absolute position for a recovery system for removing the substance deposited on the head surface. For this reason, in the conventional recording apparatus, the magnetic linear encoder is employed in the ordinary operations for example at the recording but the absolute positions required for other functions are detected by microswitches and a photointerruptor consisting of a photocoupler and a shield plate mounted on the carriage, or by such microswitches and the counting of the pulses from the stepping motor for driving the carriage.

SUMMARY OF THE INVENTION

An object of the present invention is to provide a recording apparatus not associated with the aforementioned drawbacks by providing the scale of the magnetic linear encoder with at least two different pitches of magnetization.

Another object of the present invention is to provide a recording apparatus not associated with the aforementioned drawbacks, in which the scale of the magnetic linear encoder can be easily mounted on the main frame of the apparatus without adjusting operation, regardless of the position of the magnetized portion of said scale.

Still another object of the present invention is to provide a recording apparatus capable of facilitating the administration thereof and simplifying other conventional operations by recording non-positional information, such as the serial number of the apparatus by magnetization on the scale of the magnetic linear encoder.

Still another object of the present invention is to provide a recording apparatus capable of detecting the positions relating to recording operation and the absolute positions for other functions in simple and inexpensive manner, utilizing the magnetic linear encoder.

BRIEF DESCRIPTION OF THE DRAWINGS

FIGS. 35(a1), 35(a2), 35(b1), 35(b2), 35(c1), and 35 (c2) are views showing an example of magnetization of the scale of the magnetic linear encoder shown in FIG. 34 and wave form charts showing detected outputs;

FIGS. 44 (a1), 44 (a2) and 44 (c1), 44 (c2) are views showing other examples of magnetization of the scale of the magnetic linear encoder shown in FIG. 34 and wave form charts of the detected outputs;

FIGS. 45(a1), 45(a2) and 45(c1), 45(c2) are views showing still another example of magnetization of the scale of the magnetic linear encoder shown in FIG. 34 and wave form charts of the detected outputs;

FIGS. 46 (a) to 46 (c) are views showing another example of magnetization of the scale, having non-magnetized portions, of the magnetic linear encoder shown in FIGS. 43(a) and 43(c) wave form charts of the detected outputs;

FIGS. 53(a) and 53(b) are a view showing an example of magnetization of the scale, provided with two stepped portions, of the magnetic linear encoder shown in FIGS. 51(a) and 51(b), and a wave form chart of the detected output;

DESCRIPTION OF THE PREFERRED EMBODIMENTS

In the following there will be explained a first embodiment of the present invention, with reference to the attached drawings.

Figure 1:
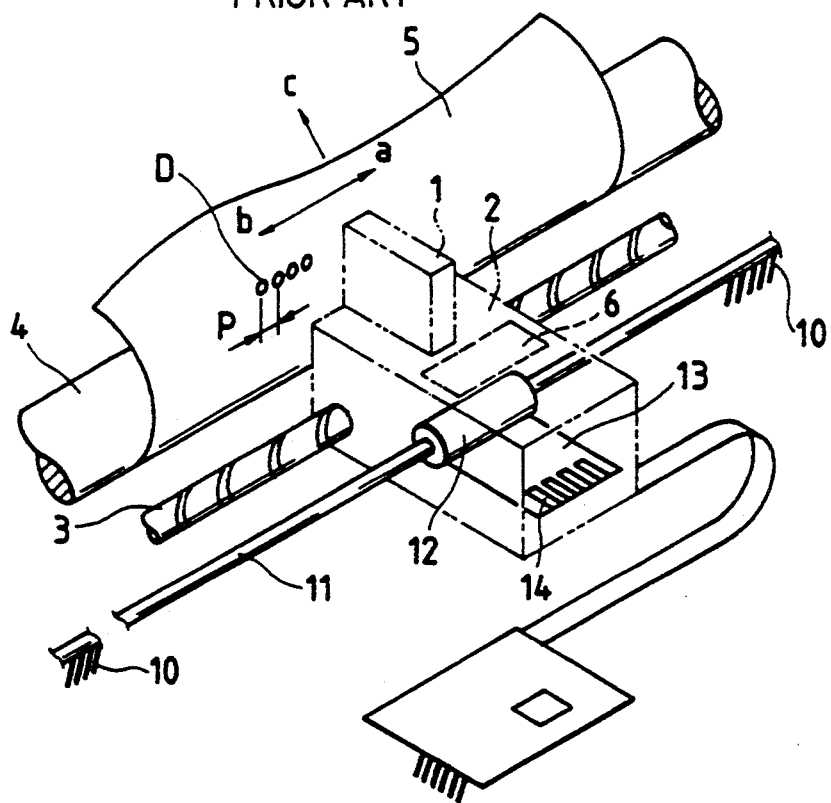
FIG. 1 is a perspective view of a recording apparatus employing a conventional magnetic linear encoder.
Figure 2:
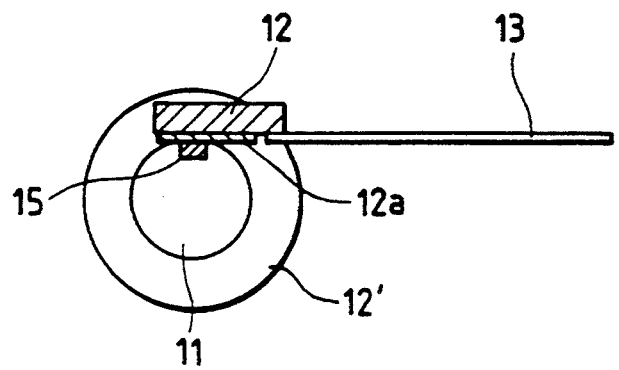
FIG. 2 is a cross-sectional view of the magnetic linear encoder shown in FIG. 1.
Figure 3:
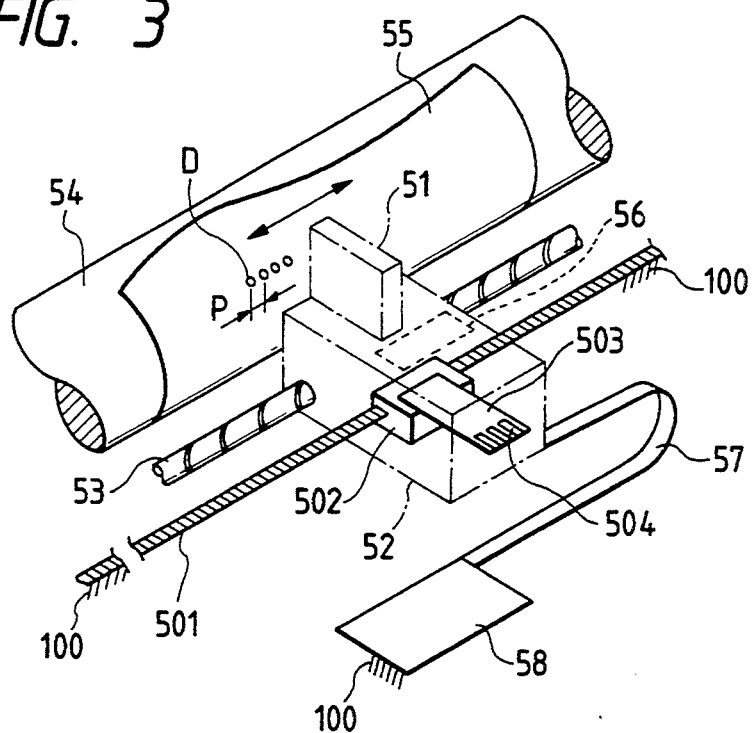
FIG. 3 is a perspective view of a recording apparatus employing a magnetic linear encoder, constituting a first embodiment of the present invention.

FIG. 3 is a perspective view of a principal part of a recording apparatus of the present invention, shown together with a recording sheet constituting the recording medium. A carriage 52, represented by chain lines, supports a recording head 51 such as of ink jet recording method and is guided by a lead screw 53 with a spiral groove so as to effect reciprocating motion. More specifically, the carriage 52 is provided with an engaging part (not shown) which engages with the spiral groove of the lead screw 53 and is moved along said spiral groove when said lead screw 53 is rotated by a carriage motor (not shown), whereby the carriage 52 effects the reciprocating motion, in directions indicated by an arrow, with respect to the recording sheet 55. During this motion, the ink jet from the recording head 51 records dots D with a pitch P on the recording sheet 55, thereby recording an image or a character.

A magnetic linear encoder is provided for detecting the position of the carriage 52 of the above-explained configuration and generating the synchronization signals, and is composed of a scale 501, positioned parallel to the lead screw 53 and fixed on the main frame of the recording apparatus, and a magnetic head 502 mounted in the carriage so as to be movable along said scale. The scale 501 is composed of a magnetic material as will be explained later, and is magnetized with a magnetic pattern corresponding to the print density pitch such as 180 or 360 dpi (dot/inch). The magnetic head 502 is provided with two sets of detecting devices, such as MR (magnetic resistance) devices, for reading said magnetic pattern.

The magnetic head 502 is provided, for extracting the output signals of the MR devices, with a flexible circuit board 503, which is connected to a board 56 (represented by broken lines) on the carriage 1 by connecting a contact portion 504 to a connector (not shown). Said board 56 and the recording head 51 are electrically connected to a printer control circuit board 58, fixed on the main frame 100, through a flexible cable 57.

In the following there will be explained the material, shape and magnetized direction of the scale of the magnetic linear encoder mentioned above. The scale is preferably composed of an Fe—Cr—Co magnet. Said magnet has magnetic characteristics comparable to those of the alnico magnet, and still is free from the drawbacks of hardness and brittleness of the permanent magnet, thus being easily formed as a wire of 0.1 mm or a plate by rolling or drawing. This magnet material is either formed as a thin film obtained by sputtering, vacuum evaporation or CVD, or as an alloy obtained by sintering or ordinary alloy forming method. It is shaped as a wire of a circular or rectangular (square) cross section or a plate, and such material can be easily and inexpensively obtained with the above-mentioned material. It is preferably magnetized perpendicularly in order to obtain a fine pitch (which is required for example in color printing when a finer dot control than in the monochromic printing is necessitated). The material, shape and magnetized direction of the scale adapted for use in the magnetic linear encoder of the present invention are as explained above, but the present invention is not limited by these parameters unless particularly specified in the attached claims. Also the magnetic head of the present invention preferably employs the magnetic resistance (MR) device of iron-nickel alloy, but the present invention is not limited to such MR device.

Figure 4:
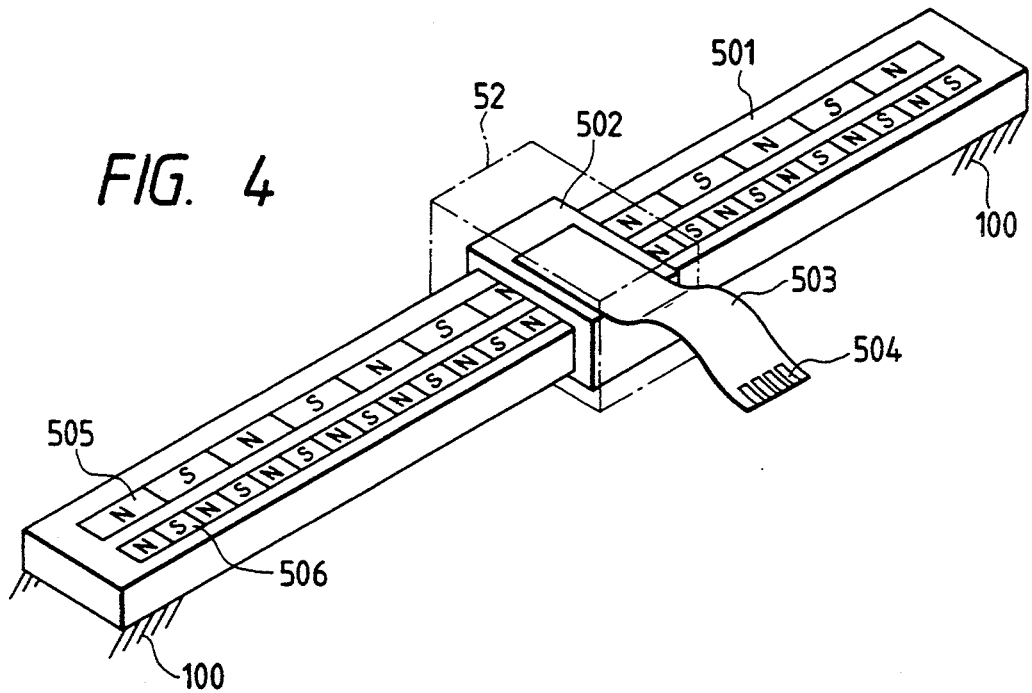
FIG. 4 is a perspective view of the magnetic linear encoder shown in FIG. 3.

FIG. 4 is a magnified perspective view of the magnetic linear encoder shown in FIG. 3, wherein the scale 501 is continuously magnetized in two lines, with mutually different pitches. For example, the upper magnetized line 505 is magnetized with a pitch of 180 dpi, while the lower magnetized line 506 is magnetized with a pitch of 360 dpi.

Figure 5:
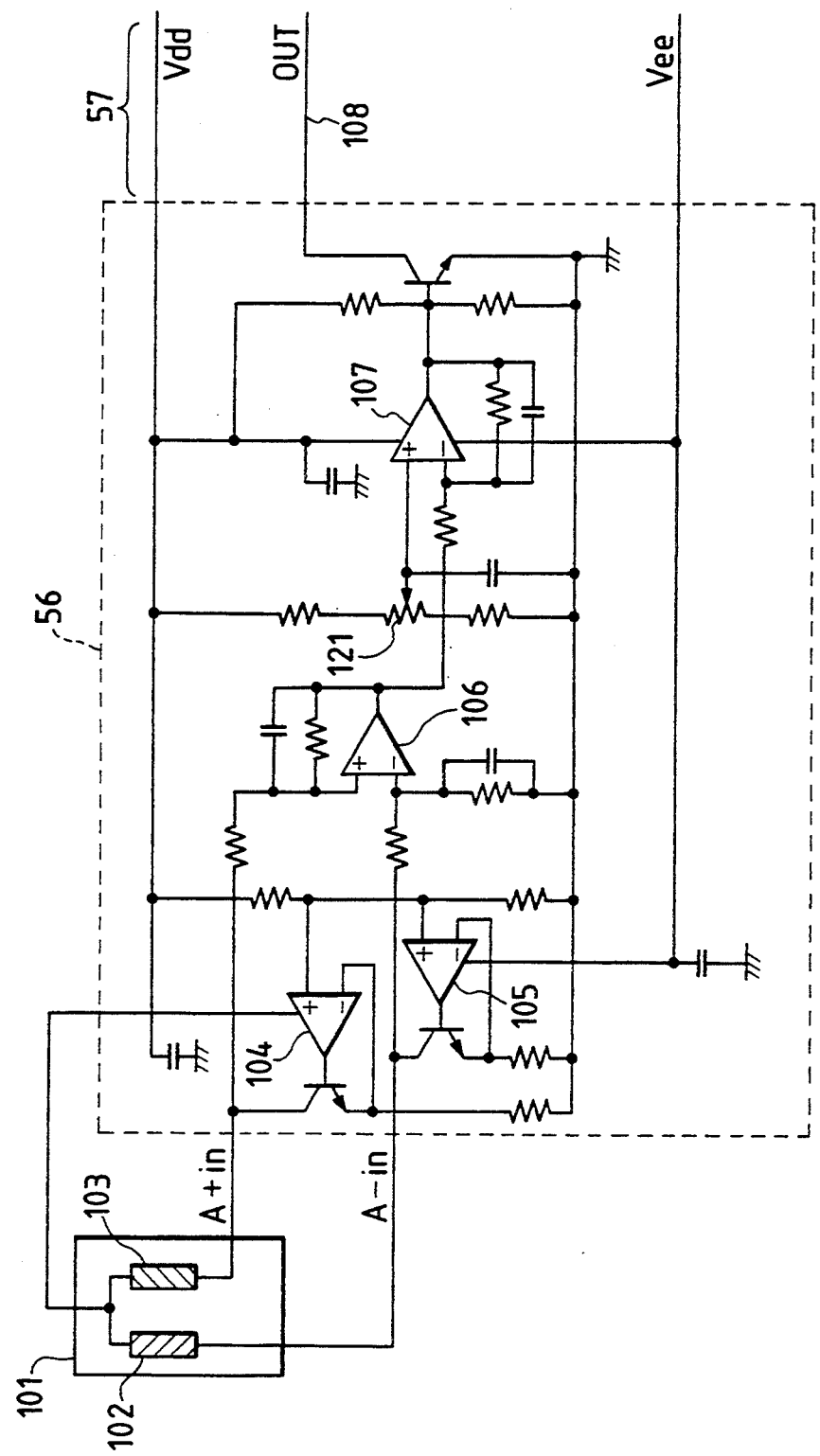
FIG. 5 is a circuit diagram of a detection circuit for processing the signal from the magnetic linear encoder of the recording apparatus shown in FIG. 3.

FIG. 5 is a circuit diagram showing a detecting circuit for the magnetic linear encoder. A detection unit 101 (magnetic head 102), mounted in the carriage and serving to detect the magnetic pattern of the scale fixed to the main frame, thereby detecting the relative movement of said carriage, is integrally provided with the magnetic resistance (MR) devices 102, 103 functioning based on the magnetic resistance effect. The detection unit 101 is connected to a circuit board 56 (represented by broken lines) mounted on the carriage. Said board is provided with amplifiers 104, 105 constituting a constant current circuit, an amplifier 106 for amplifying the detected signal, and a comparator 107, which are connected in known manner to release an output signal 108. The comparator 107 is connected to a variable resistor 121 which is for determining the reference voltage and is mounted on the board 56 for enabling adjustment on the carriage.

In the above-explained configuration, the MR devices 102, 103 are respectively given constant currents by the constant current circuits 104, 105. As the detection unit 101 (magnetic head 102) moves along the scale 501 of the linear encoder (cf. FIG. 3), the resistances of the magnetic resistance devices 102, 103 show variations, and said variations in the resistance are detected as a variation in the voltage, which is amplified in the amplifier 106 and supplied to an input terminal of the comparator 107. Said comparator 107 compares said voltage with a reference voltage predetermined by the variable resistor 121 and supplied to the other input terminal, thereby providing an output signal 108. The above-explained circuit is used for a magnetized line, for example the line 505, and a same circuit is provided for the other magnetized line, for example 506.

Figure 6:
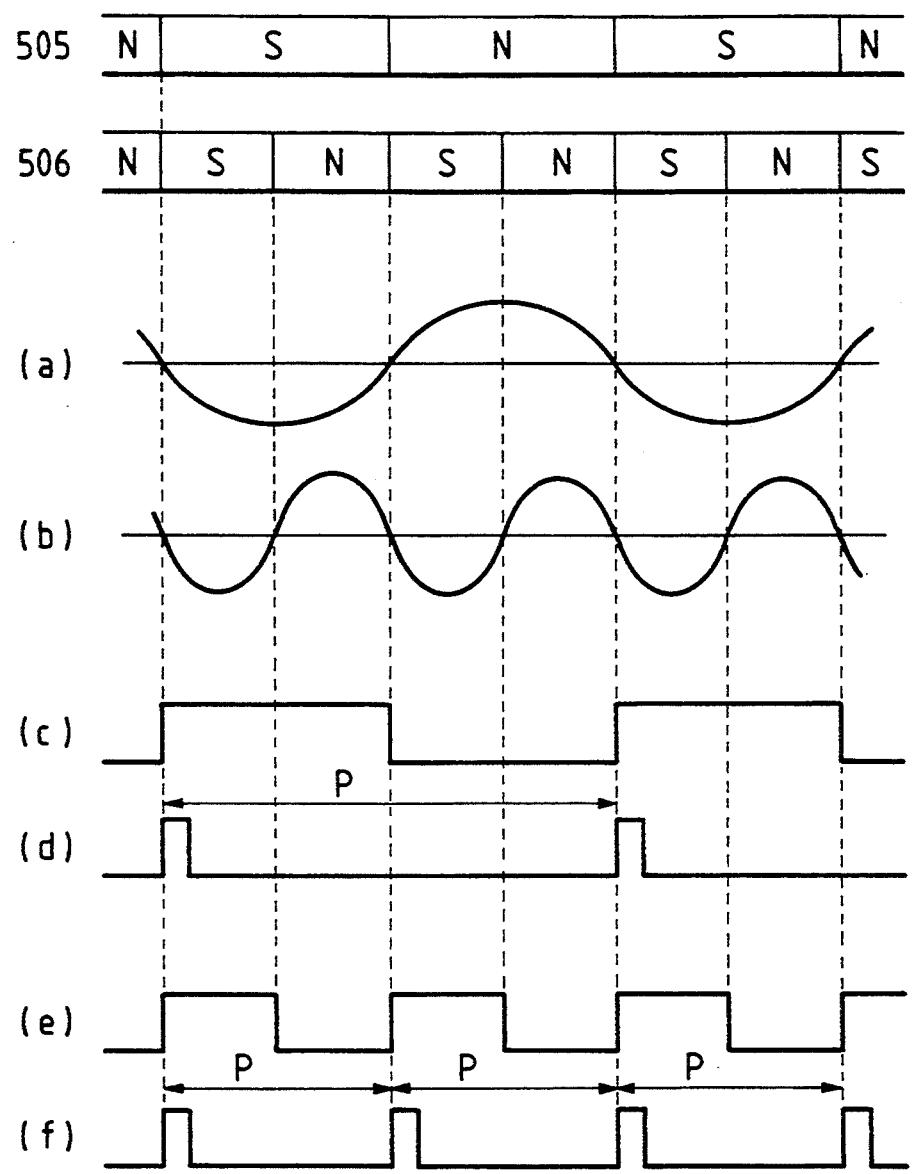
FIG. 6 is a wave form chart of the input and output signals of the detection circuit shown in FIG. 5.

FIG. 6 shows output signals corresponding to the above-explained circuit. In FIG. 6, (a) indicates the input wave form to the comparator 107 in the detection of the magnetized line 505 of 180 dpi, while (c) indicates the output signal 108 of said comparator 107, and (d) indicates the driving pulses for the recording head 51, triggered by the upshifts of the wave form (c). Similarly (b) indicates the input wave form to the comparator 107 in the detection of the magnetized line 506 of 360 dpi, while (e) indicates the output signal 108 of the comparator 107, and (f) indicates the driving pulses for the recording head 51, triggered by the upshifts of the wave form (e).

Consequently the magnetized line 506 can provide the driving pulses for the recording head 51 with a doubled density (with a halved pitch) in comparison with the magnetized line 505, so that, in same recording apparatus, recording can be achieved in two different pitches (180–360 dpi) by selecting the magnetized line 505 or 506 in the same magnetic linear encoder, without any change in the hardware and with a simple change in the software. It is thus rendered possible to prepare a series of apparatus of different recording densities and to obtain the recording apparatus of high productivity.

In the foregoing example, the scale of the magnetic linear encoder is magnetized with two pitches of 180 and 360 dpi, but it may apparently be magnetized with other pitches, or it may be magnetized with three or more different pitches. Also in said example, the MR device and the detection circuit are provided for each of 180 and 360 dpi, but it is also possible to detect the magnetizations of 180 and 360 dpi with a single set of the MR device and the detection circuit, by forming two magnetized lines on opposite sides of the scale of the linear encoder and inverting said scale with respect to the magnetic head 502.

Figure 7:
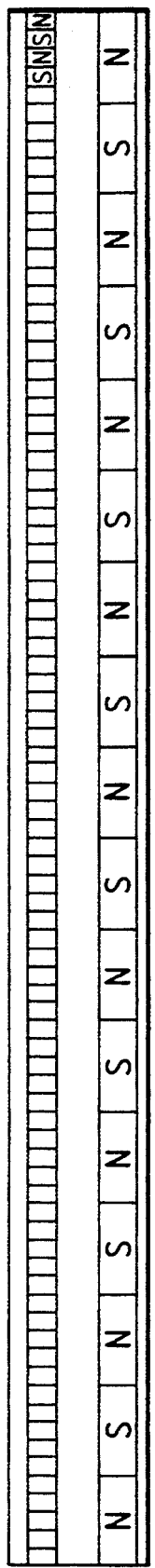
FIG. 7 is a perspective view, showing another example of the magnetization of the scale of the magnetic linear encoder shown in FIG. 3.

FIG. 7 is a plan view showing another example of magnetization of the scale of the magnetic linear encoder of the recording apparatus of the present invention. The lower magnetized line of higher density is used for generating a position signal and a drive timing signal for the recording head 51 as in the foregoing example, while the upper magnetized line of lower density is used for triggering other functions of the recording head 51. This example preferably employs an ink jet recording head of thermal jet method, and the triggered function preferably is used for varying the duration of the driving pulse for the recording head 51.

Figure 9:
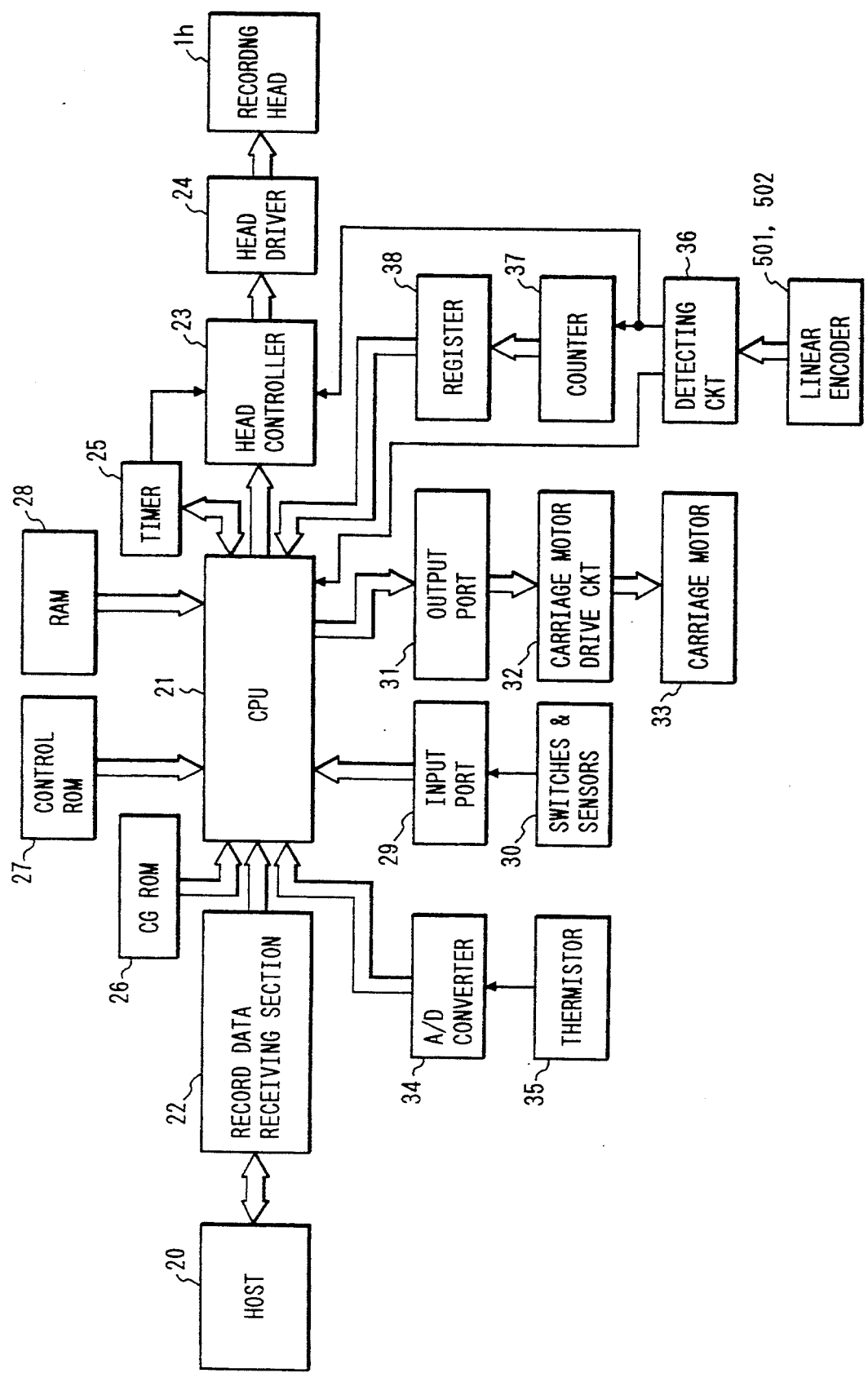
FIG. 9 is a block diagram of the control circuit of a recording apparatus equipped with the magnetic linear encoder shown in FIG. 3.

FIG. 9 is a block diagram of the control system of the recording apparatus of the present invention, wherein a central processing unit (CPU) 21 serves to control the functions of the entire recording apparatus and is composed for example of a microprocessor. The data to be recorded and the commands for controlling the functions of the recording apparatus are transferred from a host equipment 20 such as a computer system to the CPU 21 through a data reception unit 22, composed of a known interface circuit such as a parallel interface or a serial interface. Based on said transferred data, the CPU 21 controls the recording head 51 in the carriage 52, through a head control unit 23 and a head driver unit 24. The duration of the driving pulses for the recording head is controlled at a predetermined value by means of a timer 25.

In case the recording data transferred from the host equipment 20 represent characters and symbols, said data are transferred in the form of character codes. Thus, in order to record with the recording head of dot matrix system, said character codes are converted in the recording apparatus into bit image data. For this conversion there is provided a character generator ROM (CGROM) 26. Also a control program to be executed by the CPU 21 is stored in a control ROM 27. Further provided is a RAM 28 for use as a buffer area for the transferred recording data or as a work area for the CPU 21.

Also various output signals from switches and sensors 30 for detection are supplied to the CPU 21 through input ports 29, and an output signal from the CPU 21 is supplied through an output port 31 to a carriage motor driving circuit 32 for driving the carriage motor 33.

Also the recording head 51 is provided thereon with a thermistor 35, for detecting the temperature of said recording head through an A/D converter 34.

In the circuit configuration shown in FIG. 9, the functions of the principal components relating to the present invention are as follows. When the MR device of the magnetic head of the carriage 1 moves along the scale of the magnetic linear encoder for example as shown in FIG. 7, the signals obtained from said MR device are supplied to the detection circuit shown in FIG. 5 to provide trigger signals of different pulse intervals as shown in (d) and (f) in FIG. 6. (Since the upper and lower magnetized lines shown in FIG. 7 have a still larger difference in magnetization density, the trigger signals (f) have an even shorter pulse interval than illustrated, in comparison with those (d).) The trigger signals (f) are supplied to a counter 37, and the obtained count is supplied, as the position information of the recording head 51, to the CPU 21 through a register 38. The trigger signals (f) are also supplied to the head control unit 23, as the drive trigger signals for the recording head 51. Also the trigger signals (d) are supplied to an interruption input port of the CPU 21 and an interruption routine is initiated at the upshift edge of said signal, for resetting the head driving pulse, depending on the temperature of the recording head 51.

Figure 10:
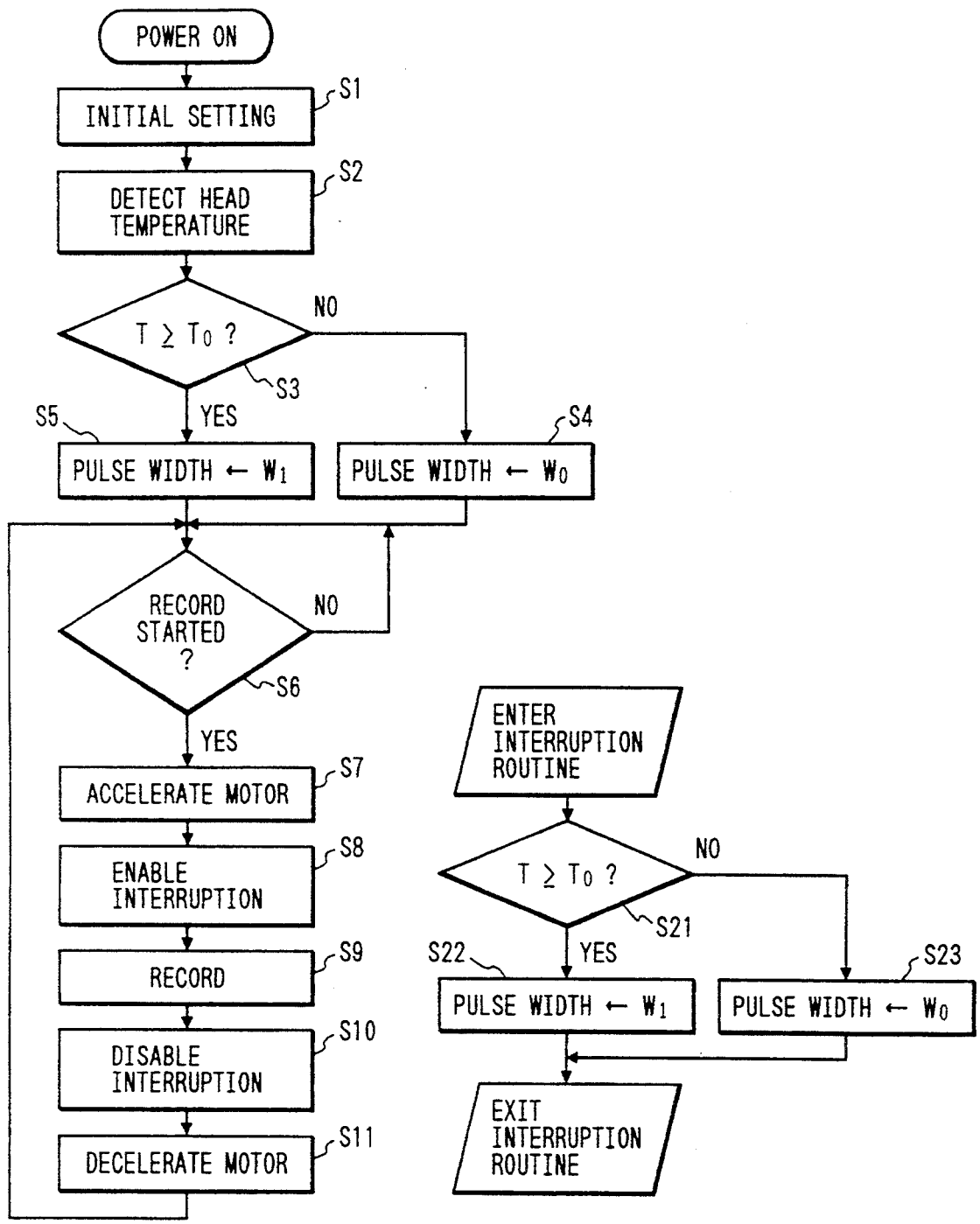
FIG. 10 is a flow chart of the control sequence of the control circuit of the recording apparatus shown in FIG. 9.

FIG. 10 is a flow chart showing, as an example, the control sequence for regulating the amount of ink discharged from the recording head, utilizing two trigger signals obtained in the foregoing embodiment. More specifically, this control sequence is designed, for example in an ink jet recording apparatus of thermal jet system, to detect the temperature of the recording head 51 at a predetermined recording distance (for example at every five characters) and varying the duration of the driving pulses for the recording head based on the detected temperature, thereby suppressing the fluctuation in the discharged ink amount resulting from the heat accumulation in the recording head.

Referring to FIG. 10, after the start of power supply to the recording apparatus, a step S1 effects initialization of the apparatus. In this state the position counter 37 is cleared at the home position, and the position of the recording head 51 is renewed at every upshift edge of the detection signal of the lower magnetized line of the scale 501, thereby obtaining the absolute position.

Then a step S2 detects the temperature of the recording head, and a step S3 discriminates whether the head temperature is at least equal to a specified value $T_0$ (for example 40° C.). If not, a step S4 sets an ordinary pulse duration $W_0$ in a timer 25, but, if the temperature is at least equal to $T_0$, a step S5 sets a shorter pulse duration $W_1$ in the timer 25, in order to prevent the increase of the discharged ink amount.

When a recording start command is received at step S6, a step S7 accelerates the carriage motor from the stopped state to a predetermined speed capable of recording. When the position counter reaches a value indicating the recording position, a step S8 enables the CPU for interruption, thereby initiating the recording operation with the aforementioned pulse duration, at every lower magnetized pitch. Thereafter, with the movement of the carriage 52, the control sequence jumps to an interruption routine at each magnetized pitch of the upper magnetized line shown in FIG. 7.

In said interruption routine, a step S21 detects the head temperature, and, if it is lower than $T_0$, not involving the danger of increase of the discharged ink amount, a step S23 sets the ordinary pulse duration $W_0$ in the timer for effecting the recording operation with said ordinary pulse duration. On the other hand, if the step S21 identifies that the head temperature is at least equal to $T_0$, indicating the danger of increase of the discharged ink amount due to head accumulation in the recording head, a step S22 sets a shorter pulse duration $W_1$ in the timer 25, and a step S9 effects the recording operation with a reduced energy for driving the head. After the recording of a predetermined amount in a line, a step S10 disables the interruption routine of the CPU 21, thereby blocking the interruption signals based on the detection signals of the upper magnetized line. Subsequently a step S11 decelerates and stops the carriage motor, and, after a sheet advancement if necessary, the sequence returns to the step S6. Thereafter the steps from S6 to S11 are repeated.

According to the control explained above, it is rendered possible, by forming a magnetized line of a different pitch, in addition to the magnetized line of the pitch for controlling the recording position and triggering the recording head, to control for example the head temperature. Thus, such magnetization of a different pitch on the scale of the magnetic linear encoder allows to dispense with (1) the interruption routine at a regular interval with a timer, and (2) the generation of the interval signals for detecting the head temperature, achieved by the software of the CPU 21 with constant confirmation of the current position, which have been required in case only one magnetized line of a single pitch is provided on the scale. This method is advantageous in cost and can alleviate the burden of control of the CPU 21.

Though the foregoing example has been explained by the application in an ink jet recording apparatus of thermal jet system, the present invention is likewise applicable to the recording apparatus of other systems in which the heat accumulation in the recording head has to be avoided, such as the ink jet recording apparatus or other systems or the thermal recording apparatus.

Also in the foregoing example, the detection signals from the upper magnetized line of a pitch different from that of the lower magnetized line for detecting the position of the recording head and triggering the function thereof are used as timing signals for detecting the head temperature, but said signals may also be used for other functions such as the control of the carriage motor. Also in the foregoing example, the lower magnetized line is used for detecting the position of the recording head and for triggering the function thereof while the upper magnetized line is used for generating trigger signals for other positions, but said upper and lower magnetized lines may be mutually inverted, and the present invention is not limited by such upper and lower positional relationship.

Figure 8:
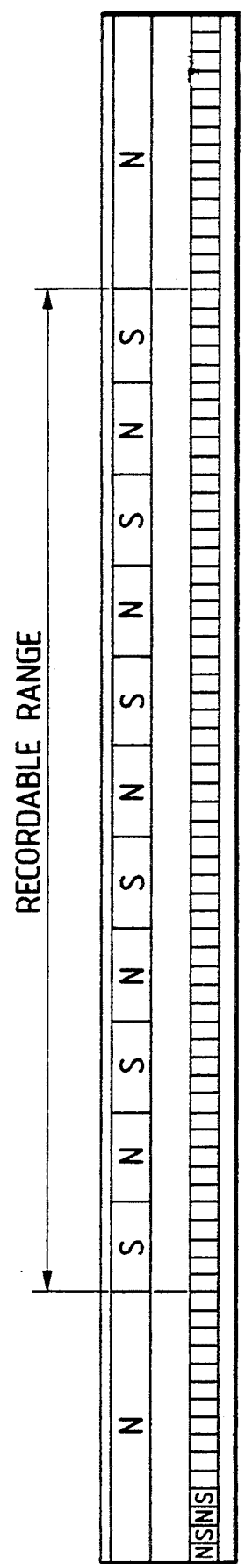
FIG. 8 is a perspective view, showing still another example of the magnetization of the scale of the magnetic linear encoder shown in FIG. 3.

FIG. 8 illustrates another magnetized pattern of the scale of the magnetic linear encoder of the recording apparatus of the present invention. In contrast to the magnetized pattern shown in FIG. 7, that in FIG. 8 is featured by a fact that the pitch of the upper magnetized pattern is varied within the line. More specifically, the magnetized direction (N, S) is varied only within the recordable range but is maintained constant outside said range, whereby the detected signal varies only in said recordable range. Consequently, since the mask control for the interruption signals, as explained in the second example, can be dispensed with, the control burden of the CPU 21 can be alleviated and the effective recording speed can be increased. Such configuration is particularly advantageous in case the moving range of the carriage 1 is always constant, as in the case of a small recording apparatus.

In the above-explained example, the upper magnetized pitch is constant within the recordable range, but said pitch may be arbitrarily modified for generating the trigger signals at desired positions. Also the magnetized line is entirely magnetized in either polarity, but it may remain unmagnetized in portions where the detection signal is not required.

Figure 11:
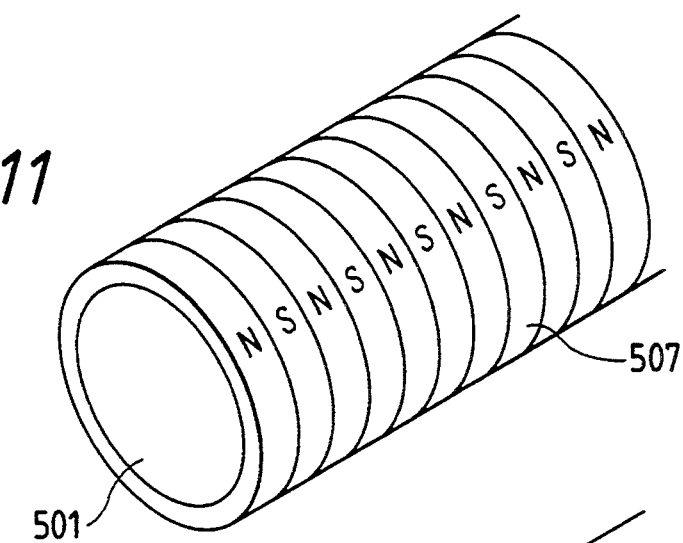
FIG. 11 is a perspective view showing an example of magnetization when the scale of the magnetic linear encoder shown in FIG. 3 is shaped as a rod.

In the following there will be explained, with reference to FIG. 11, a recording apparatus which does not require adjustment for mounting, in case a scale of a circular cross section is employed in the magnetic linear encoder shown in FIG. 3. In the example shown in FIG. 11, the scale 501 of the linear encoder is shaped as a rod, in which the magnetized portion 507 is formed over the entire periphery. For this reason, in the mounting of said rod-shaped scale 501 on the main frame 100 (cf. FIG. 3) of the recording apparatus, there is not required the adjustment for the magnetized direction.

Figure 12:
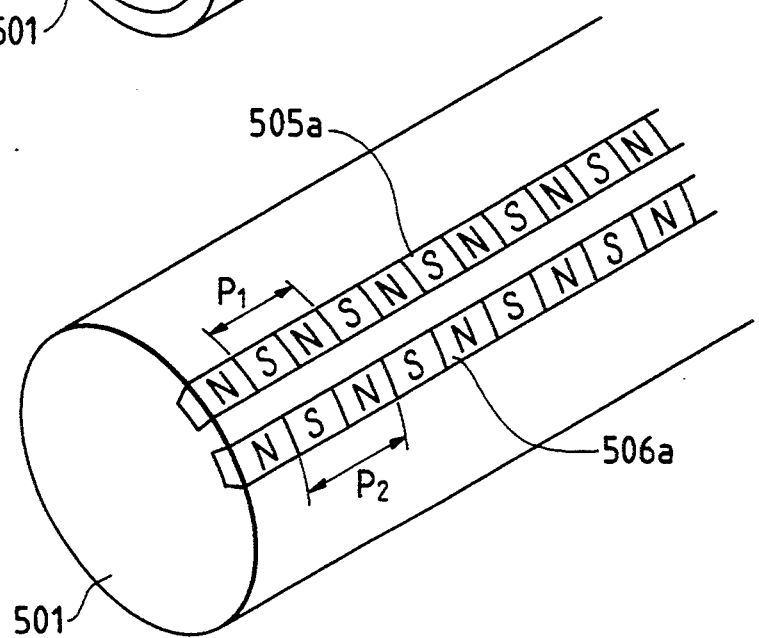
FIG. 12 is a perspective view showing another example of the rod-shaped scale of the magnetic linear encoder shown in FIG. 11.

FIG. 12 shows another example of the magnetization of the rod-shaped scale, having two magnetized portions 505a, 506a, with respective pitches for example of 360 dpi and 203.2 dpi. In case of employing such two different resolving powers, there are preferably provided two recording heads (not shown) in respectively corresponding manner.

Figure 13:
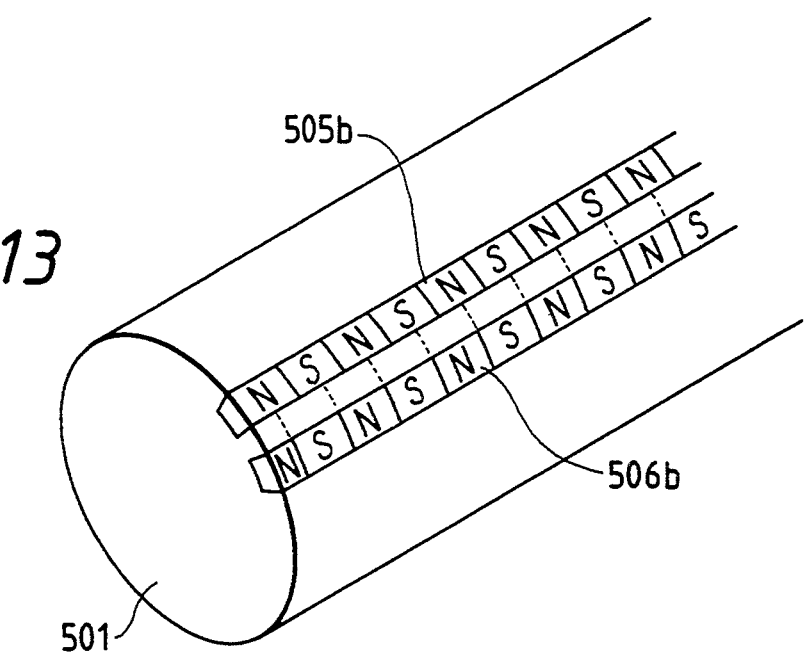
FIG. 13 is a perspective view showing still another example of the rod-shaped scale of the magnetic linear encoder shown in FIG. 11.

FIG. 13 shows another example of two magnetized portions 505b, 506b on a rod-shaped scale, in which said magnetized portions have a same magnetized pitch but are mutually staggered by a half pitch. In this case, by synthesizing the signals obtained from these two magnetized portions, there can be obtained a resolving power corresponding to the half of said pitch, or a doubled resolving power.

As explained in the foregoing, in the recording apparatus provided with a recording head mounted on a carriage reciprocating along the platen and a magnetic linear encoder of which the scale is positioned along the moving direction of said carriage and a magnetic head mounted on said carriage for reading the magnetized pattern of said scale, and adapted to effect the recording operation in synchronization with the signals obtained from said magnetic linear encoder, the presence of at least two magnetized pitches in said magnetic linear encoder provides the following effects;

(1) Two or more recording pitches can be easily realized in a same recording apparatus, without any increased burden on the hardware or on the CPU;

(2) A same linear encoder can be employed in the recording apparatus of different recording densities, so that a cost reduction can be attained by the increased mass producibility;

(3) Trigger signals for controlling the apparatus can be obtained at arbitrary positions, without increased burden on the hardware or on the CPU; and (4) An inexpensive recording apparatus with a high effective recording speed can be obtained, based on the above-mentioned factors.

Also in case the scale of the magnetic linear encoder is shaped as a rod, it may be magnetized over the entire periphery, whereby the adjustment of the mounting position becomes unnecessary at the mounting said scale on the main frame of the recording apparatus.

In the following there will be explained a second embodiment of the present invention, in which same components as those in the first embodiment are represented by same numbers and will not be explained further.

Figure 14:
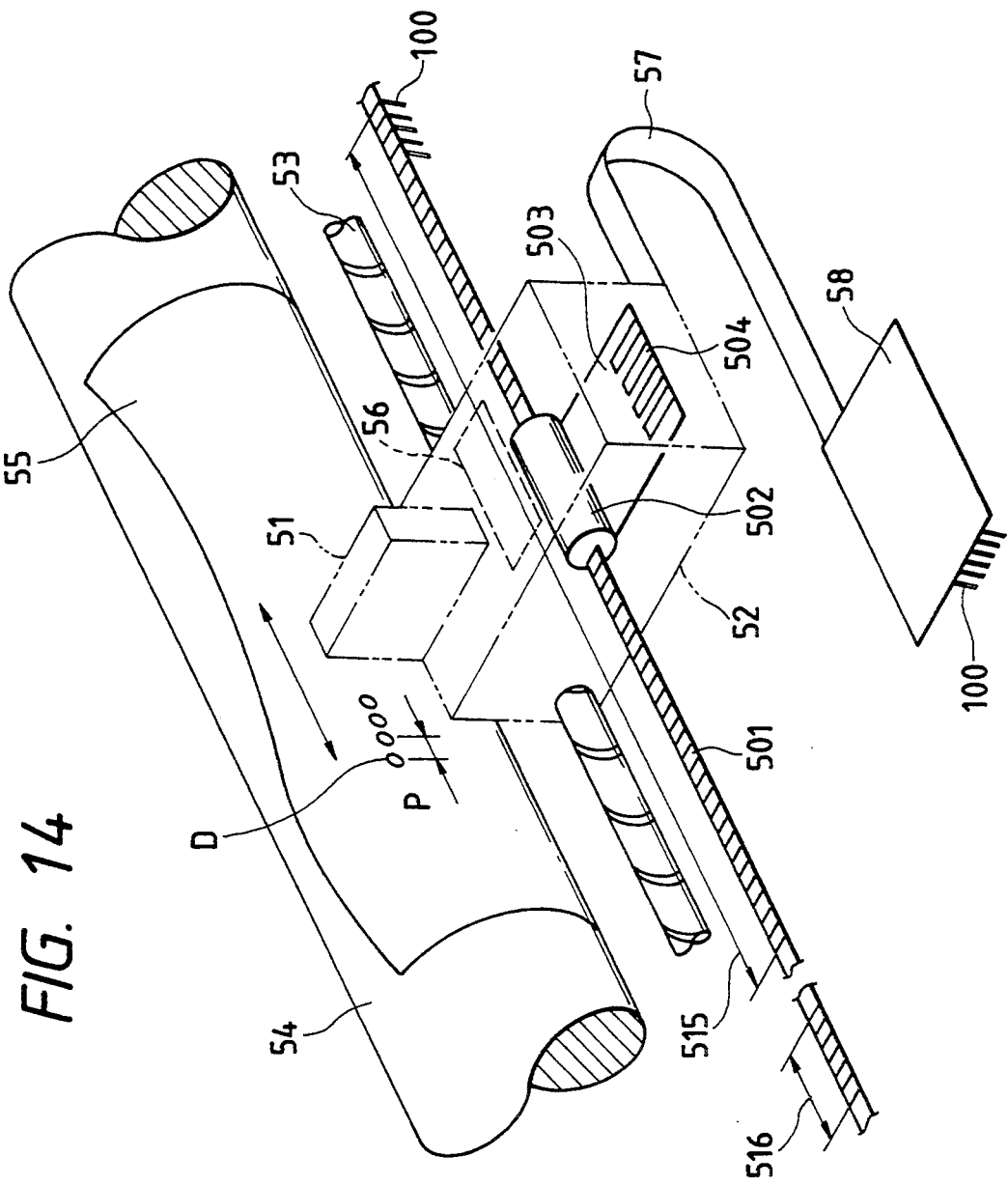
FIG. 14 is a perspective view of a recording apparatus employing a magnetic linear encoder, constituting a second embodiment of the present invention.

Referring to FIG. 14, the magnetic linear encoder consists of a scale 501 which is composed of a magnetic member formed on a metal surface and bearing an area 515 of magnetized pattern with a pitch of 180 or 360 dot/inch (dpi) and an area 516 containing specified information, and is fixed on the main body 100, and a magnetic head 502 composed for example of a MR device and fixed in the carriage 1, for detecting the position thereof.

Figure 15:
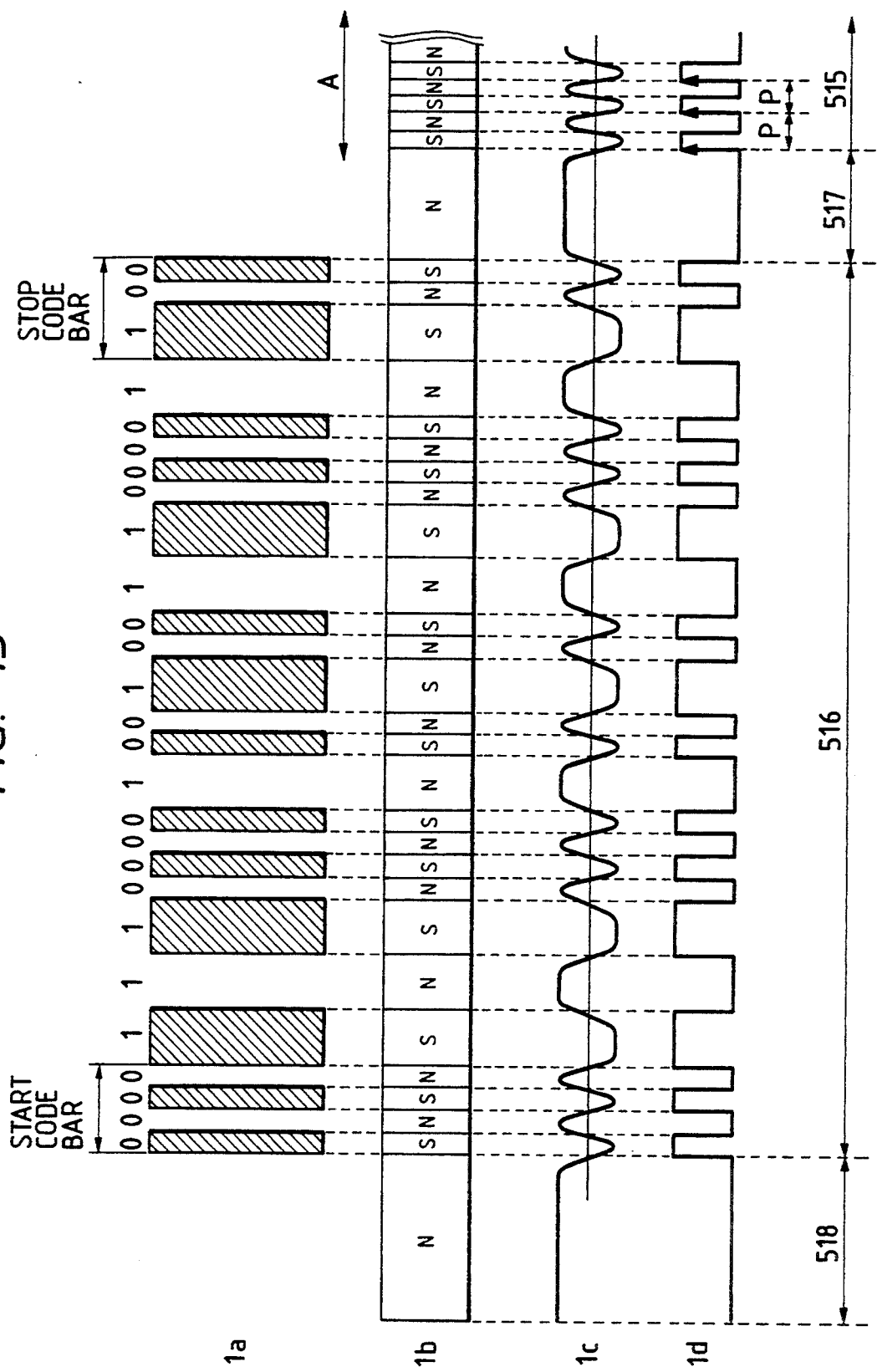
FIG. 15 is a view showing an example of magnetization and wave form of the detected output of the magnetic linear encoder shown in FIG. 14.

FIG. 15 shows an example of bar codes 1a, a magnetized line 1b of the scale of the linear encoder corresponding to said bar codes, and detected signals 1c, 1d corresponding to said magnetized line 1b. The scale is magnetized perpendicularly to the plane of the drawing, and the carriage 52 reciprocates in a direction A. In FIG. 15, the area 515 is continuously magnetized with a pitch of 180 or 360 dpi for generating the synchronization signals for the recording operation. The area 516 is magnetized with the information for other purposes, for example in the bar code system, and the corresponding bar codes are shown as 1 a.

This example employs a bar code symbol which is simplified from the logistics codes according to JIS X0502 and consists of start code bars, stop code bars and data characters (4 characters). In this code symbol, the logistics identifying character, the flag character and the modular check character are omitted, and the data characters are shortened from 10 to 4 characters.

Figures 16, 17:
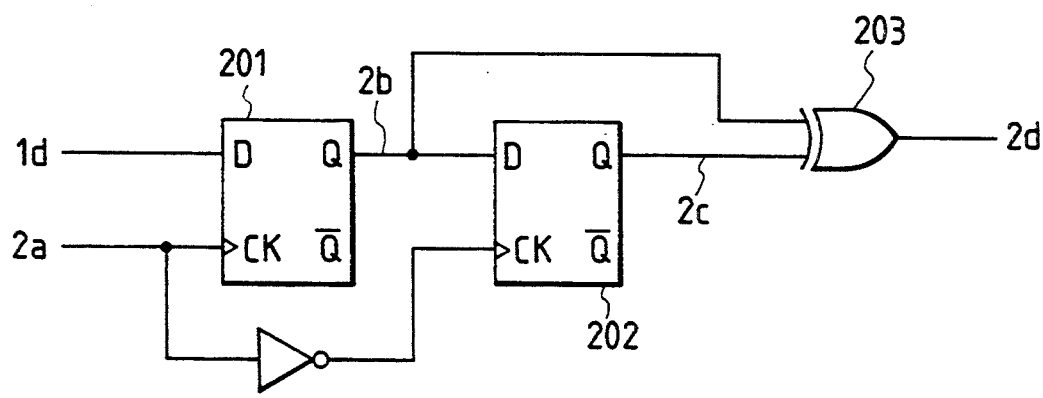
FIG. 16 is a chart showing the correspondence between the bar codes and the modules in the magnetic linear encoder shown in FIG. 14.
FIG. 17 is a circuit diagram for detecting the edges of the output wave form of the magnetic linear encoder shown in FIG. 14.

For easier understanding of the structure of the magnetized line of the scale of the linear encoder of the present embodiment, the bar code symbol of the logistics code according to JIS X0502 is constructed in the following manner. In said code system, the bar code is composed of white and black bars of two different widths (wide and narrow), and the width of the wide bar is 2.5 times of that of the narrow bar. The start code, the stop code and characters are represented by binary codes in which a narrow bar and a wide bar respectively represent "0" and "1". The start code is represented by "0000" starting from a black bar, while the stop code is represented by "100" starting from a black bar. Each character, such as the logistics identification character, the flag character, the data character or the modular check character, is represented by a module consisting of two wide bars and three narrow bars. The correspondences between the codes and the modules are shown in FIG. 16.

A character next to the start code is represented by black bars, while a succeeding character is represented by white bars, said black bars and white bars being alternately positioned. In the example shown in FIG. 15, the character next to the start code is "3" corresponding to a module "11000" represented by five black bars, and the succeeding character is "8" corresponding to a module "10010" represented by five white bars. The next character is "5" corresponding to a module "10100" of five black bars, and the succeeding character is "2" corresponding to a module "01001" of five white bars. Thus the bar codes shown in FIG. 15 represent a 4-digit code "3852" sandwiched between the start and stop codes, and said 4-digit code may be used, for example, for the serial number of the recording apparatus.

The detection circuit of the encoder is constructed similarly to that of the first embodiment shown in FIG. 5.

In FIG. 15, a wave form 1c is obtained by detecting the magnetization 1b on the scale 501 with the detection circuit and corresponds to the input signals to the comparator 107, and a wave form 1d corresponds to the output signals thereof. In the area 515, the counting of the relative position of the recording head 51 (FIG. 3) and the activation thereof are conducted at the upshift of the wave form 1d.

Figure 18:
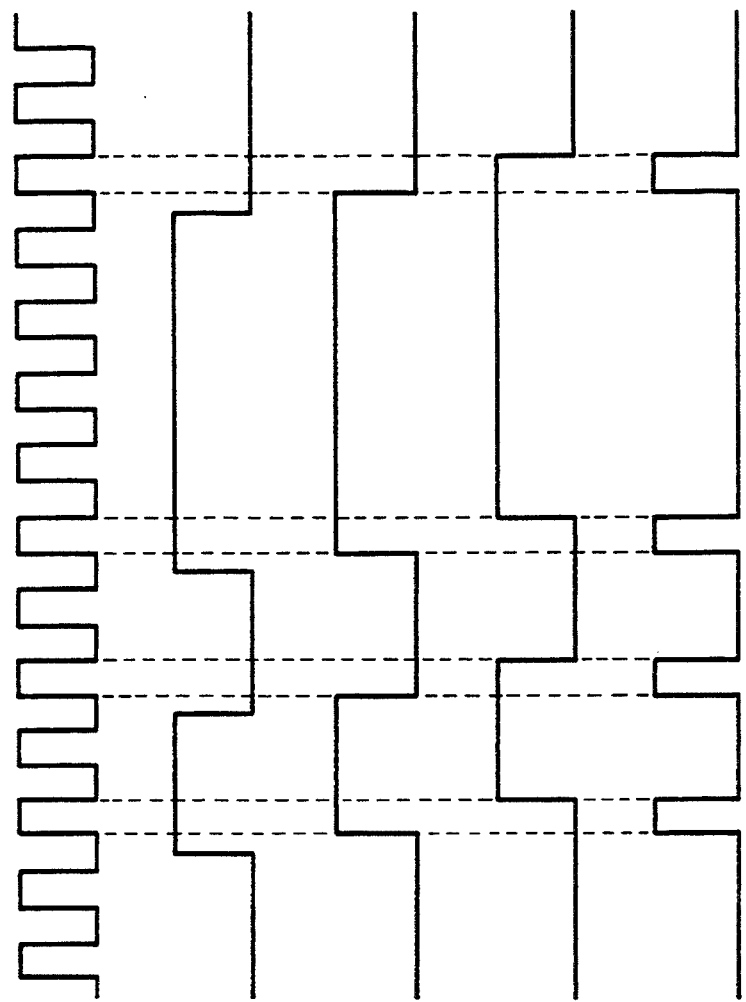
FIGS. 18 (2a), 18 (1d), 18 (2b), 18 (2c) and 18 (2d) are wave form charts of the edge detecting circuit shown in FIG. 17.

FIG. 17 shows a both-edge detecting circuit, for detecting both edges of the output signal 1d from said comparator 107, and FIGS. 18(2a) to 18(2d) are wave form charts showing various signals in said detecting circuit. The output signal of FIG. 18(1d) of the comparator 107, corresponding to the magnetization of the scale of the linear encoder 501, is supplied to the D-input terminal of a flip-flop 201, and is sampled at the upshift of a clock signal of FIG. 18(2a) of a duration sufficiently shorter than that of said signal of FIG. 18 (1d), thereby providing an output signal of FIG. 18(2b). Said Q-output signal of FIG. 18(2b) of the flip-flop 201 is further supplied to the D-input terminal of a flip-flop 202 and is sampled at the downshift edge of a clock signal of FIG. 18(2a) to obtain a signal of FIG. 18(2c) which is delayed by a half clock cycle from the signal of FIG. 18(2b). Said signals of FIGS. 18(2b) and 18(2c) are supplied to an exclusive OR gate 203 to obtain a both-edge detection signal of FIG. 18(2d) of a half clock width, corresponding to the signal of FIG. 18(1d). By entering said both-edge detection signal of FIG. 18(2d) into a timer to be explained later and counting, with clock signal of a sufficiently short cycle time, the period from an upshift edge of the signal of FIG. 18(2d) to the next upshift edge, it is rendered possible to detect whether the width of the H or L level of the output signal of the comparator 107, or the width of magnetization of the magnetic linear encoder 501, corresponds to the narrow or wide bar of the bar code, and to therefore read the bar code information magnetized on the scale of said linear encoder 501.

Figure 19:
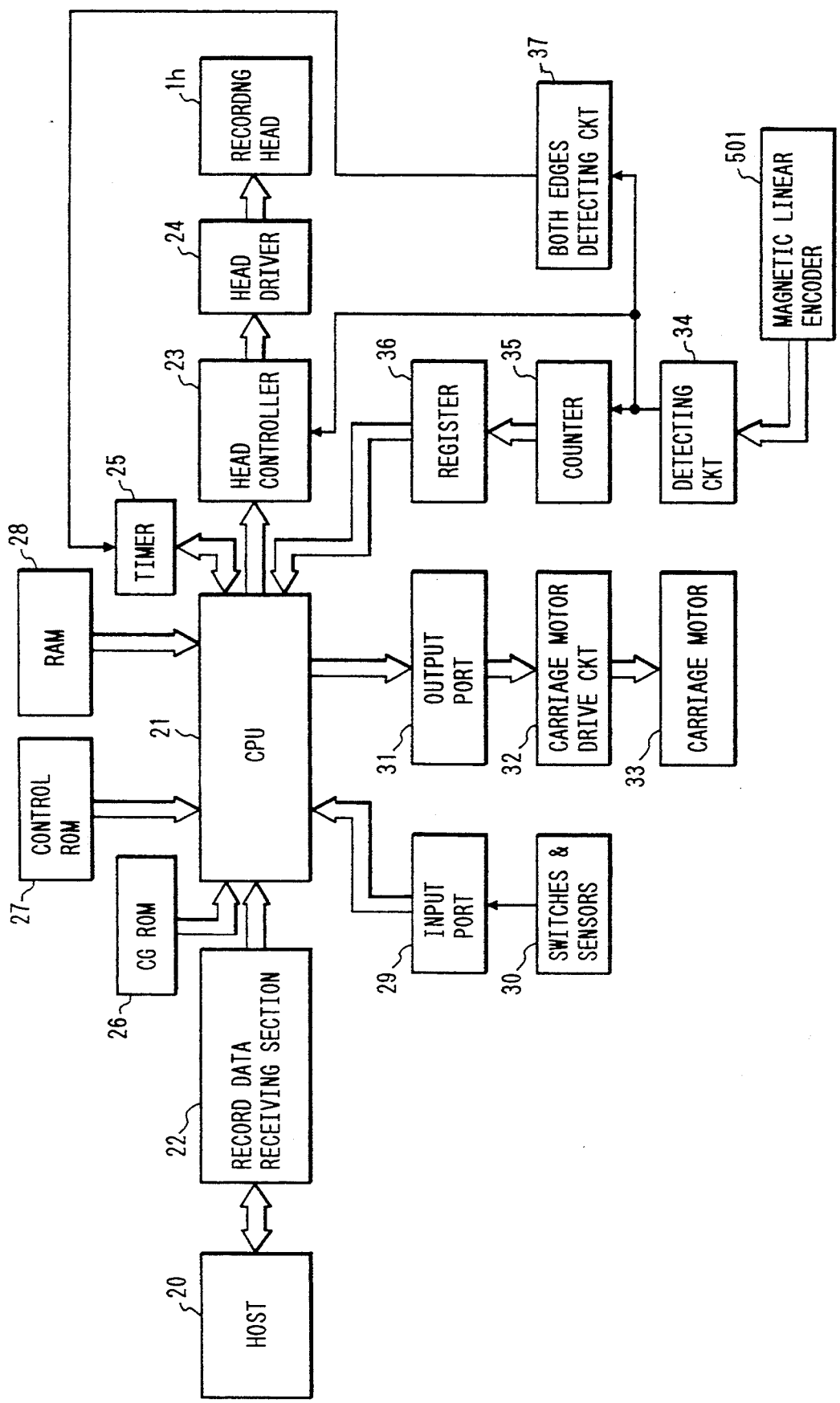
FIG. 19 is a block diagram of the control circuit of the recording apparatus provided with the magnetic linear encoder shown in FIG. 14.

The control circuit of the recording apparatus of the present embodiment, shown in FIG. 19, is substantially same as that shown in FIG. 9, except for the absence of the A/D converter 34 and the thermistor 35. The wave form 1d released from the detection circuit 34 is supplied through the both-edge detection circuit (corresponding to the circuit shown in FIG. 17) to the timer 25, and the magnetization pitch of the scale of the linear encoder 501 is detected by counting the upshift edge of the input pulse 2d to said timer 25 to the next upshift edge with clock signals of a cycle time sufficiently shorter than that of the signal 2a (cf. FIGS. 18 (2a) to 18(2d)).

Again referring to FIG. 15, it becomes possible to identify the area in which the carriage 1 is currently positioned, by maintaining, among the magnetization pitch of the area 515 for generating position signals relating to the recording operation, that of the area 516 magnetized with bar codes representing other information, that of an area 517 between said areas 515 and 516, and an area 518 at the left of the area 516, a relationship area 518 > area 517 > area 516 > area 515.

Figure 20:
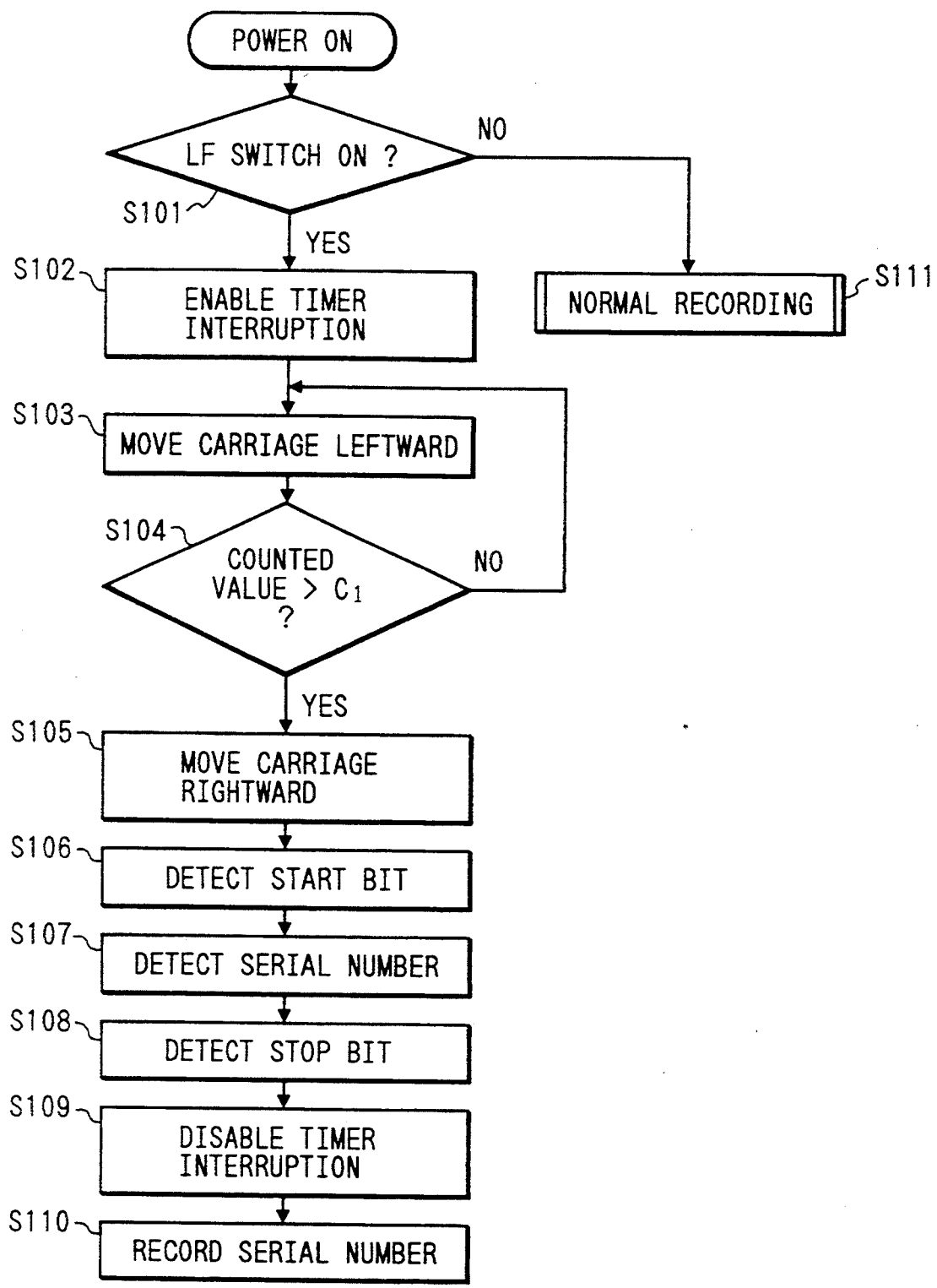
FIG. 20 is a flow chart of the control sequence of the control circuit of the recording apparatus shown in FIG. 19.

FIG. 20 is a flow chart showing the control sequence of the CPU 21 shown in FIG. 19. In this example the serial number of the recording apparatus is recorded as bar code information in the area 516 of the scale of the linear encoder 501, and is recorded on the recording sheet when the power supply is turned on in a state in which a line feed switch (not shown) of the recording apparatus is turned on.

Referring to FIG. 20, after the start of power supply of the apparatus, a step S101 discriminates whether the line feed switch has been depressed, and, if not, the sequence jumps to a step S111 to execute the ordinary recording mode.

If the step S101 identifies that the line feed switch has been depressed, there is executed a serial number recording mode starting from a step S102. At first the step S102 enables the timer interruption, and a step S103 moves the carriage 52 to the left at a constant speed, in order to move the carriage 52 to the area 518 shown in FIG. 15. In this state, with the movement of the carriage 52, rectangular waves 1d are released in synchronization with the magnetization pitch 1a shown in FIG. 15. Said rectangular waves 1d are supplied to the both-edge detection circuit 37, which releases pulses at both edges of the rectangular waves 1d, and the timer 25 counts the upshift of said pulse to the next upshift. The obtained count allows to identify the pulse duration of the high or low level state of the rectangular wave 1d, namely the magnetization pitch of the scale of the linear encoder 501. The timer 25 activates the interruption routine of the CPU 21 after completion of each counting from the pulse upshift to the next pulse upshift, thereby continuing the counting operation again.

Assuming that the magnetization pitches of the magnetized areas are so selected as to satisfy a relation area 518 > area 517 > area 516 > area 515 as explained before, the carriage 52 can be identified to be positioned in the area 518 when there is exceeded a count C1 selected between the count for the area 517 and that for the area 518. Consequently, in a step S104, the CPU 21 checks the obtained count at each interruption routine of the timer 25, and stops the carriage 52 when the count exceeds the value C1, identifying that the carriage 52 is in the area 518. Then a step S105 moves the carriage 52 to the right with a constant speed, in order to read the serial number recorded with the magnetized bar codes. In the area 516 bearing said magnetized bar codes, the width of wide bars is selected as 2.5 times of that of narrow bars. Thus the wide bars and narrow ones can be distinguished by selecting a threshold value between the count for the wide bar and that for the narrow bar. Assuming that the narrow bar and the wide bar respectively represent "0" and "1" of binary codes, a step S106 detects the 4-bit start code "0000", then a step S107 detects four characters composed of 20 bits "11100001001001100001" (each character being composed of 5 bits) as shown in FIG. 15, and a step S108 detects the 3-bit stop code "100". Thus the reading of the bar code information is completed.

The obtained 4-character codes are converted, by a conversion table provided in the control ROM 27 (cf. FIG. 16) into the serial number "3852". After said information reading, a step S109 disables the timer interruption and accelerates the carriage to the speed for the recording operation, and a step S110 effects the recording of the 4-digit serial number "3852", under the detection of the carriage position, in synchronization with the upshifts of the rectangular wave 1d in the recording area 515.

In the foregoing example, the scale of the magnetic linear encoder is magnetized with simplified bar codes of the logistic codes according to JIS X0502, but there may naturally be employed the unsimplified regular bar codes or those of other systems, or there may be employed an information recording format not in the form of bar codes.

Figure 21:
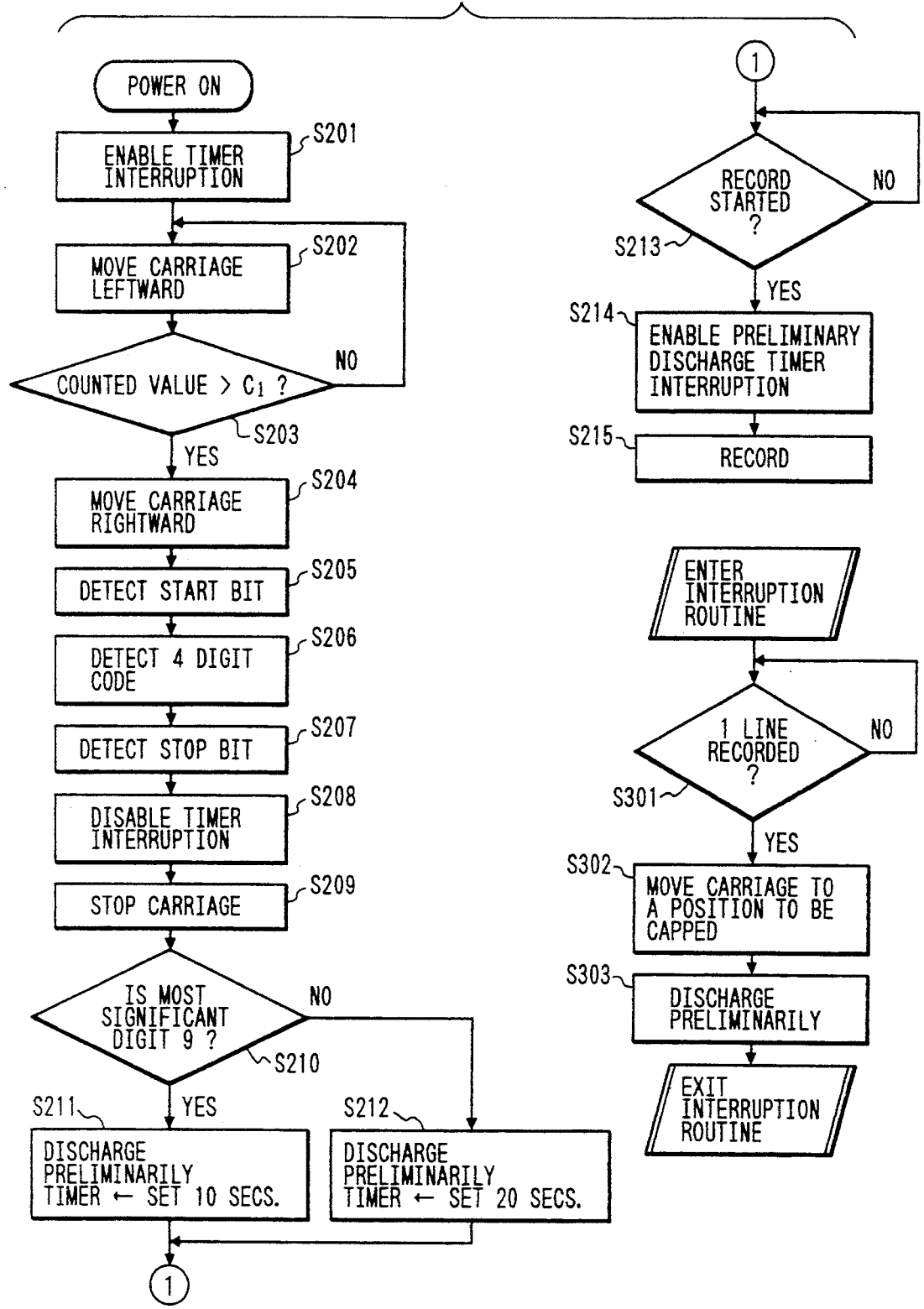
FIG. 21 is a flow chart of another control sequence of the control circuit of the recording apparatus shown in FIG. 19.

FIG. 21 is a flow chart showing another example of the control sequence of the CPU 21 shown in FIG. 19. In this example, the scale of the magnetic linear encoder bears the destination of the recording apparatus as the magnetized information, in addition to the magnetized line for generating position signals for the recording. The recording apparatus consists of a thermal jet recording apparatus, and the control is effected for selecting the interval of the preliminary discharge of the recording head.

In the thermal jet recording apparatus, there is generally executed the preliminary discharge, in which the ink is discharged from all the nozzles into a cap provided in a recovery system (not shown), at a certain interval, since any nozzle not effecting the ink discharge for a long time during the recording operation tends to become incapable of ink discharge due to an increase in the ink viscosity in the nozzle and on the nozzle surface. The interval of said preliminary ink discharges varies according to the ambient temperature and humidity. For this reason, in this example, the uppermost digit of the 4-digit codes magnetized on the linear encoder as in the foregoing example is selected to indicate the destination of the recording apparatus, and a destination code "9" indicates a special destination area, for which the interval of the preliminary discharges is switched to 10 seconds, shorter than the interval of 20 seconds for the ordinary area. The functions of this example will be explained in the following, with reference to FIG. 21.

After the start of power supply, steps S201 to S209 for reading the 4-digit codes magnetized on the linear encoder are same as in the foregoing example.

After the detection of the 4-digit code, a step S210 discriminates the uppermost digit. If it is not "9" the destination of the apparatus is an ordinary area, and a step S212 sets 20 seconds in a timer for determining the interval of the preliminary discharges. If the uppermost digit is "9", indicating the special area, a step S211 sets 10 seconds in said timer.

Then a step S213 awaits the start of the recording operation, and, in response to the entry of the recording start command, a step S214 enables the interruption by the preliminary discharge timer, and a step S215 executes the recording operation.

In the course of the recording operation, the CPU 21 jumps to an interruption routine of steps S301 to S303 at every expiration of the preliminary discharge timer. In said interruption routine, a step S301 awaits the completion of recording of the currently recorded line, then a step S302 moves the carriage to the capping position of the recovery system, and a step S303 effects the preliminary discharges of a predetermined number of times on all the nozzles with the predetermined pulses. Thereafter the sequence returns to the ordinary recording operation.

The above-explained control allows to vary the interval of the preliminary discharges by detecting the destination code, magnetized in the bar code format, provided in addition to the magnetization of a constant pitch for generating synchronization signals relating to the recording operation. In the foregoing example, the magnetized information indicates the destination of the apparatus and the control is conducted on the interval of the preliminary discharges, but the magnetized information and the control are not limited to such example. There may be employed any information that can vary the control of the recording apparatus. As an example, the magnetized information is represented by the magnetization pitch, and the control is to vary the pitch of recording. Also the foregoing example employs an ink jet recording apparatus, but the recording method is not limitative. Also the bar code format is not limitative.

As explained in the foregoing, in a serial recording apparatus equipped with a magnetic linear encoder along the moving direction of the carriage, the second embodiment of the present invention is featured by magnetizing the scale of the linear encoder with specified information in addition to the magnetization for generating position signals for the recording operation, whereby (1) the non-volatile information on said scale can be used for administering the recording apparatus and can be printed on the recording sheet, thereby dispensing with the operation of attaching the serial number on the package or on the outer casing of the apparatus, thus achieving improved assembling property and a reduced cost, and (2) said non-volatile information on the scale can be used for varying the control of the recording apparatus, and for dispensing the operation of varying the content of ROM for each recording apparatus, and for avoiding the additional cost for the preparation of such ROM's without the mask.

In the following there will be explained a third embodiment of the present invention, in which same components as in the foregoing first embodiment are represented by same numbers and will not be explained further.

Figure 22:
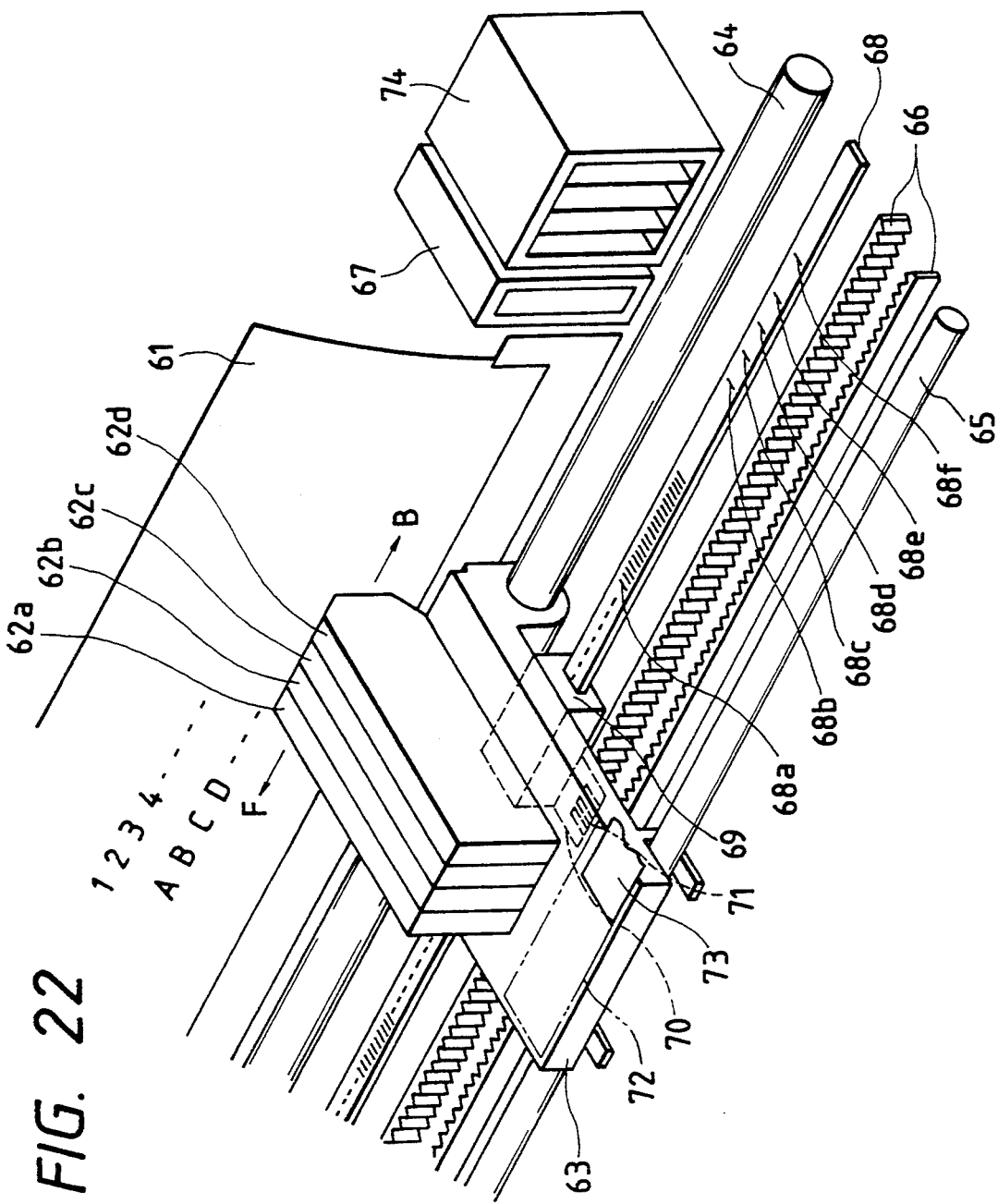
FIG. 22 is a perspective view of a recording apparatus employing a magnetic linear encoder, constituting a third embodiment of the present invention.

FIG. 22 illustrates the principal part of a recording apparatus of the present embodiment, wherein shown are a recording sheet 61; ink jet recording heads 62a, 62b, 62c, 62d for respectively discharging inks of yellow, magenta, cyan and black colors; a carriage 63 supporting said recording heads; a carriage shaft 64; a carriage guide shaft 65; a belt 66 for driving the carriage 63; a recovery system 67 for sucking ink from the recording heads thereby preventing the clogging of said heads and maintaining the ink in said head in normal state; a capping unit 74 for capping said recording heads; a scale 68 of the magnetic linear encoder, said scale 68 being so magnetized as to provide information on the recording positions 68a and information on the absolute positions 68b, 68c, 68d, 68e, 68f for the recovery system and the capping unit; and a magnetic head 69 provided with a magnetic resistance (MR) device for reading the magnetization on said scale and fixed on the carriage 63, in order to detect the position of the carriage 63 or the recording heads in the course of movement of said carriage.

The recording sheet 61 is advanced by a feed roller (not shown), and the recording is achieved by the recording heads 62a–62d supported on the carriage 63, which is guided by the carriage shaft 64 and the carriage guide shaft 65 and is put into scanning motion by a motor (not shown) through the belt 66.

The magnetic head 69 is provided, for extracting the output signal of the MR device, with a flexible circuit board 70, which is connected to a circuit board 72 (represented by chain lines) on the carriage 63, by linking a contact portion 71 to a connector (not shown). Said board 72 and the recording heads are electrically connected, through a flexible cable 73, to a control circuit board (not shown) provided in the main body of the recording apparatus.

Figure 23:
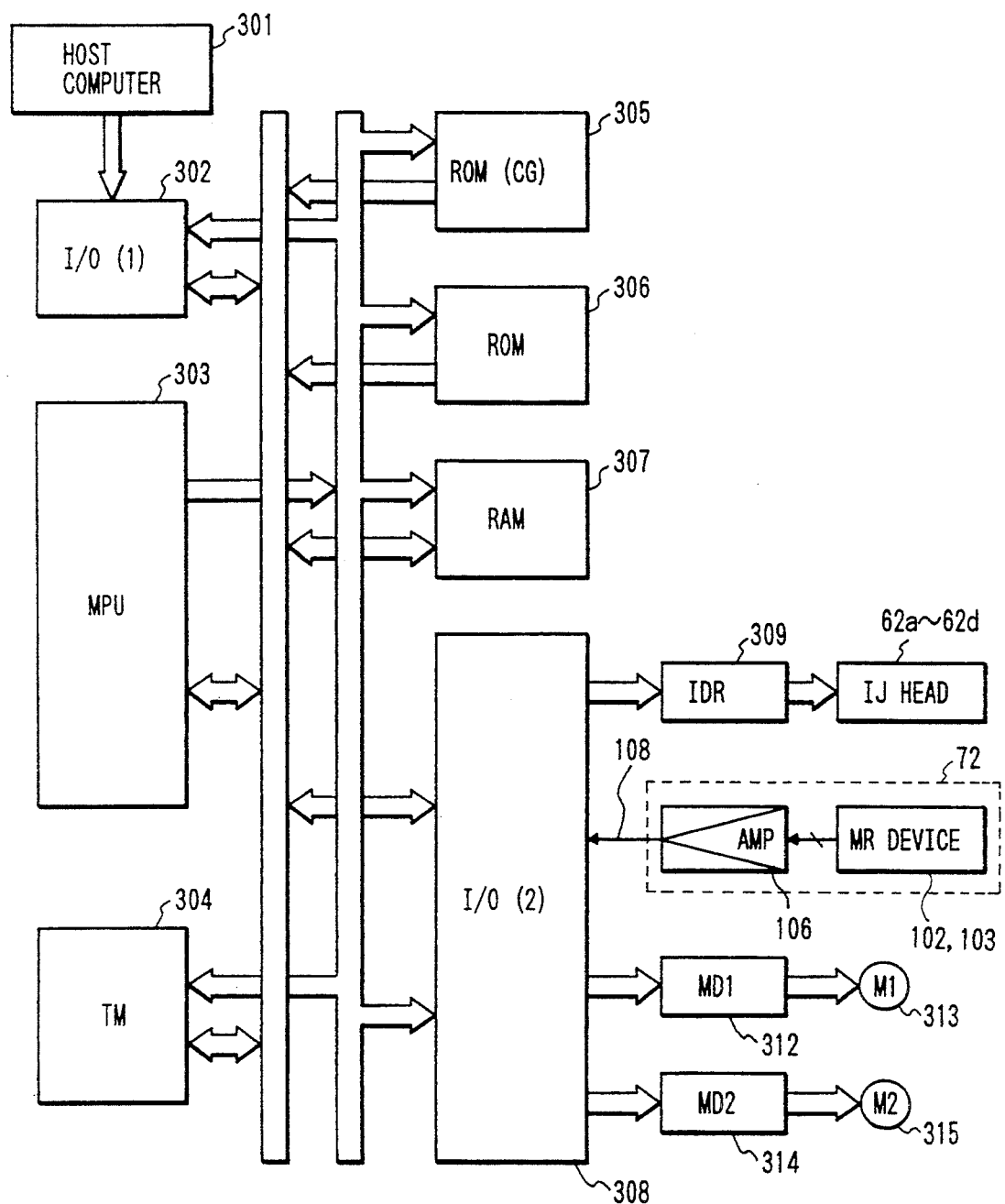
FIG. 23 is a block diagram of the control circuit of the recording apparatus provided with the magnetic linear encoder, shown in FIG. 22.

FIG. 23 is a block diagram of the control system of the recording apparatus shown in FIG. 22. Print data from a host computer 301 are received by an input/output interface I/O(1) 302 and are stored in a reception buffer of a RAM 307. Said print data are then processed by a microprocessor (MPU) 303 based on a character generator ROM 305 and a ROM 306 for controlling the entire functions, and the obtained image information for printing is stored in an image buffer area of the RAM 307. Then a motor 313 for driving the carriage and a motor 315 for sheet feeding are driven, through drivers 312, 314, by the commands supplied from the MPU 303 through an interface 308. When the carriage is moved by said motor 313, the MR devices 102, 103 read the position information from the scale 68 of the linear encoder and send an output signal 108 to the interface 308 through an amplifier 106. The recording heads 62a–62d are activated through a driver 309, in synchronization with said position information, to effect the recording.

A timer 304 is used for controlling the drive time of the motors or for identifying the position information from the input signals from the MR devices.

The detecting circuit of the linear encoder is constructed same as that in the first embodiment, shown in FIG. 5.

Figure 24:
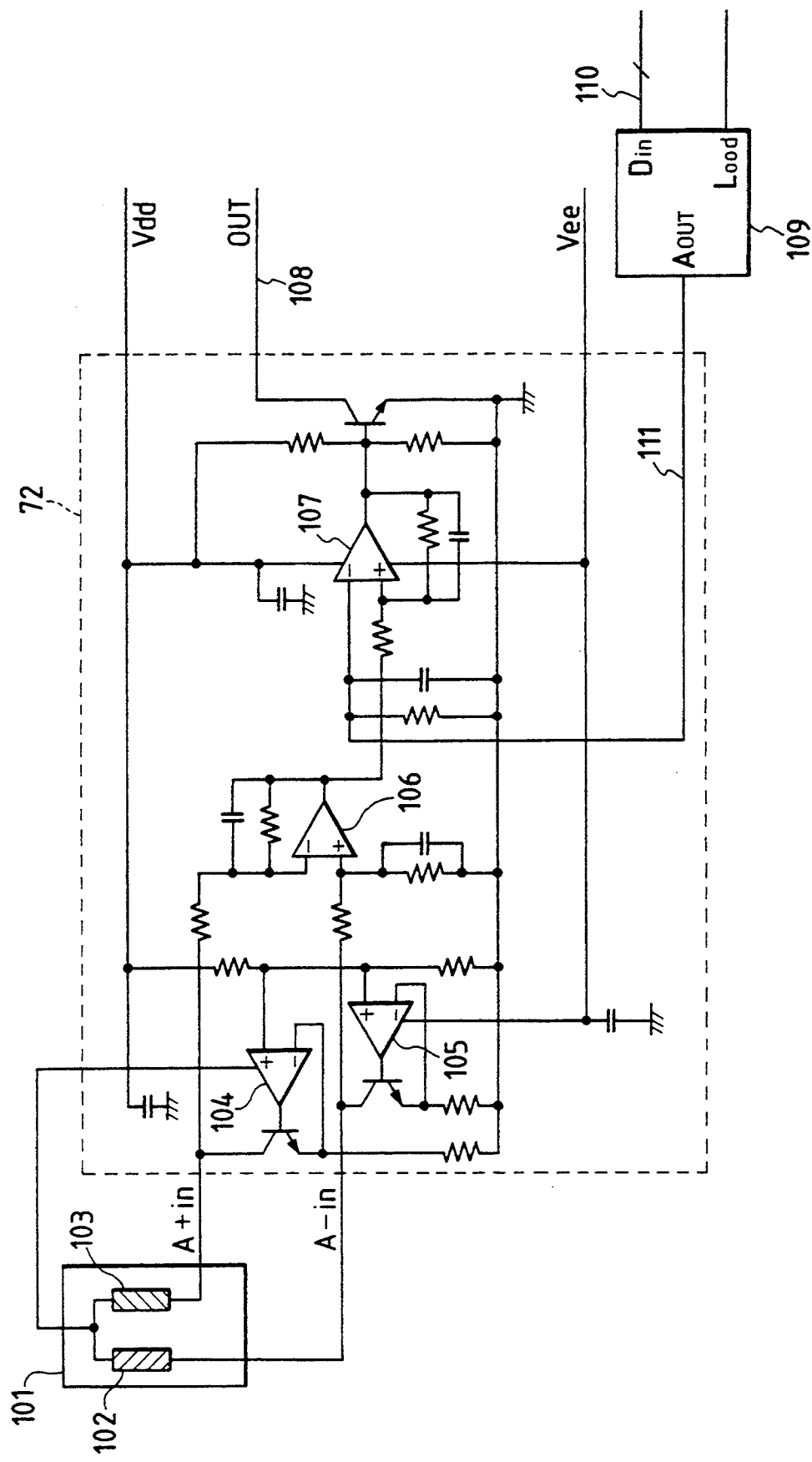
FIG. 24 is a circuit diagram showing another example of the detecting circuit for processing the signal from the magnetic linear encoder shown in FIG. 22.

The reference voltage may also be obtained, as shown in FIG. 24, by converting a digital signal 110 from the unrepresented control circuit board of the main body into an analog signal 111 by a D/A converter 109 for supply to the comparator 107.

The above-explained configuration functions in the following manner. The MR devices 102,103 are respectively given a constant current by constant-current circuits 104, 105. As the detection unit 101 moves along the scale 68 of the linear encoder, the MR devices 102, 103 vary the resistances thereof, and said variations in resistances are detected as variations in voltages. Said voltage variations are amplified by the amplifier 106 and supplied to an input terminal of the comparator 107, which compares said input voltage with a reference voltage predetermined by the variable resistor 201 and supplied to the other input terminal, thereby generating an output signal 108.

Figure 25:
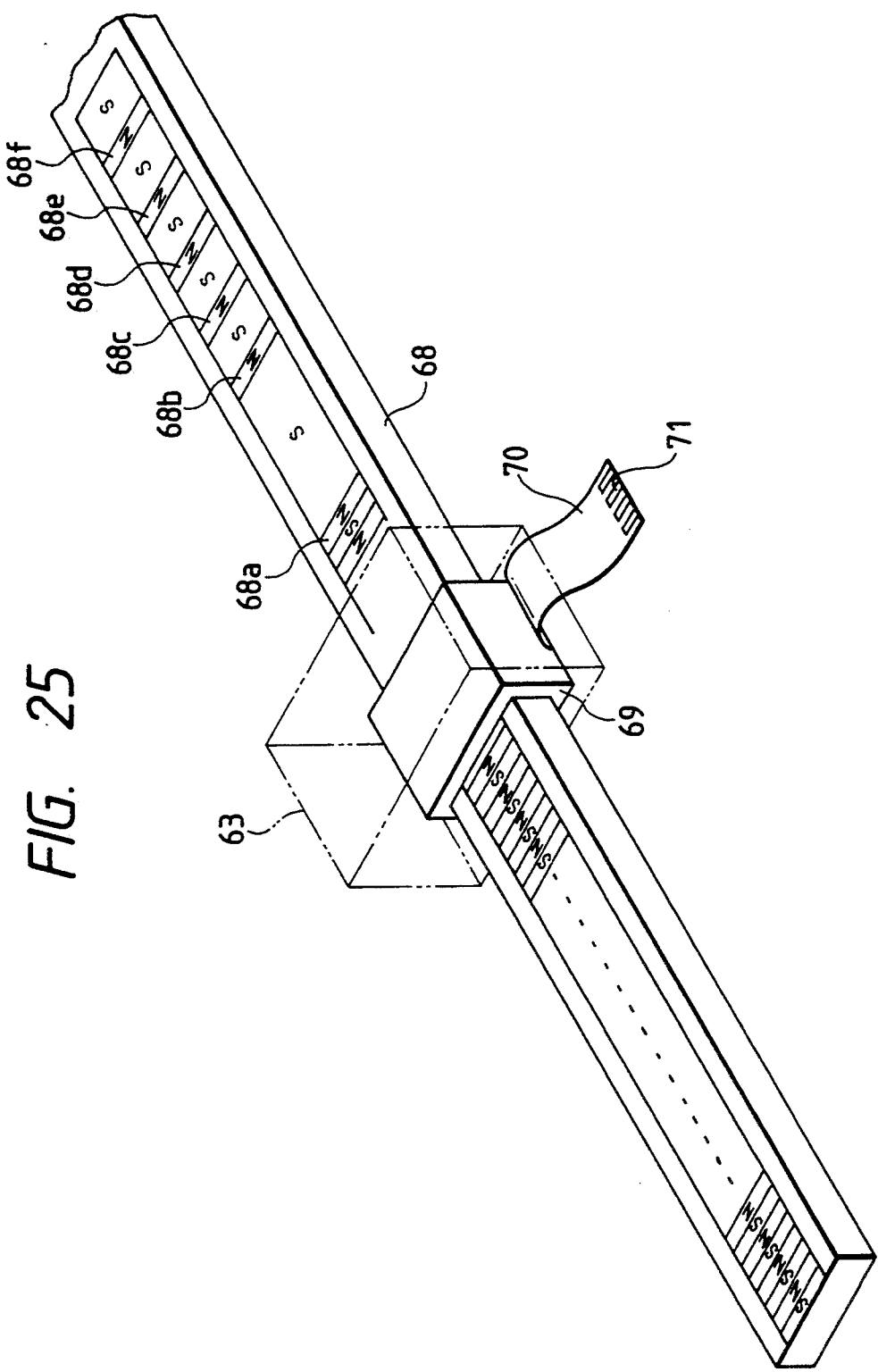
FIG. 25 is a perspective view of the magnetic linear encoder shown in FIG. 22.

FIG. 25 schematically shows the magnetization of the magnetic linear encoder shown in FIG. 22. The scale of said linear encoder is composed of a magnetic member of rectangular cross section and bears, in a magnetized portion to be used in the ordinary recording operation, a magnetic pattern 68a (N poles) with a pitch corresponding to the recording dot positions, and magnetic patterns 68b–68f (absolute position information), on the extension of said magnetized portion, corresponding to the absolute positions for the recovery operation or for the capping position.

These magnetized patterns 68a, 68b to 68f have a same width of N poles but are different in the absolute positions. The magnetic head 69 is so positioned as to read such magnetized patterns of the scale 68, and is connected to the circuit on the board 72, through the flexible circuit board 70 and the connecting part 71.

Figures 26A, 26B, 26C:
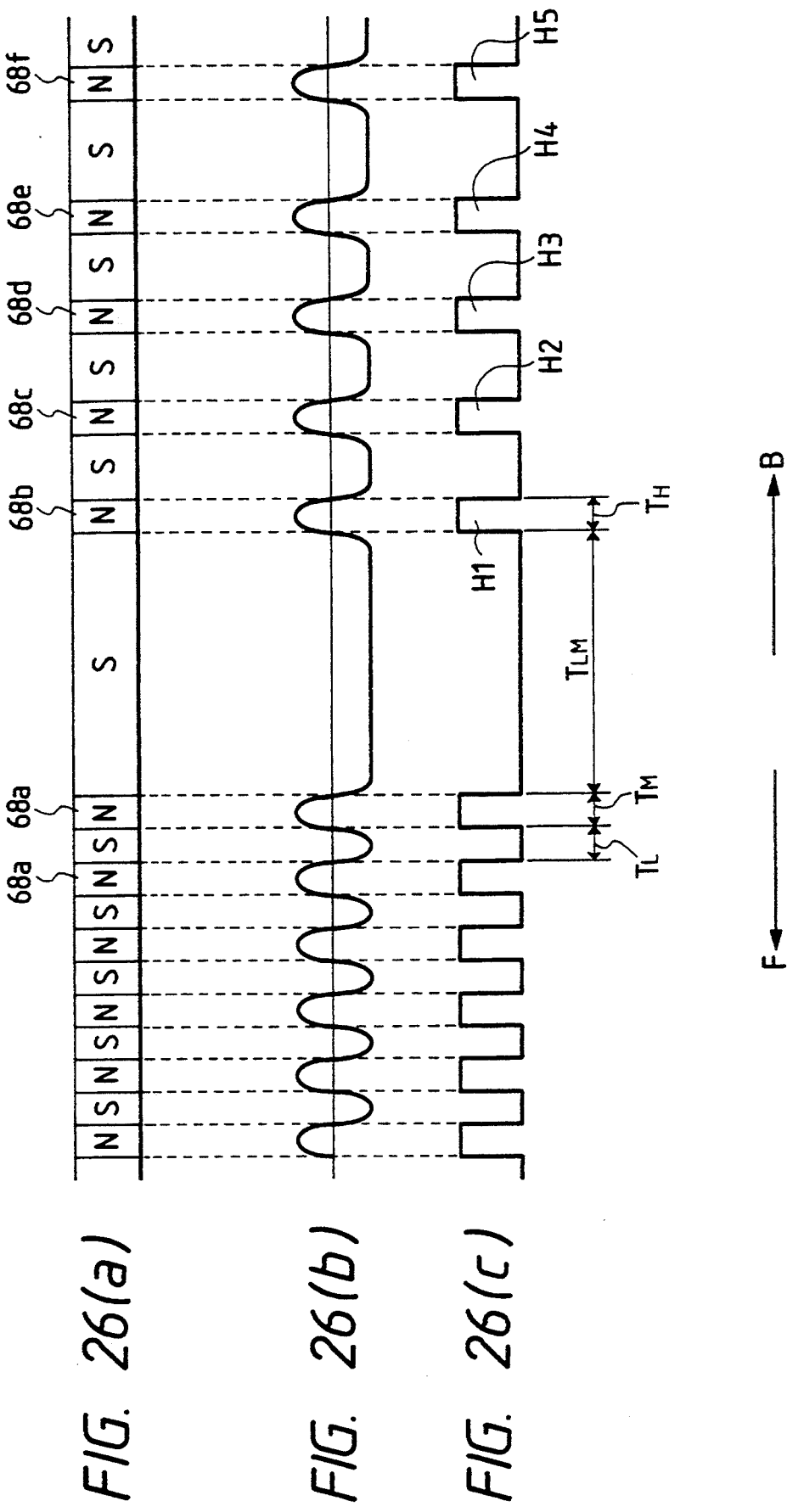
FIGS. 26(a) to 26(c) are views showing another example of magnetization of the scale of the magnetic linear encoder shown in FIG. 22 and wave form charts showing the detection outputs.

FIGS. 26(a) to 26(c) show the correspondence between the magnetized pattern shown in FIG. 25 and the detected wave formed obtained by the detection circuit shown in FIGS. 5 and 24. More specifically, FIG. 26(a) schematically shows the magnetized pattern shown in FIG. 25, while FIG. 26(b) shows the input signal to the comparator 107, obtained by the detection of the magnetized poles with the MR devices, and FIG. 26(c) shows the output signal of the comparator 107. This output signal is supplied through the signal line 108 and the port I/O(2) to the MPU, and the operations of printing, recovery, capping home positioning etc. are executed at respective positions according to the commands stored in the ROM.

Figure 27:
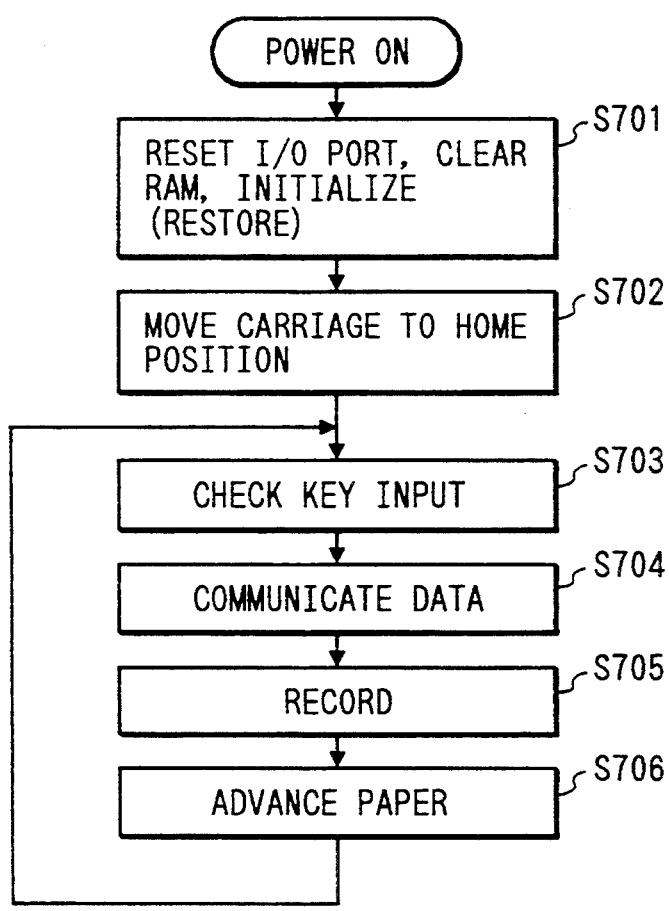
FIG. 27 is a flow chart of the control sequence of the control circuit of the recording apparatus shown in FIG. 23.

In the following the functions of the above-explained configuration are explained, with reference to the flow charts shown in FIGS. 27 to 33. FIG. 27 is a flow chart of the control sequence of the entire apparatus. After the start of power supply, a step S701 executes the setting of I/O ports, clearing of the RAM, setting of the timer, initializing of the recovery system etc. Then a step S702 moves the carriage to the home position, and a step S703 checks the key switches of the recording apparatus. Then a step S704 receives the data from the host computer, then a step S705 records the received data, and a step S706 advances the recording sheet. Subsequently the sequence returns to the step S703, and the steps S703 to S706 are repeated thereafter.

Figure 28:
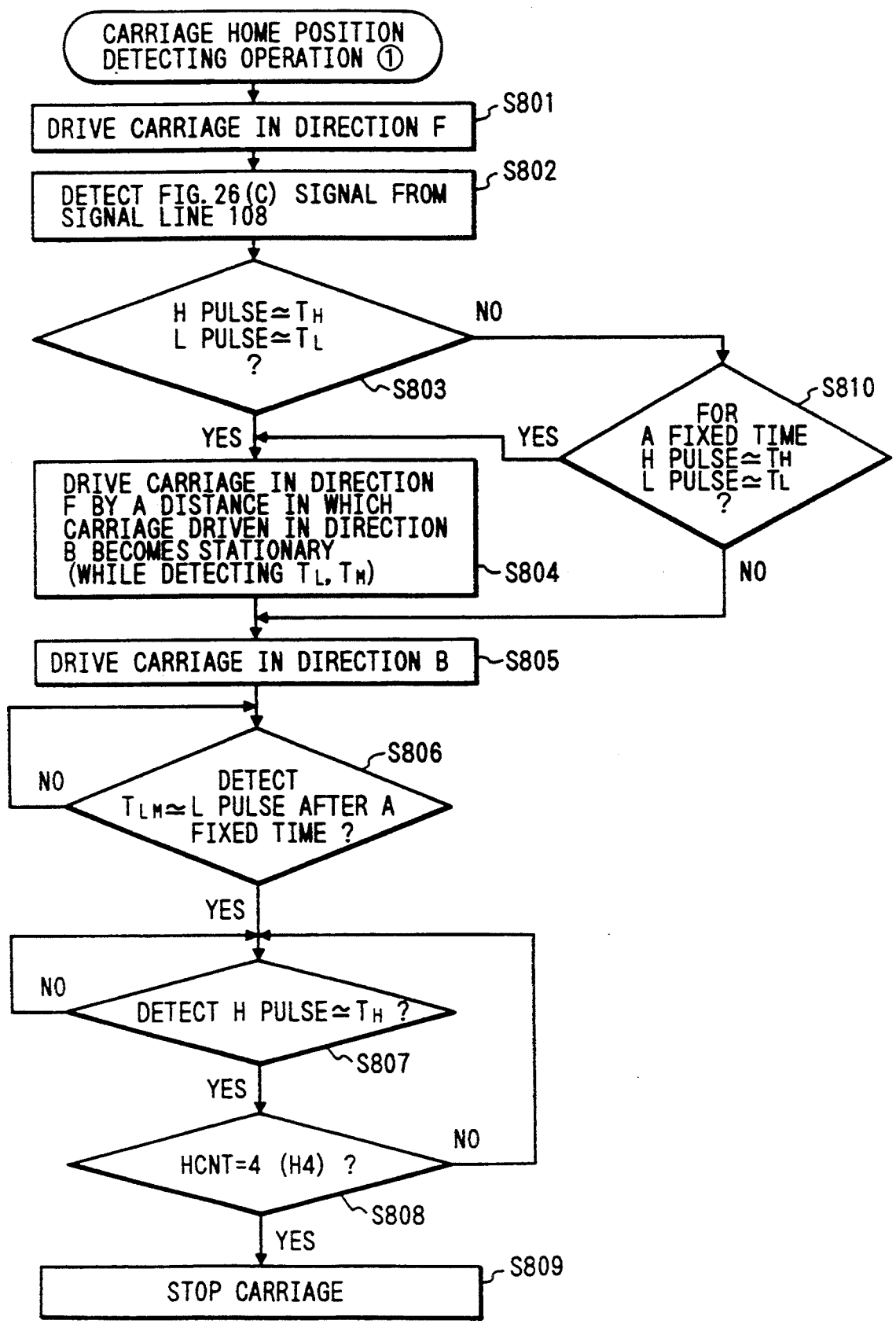
FIG. 28 is a flow chart showing the home position detecting sequence of the carriage in case the carriage position is uncertain, based on various position signals of the magnetic linear encoder shown in FIG. 23.
Figure 29:
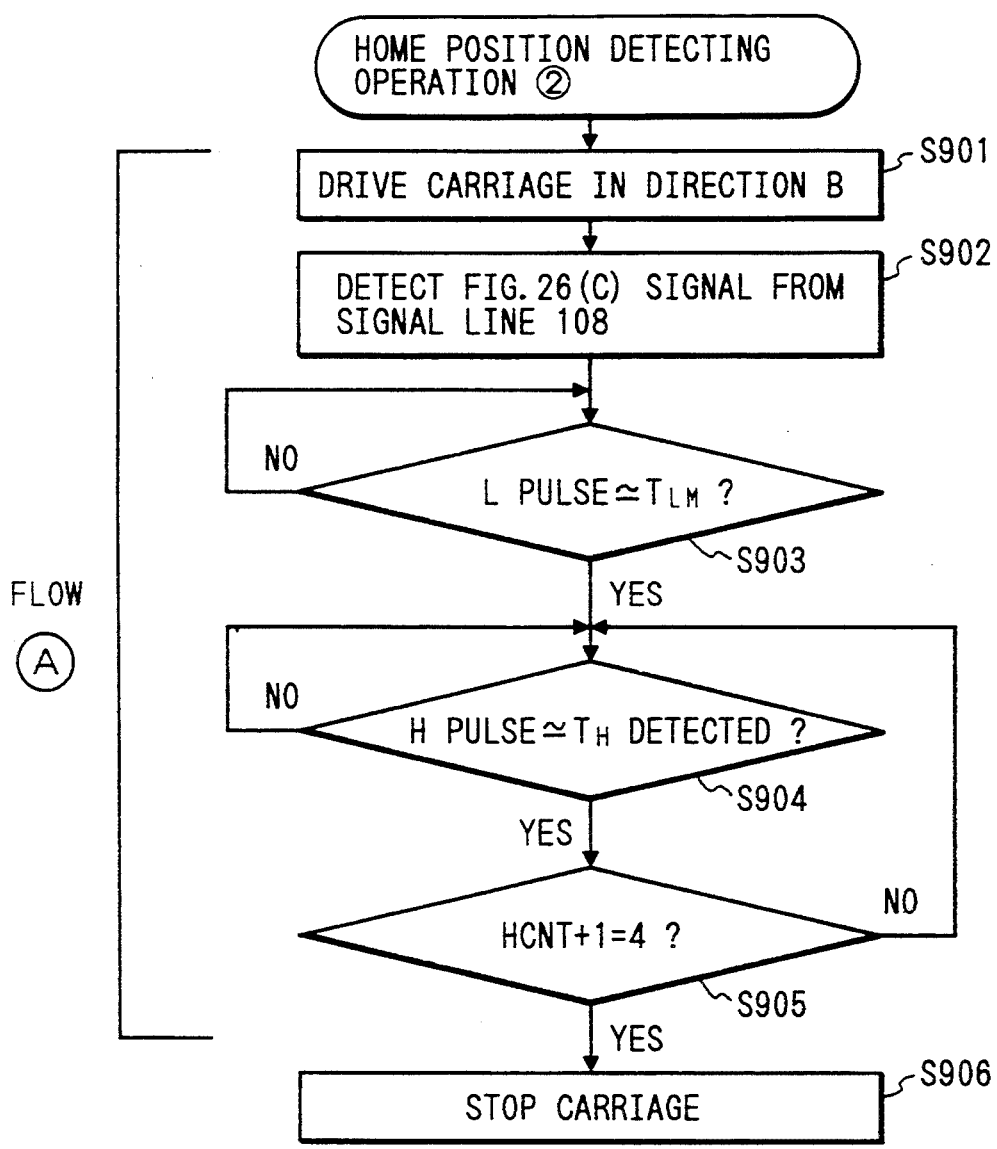
FIG. 29 is a flow chart showing the home position detecting sequence of the carriage in case the carriage is in the recording area, based on various position signals of the magnetic linear encoder shown in FIG. 23.

FIGS. 28 and 29 are flow charts of the home position detecting operation of the carriage, based on various magnetized position signals (cf. FIGS. 26(a) to 26(c)) of the magnetic linear encoder 68. FIG. 28 considers a case that the carriage position is uncertain, and is used for example when the power supply is turned on. Said home position is so defined that the carriage can reach a stationary state before the start of the recording operation when it is started from said home position, and is separated from the recording sheet in order to avoid interference of the sheet with the recording heads at the sheet advancement. In this embodiment, said home position is defined as a position in which the head 62a faces the recovery system 67. Thus the home position is defined by the detection of the magnetized mark 68e by the magnetic head 69, and the recovery operation of the recording head 62a is naturally possible at this position. Stated differently, this position serves as the home position as well as the position for recovery operation.

Now referring to FIG. 28, a step S801 moves to the left (direction F in FIG. 22) with respect to the recording sheet, and a step S802 receives the signal shown in FIG. 26(c) from the signal line 108 shown in FIG. 23, thereby initiating the detection of the carriage position. A step S803 moves the carriage to a position where the high-level pulse period of the input signal in FIG. 26(c) is approximately $T_H$ and the low-level pulse period is approximately $T_L$, in order to move the carriage to the recording area. This operation is conducted by the comparison with a time preset in the timer TM.

In this manner the carriage is once moved from the home position to the recording area, and is then moved in the direction B for detecting the long S magnetization ($T_{LM}$), and the home position is identified by detecting the pulses H1 (corresponding to 68b), H2 (corresponding to 68c), H3 (corresponding to 68d) and H4 (corresponding to 68e) based on the N magnetizations shown in FIG. 26 (c). However, in order to avoid the errors in the detections of the S magnetization in said time $T_{LM}$ and in the carriage stop time and in the start-up time of the carriage drive in the B direction, a step S804 moves the carriage in the F direction over a distance required to reach a constant speed in the carriage movement in the B direction, then a step S805 drives the carriage in the B direction, and a step S806 detects the low-level time $T_{LM}$ based on the S magnetization after a predetermined time (in which the input signal is disregarded for avoiding the erroneous detection). Then a step S807 detects the high level pulses and accumulates the count in an area HCNT in the RAM, and, when a step S808 identifies that the count is equal to "4", indicating the detection of H4 and that the carriage has moved to the position 68e, a step S809 terminates the movement of the carriage.

In case the carriage is initially at the left-end position of the recording apparatus or in a relatively irregular state in the long S magnetization (generally in the capping position), a step S810 drives the carriage in the F direction for a predetermined time. If the high level pulse of $T_H$ and the low level pulse of $T_L$ are detected, the original carriage position is identified to be in the S magnetized portion, and the sequence proceeds to the steps S804 to S809. On the other hand, if said pulses are not detected, the original carriage position is identified to be at the left-end and the sequence proceeds to the steps S805 to S809.

FIG. 29 shows the home position detecting operation from a carriage position in the recording area, where the carriage is stopped after a recording operation. A step S901 drives the carriage in the B direction, and a step S902 receives the detection signal of the head 69 through the signal line 108.

A next step S903 detects the low level pulse time $T_{LM}$ based on the S magnetization, as in the flow chart shown in FIG. 28, but there will be required a long time $T_L$ for the start-up from the carriage stop position, involving danger for erroneous detection. In this case, if $T_{LM}$ is sufficiently longer than the carriage start-up time $T_L$, direct comparison of time is possible. If both periods are comparable, the comparison is interrupted for a predetermined period, and $T_{LM}$ can be detected by the subsequent comparison. Subsequently the detection of the home position is executed, as in the flow chart shown in FIG. 28, by detecting the high level pulses of $T_H$ in a step S904 and detecting the count HCNT=4 or the position 68e in a step S905.

Figure 30:
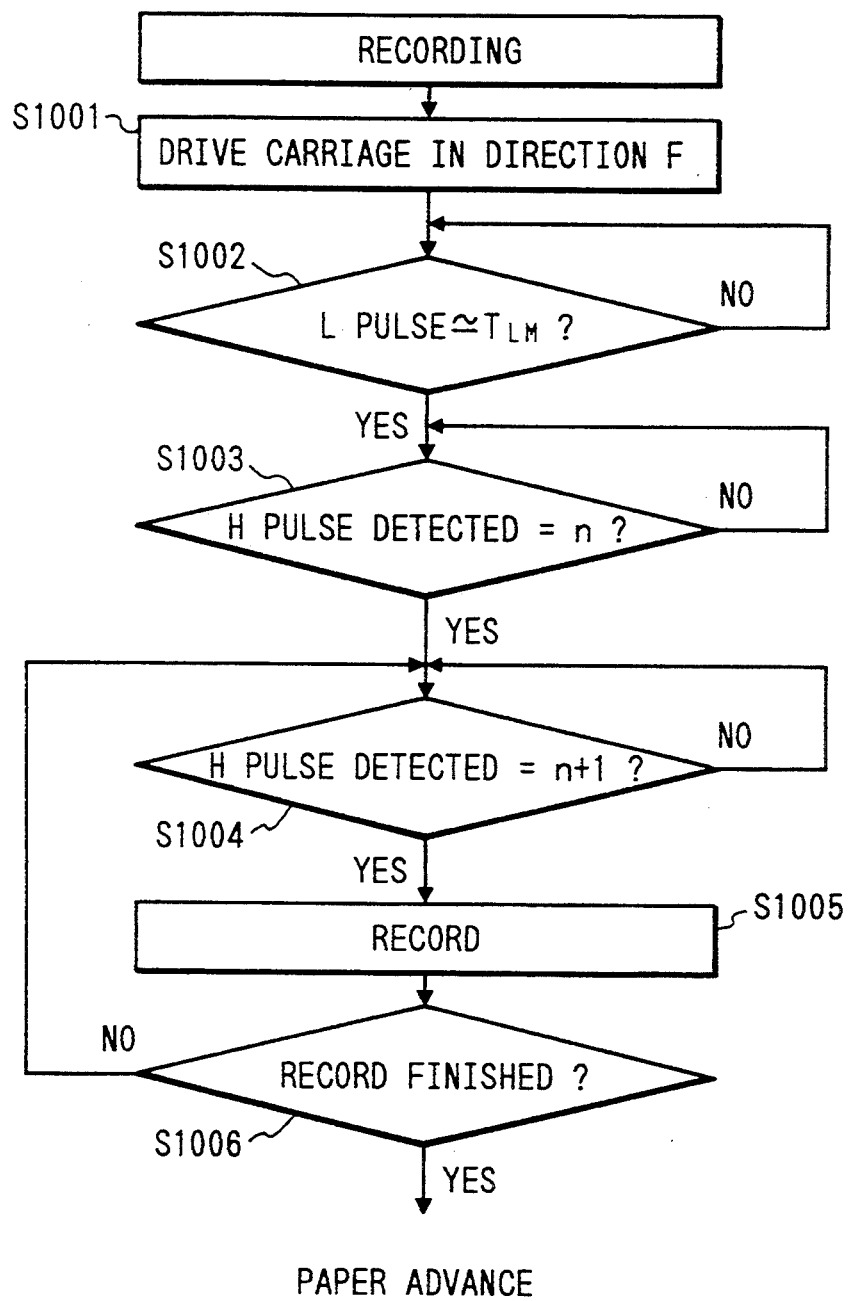
FIG. 30 is a flow chart of the control sequence for recording from the home position of the carriage, based on various position signals of the magnetic linear encoder shown in FIG. 23.

FIG. 30 shows the flow of the recording operation, starting from the home position, by detecting the position 68a. A step S1001 drives the carriage in the F direction, and a step S1002 detects the low level pulse time of $T_{LM}$, through the comparison of the time from the home position with a time preset in the timer TM. Then a step S1003 detects the print position 68a, by counting initial n pulses. When a step S1004 detects an (n+1)-th pulse, a step S1005 effects the recording operation. Thereafter the recording operation is repeated, and, when a step S1006 detects the end of print data, the sequence proceeds to the subsequent sheet advancing step.

Figure 31:
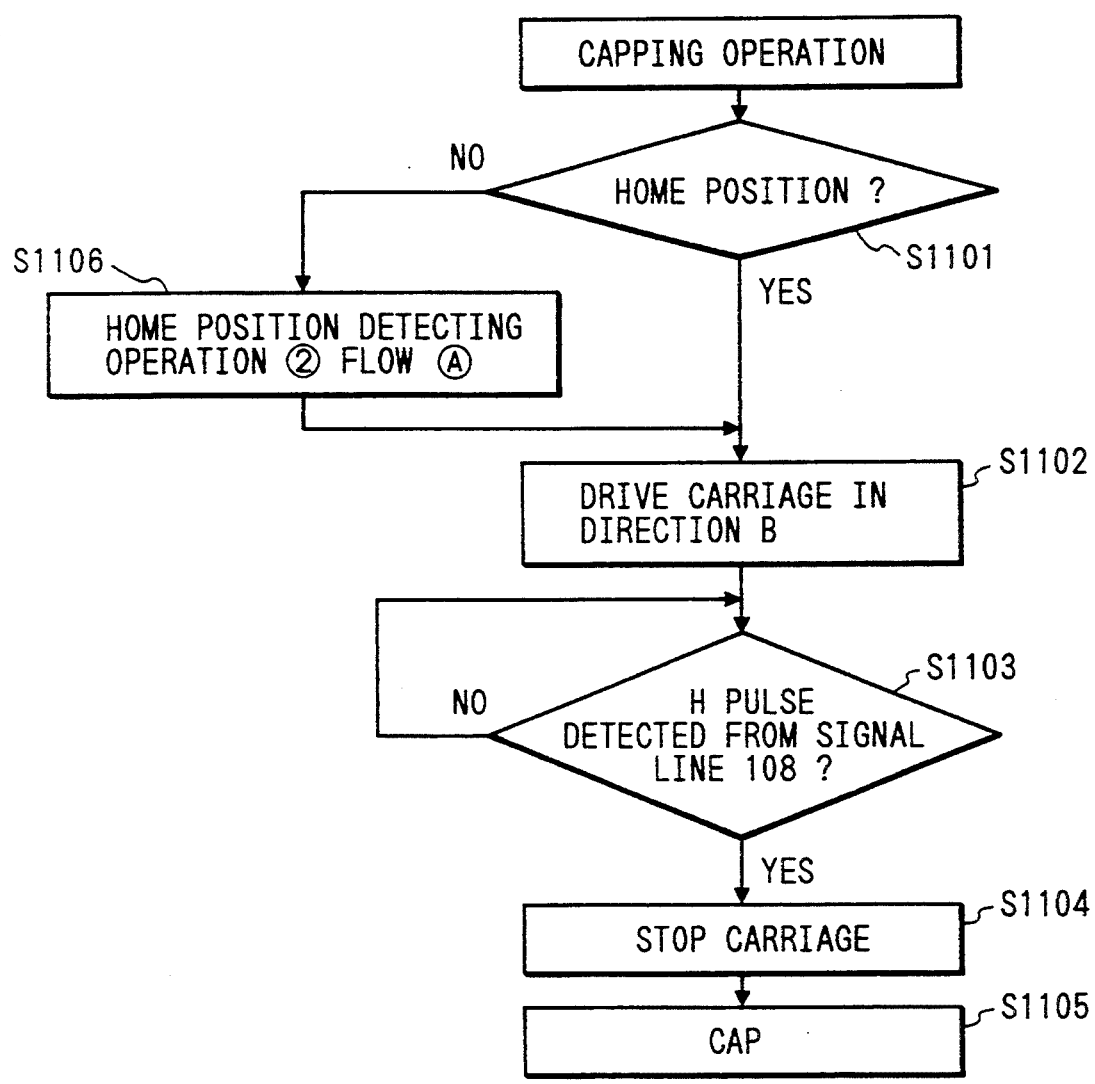
FIG. 31 is a flow chart of the control sequence for the capping of the carriage, based on various position signals of the magnetic linear encoder shown in FIG. 23.

FIG. 31 shows a flow for the capping operation, in which the carriage is moved to a position 68f, further backward from the home position and corresponding to the capping mechanism 74 for capping the heads 62a–62d (cf. FIG. 22). This operation will be explained later.

A step S1101 discriminates whether the carriage is in the home position or in a stopped position after recording. If in the home position, a step S1102 moves the carriage further in the B direction, and a step S1103 detects the next high level pulse from the signal line 108, namely the signal H5 corresponding to the position 68f on the scale, next to the home position signal H4 (cf. FIG. 26(c)). A step S1104 stops the carriage at this position, where the four ink jet heads 62a–62d can be respectively capped. A next step S1105 initiates the capping operation. On the other hand, if the step S1101 identifies that the carriage is in a stopped position after recording, a step S1106 effects the flow A of the home position detecting operation shown in FIG. 29, and then the sequence proceeds to the step S1102.

Figures 32, 32A:
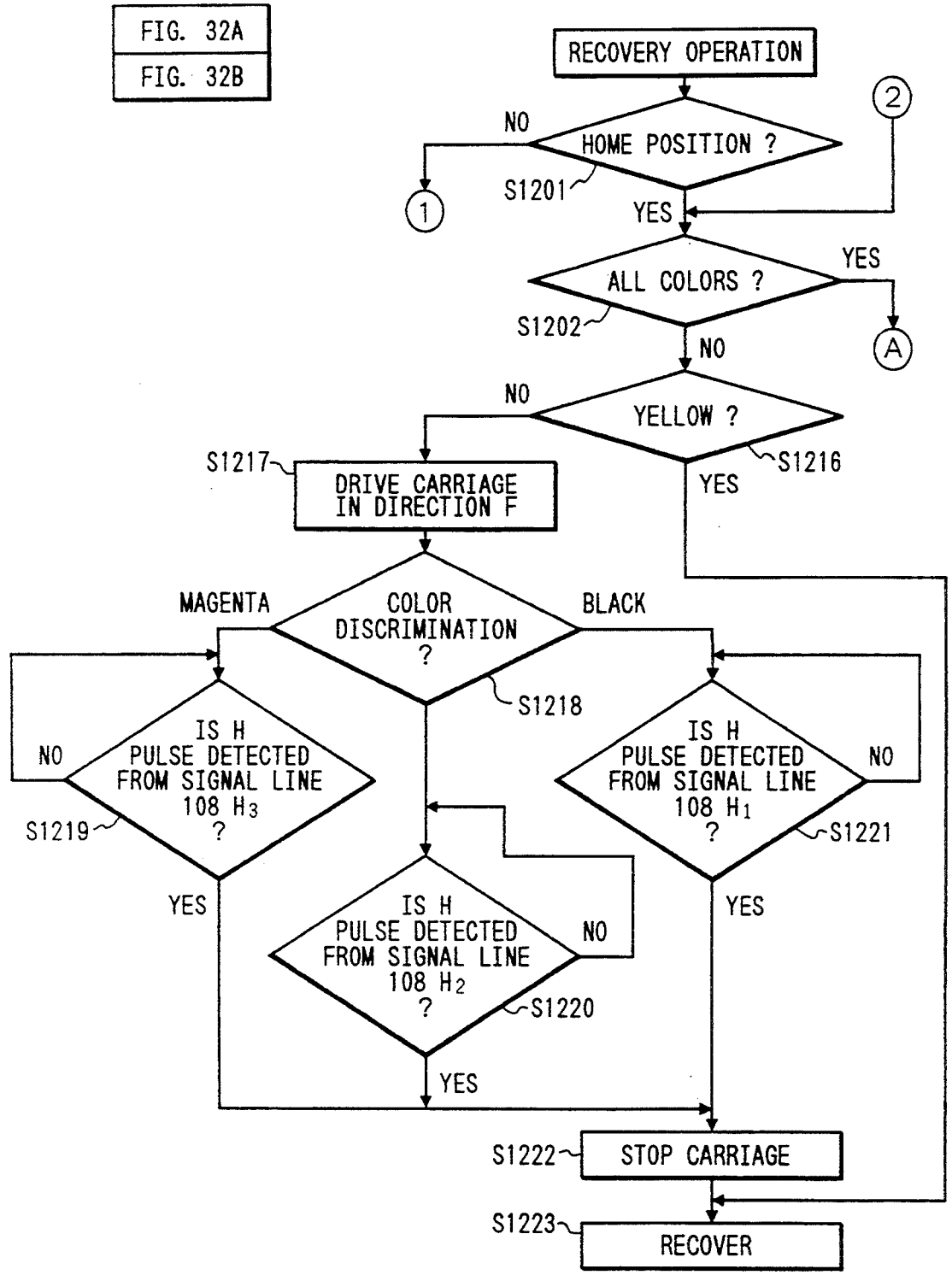
FIG. 32 is comprised of FIGS. 32A and 32B showing flow charts of the control sequence for the recovery operation of the carriage, based on various position signals of the magnetic linear encoder shown in FIG. 23.
Figure 32B:
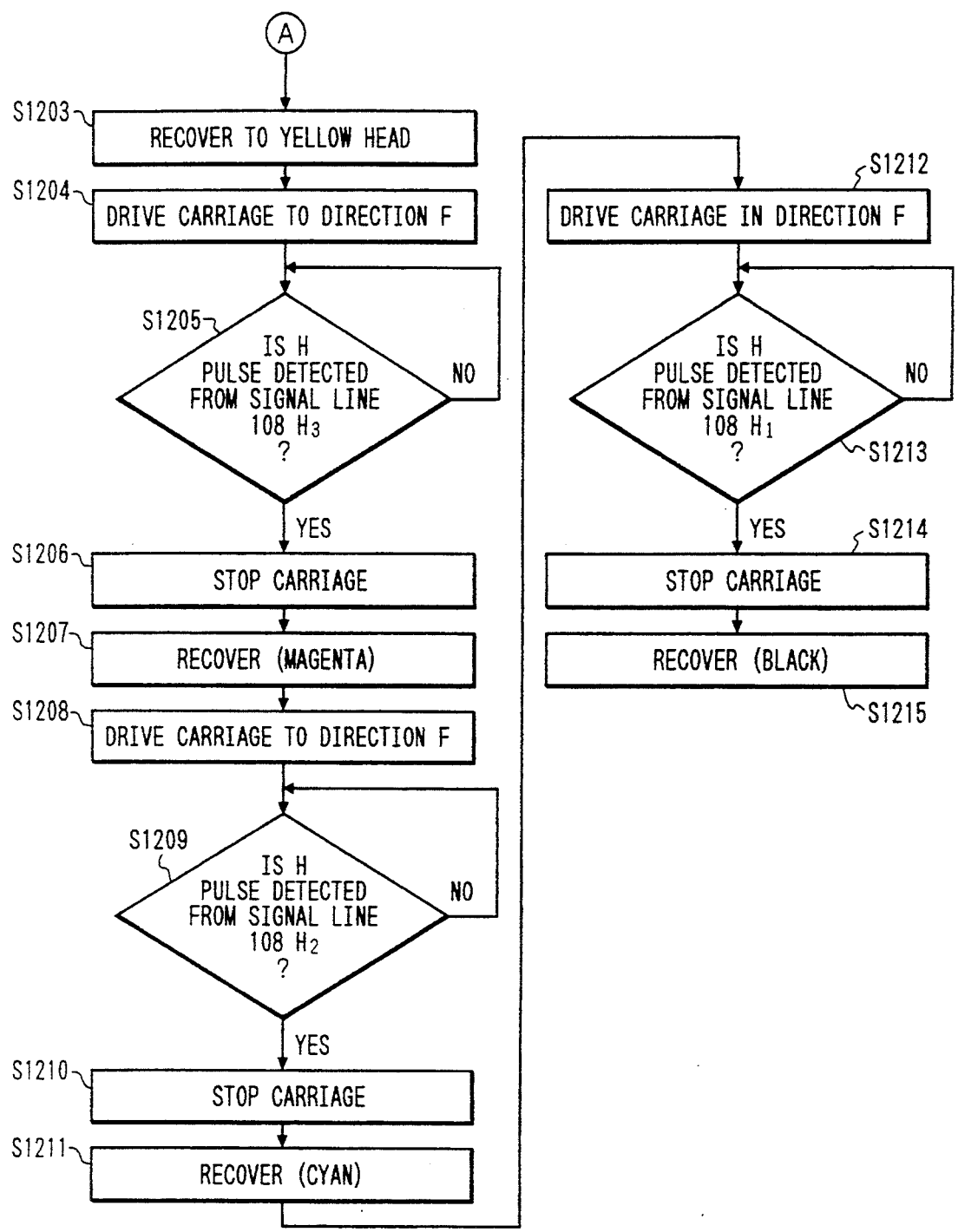
Figure 33B:
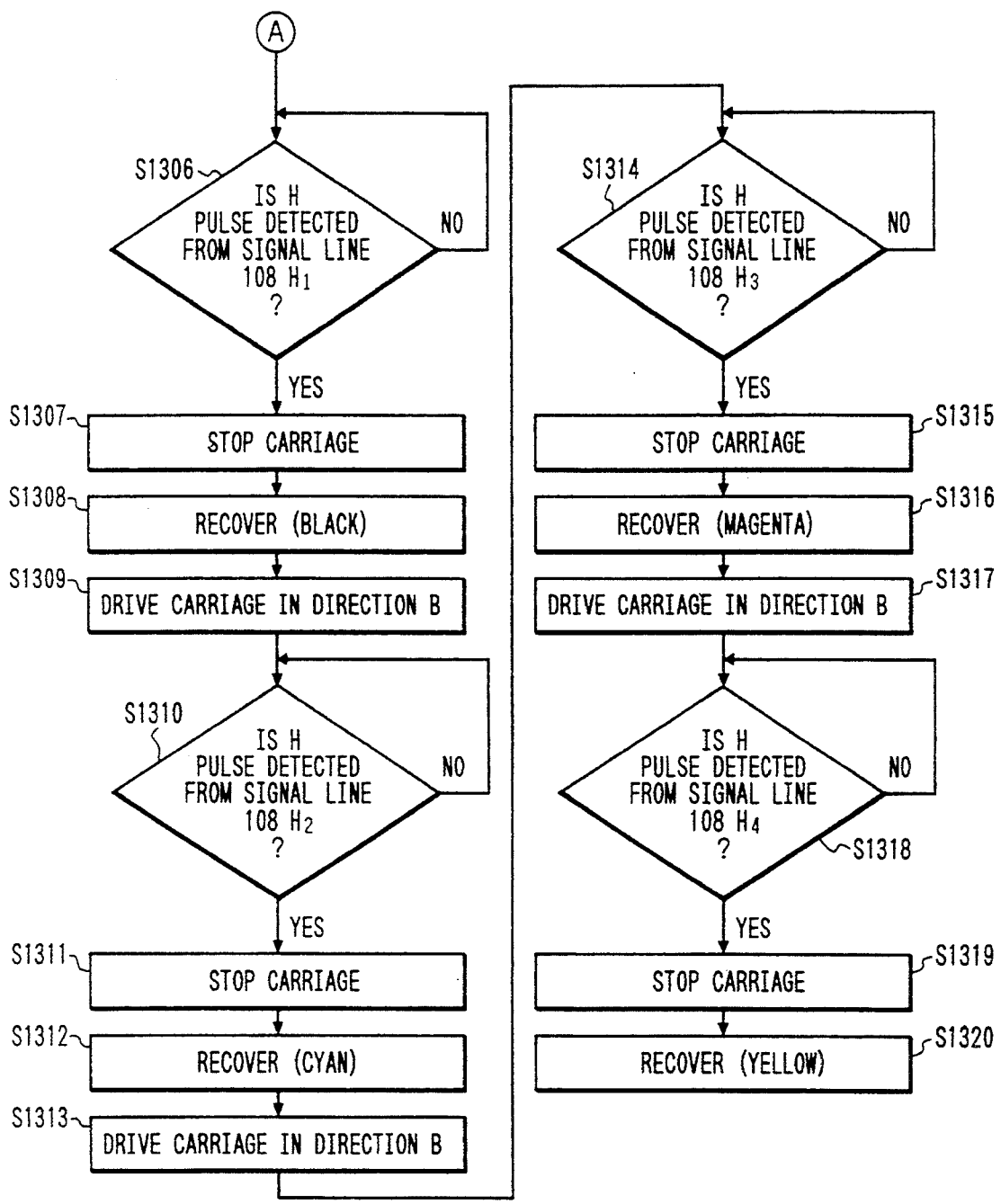
FIG. 33 is comprised of FIGS. 33A and 33B showing flow charts supplemental to the flow charts shown in FIGS. 32A and 32B.

FIGS. 32A and 32B are flow charts for the recovery operation, which is executed by a key input or a command from the host computer. In this operation, the carriage is so moved that the ink jet heads 62a–62d face the recovery system 67. More specifically the yellow head 62a, the magenta head 62b, the cyan head 62c and the black head 62d are respectively at the positions 68e, 68d, 68c, 68b on the scale of the linear encoder.

At first a step S1201 discriminates whether the carriage is in the home position or in a position after recording or in the capping position. If in the home position, a step S1202 discriminates whether the recovery is to be conducted on all the ink jet heads or on one thereof. If the recovery is to be executed on all the heads, the sequence proceeds to a step S1203. As explained in the foregoing, the home position corresponds to the position 68e (signal H4) on the scale, where the recovery operation can be applied to the yellow head 62a. Thus the recovery system is activated to the yellow head to effect ink suction from said head 62a. Then, in order to effect the recovery operation on the magenta head, a step S1204 moves the carriage in the direction F, then a step S1205 detects the next high level pulse (duration $T_H$) from the signal line 108, and a step S1206 stops the carriage. The recovery operation for the magenta head is executed in this position. Subsequently the recovery operations for the cyan and black heads are executed in a similar manner in steps S1208 to S1215.

On the other hand, if the step S1202 identifies that the recovery operation is to be executed for one of the heads, said operation is executed by moving the head to one of the positions 68b–68e.

At first a step S1216 discriminates whether the recovery operation is to be conducted on the yellow head, and, if yes, a step S1223 executes said operation for the yellow head. If no, a step S1217 moves the carriage in the F direction and a step S1218 discriminates the head to be recovered. If it is the magenta head, a step S1219 detects the next high level pulse H3 corresponding to the head position 68d, then a step S1222 stops the carriage, and a step S1223 executes the recovery operation. Also if the cyan head is to be recovered, a step S1220 detects the pulse H2, or if the black head is to be recovered, a step S1221 detects the pulse H1. Then a step S1222 or S1223 stops the carriage, and a step S1223 executes the recovery operation.

On the other hand, if the aforementioned step S1201 identifies that the carriage is not in the home position, the sequence proceeds to a step S1301 in FIG. 33A, for discriminating whether the carriage is in the capping position or in a stopped position after recording in the recording area.

If the step 1301 in FIG. 33A identifies that the carriage is in the capping position, a step S1302 drives the carriage in the F direction, and a step S1303 detects the home position of the yellow head by the next signal H4 from the signal line 108. Subsequently the sequence returns to a branch (2) in FIG. 32A, in order to effect the recovery operation for all the colors or for a color.

In case the aforementioned step S1301 identifies that the carriage is stopped in the recording area, a step S1304 moves the carriage in the B direction toward and home position, and a next step S1305 discriminates whether the recovery operation is to be executed for all the ink jet heads or for one thereof.

In case of recovery for all the ink jet heads, the recovery operation is executed from black head toward yellow head since the carriage has been moved in the B direction. At first a step S1306 detects the position 68b, corresponding to the black head 62d, by detecting the high level pulse H1 after the low level pulse of a period $T_{LM}$, then a step S1307 stops the carriage and a step S1308 executes the recovery operation for the black head 62d.

Then a step S1309 drives the carriage further in the B direction, then a step S1310 detects the next high level pulse H2 corresponding to the next position 68d, a step S1311 stops the carriage and a step S1312 effects the recovery operation for the cyan head 62c. Subsequent steps S1313–S1320 effect the carriage movement in the B direction, carriage stopping in response to the detections of the high level pulses H3, H4 and the recovery operations for the ink jet heads. In this manner the recovery operations are executed on all the ink jet heads.

On the other hand, if the step S1305 identifies that the recovery operation is to be executed on one of the heads, a step S1321 discriminates whether the recovery operation is to be executed on the black head that can initially enter the recovery operation. If it is black head, a step S1322 detects the pulse signal H1 corresponding to the position 68b on the scale, then a step S1323 stops the carriage and a step S1324 executes the recovery operation. If it is not the black head, a step S1328, S1327 or S1326 detects the signal H2, H3 or H4 for the cyan, magenta or yellow head, then the step S1323 stops the carriage and the step S1324 executes the recovery operation.

In the foregoing example, the magnetized pattern for the recording operation and the magnetized patterns indicating the absolute positions for specified functions such as recovery operation, home positioning and capping are provided on a same line. In the following there will be explained another example in which the magnetized pattern for the recording operation is formed as a separate magnetized line, in order to facilitate the carriage control.

Figure 34:
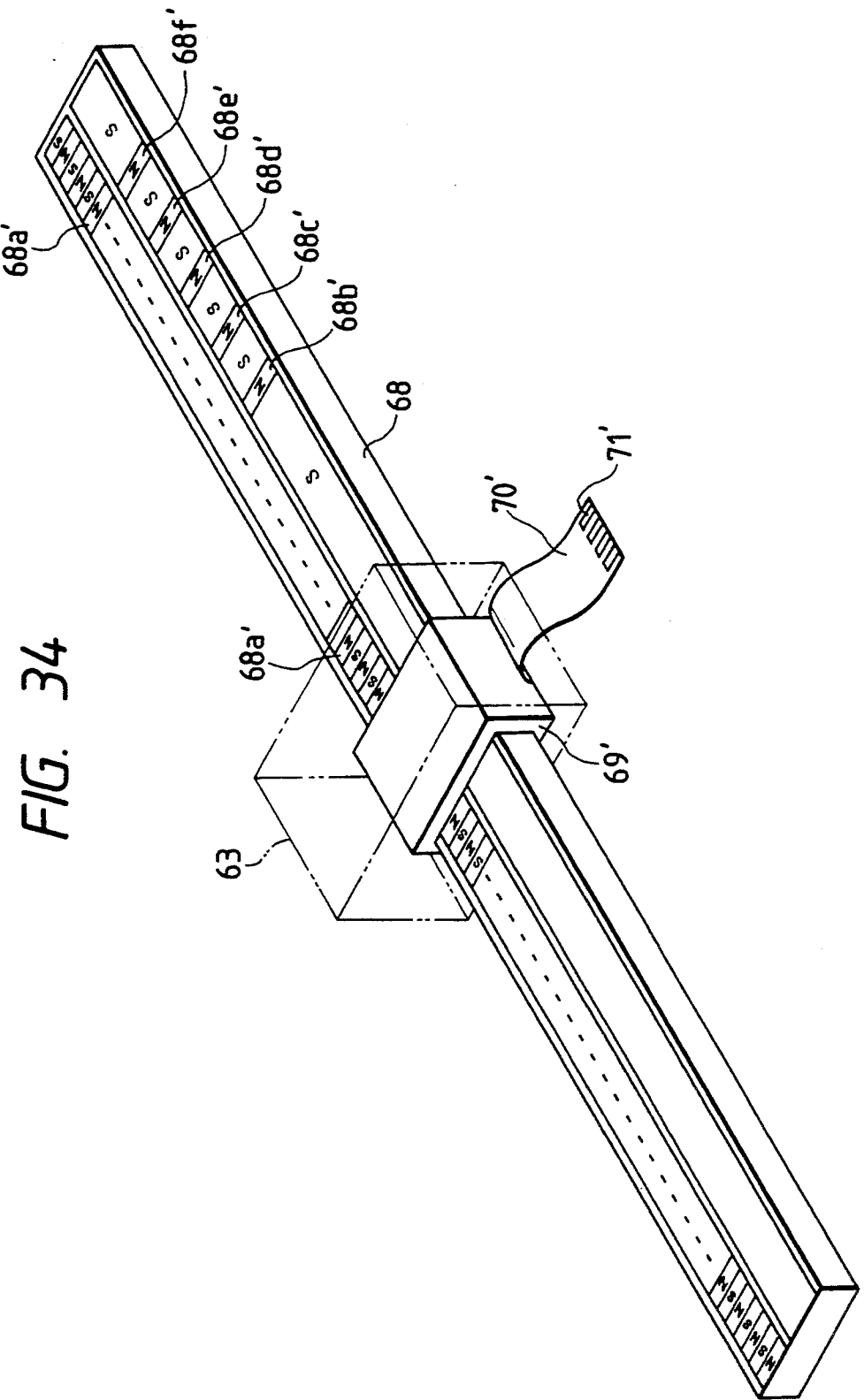
FIG. 34 is a perspective view showing another example of the magnetic linear encoder shown in FIG. 25.

FIG. 34 illustrates a magnetic linear encoder with plural magnetized lines on a magnetic member of a rectangular cross section. A line is magnetized in a portion 68a', with a magnetic pattern of a pitch corresponding to the recording dot positions in the normal recording operation, while another line is magnetized at positions 68b', 68c', 68d', 68e', 68f' corresponding to the absolute positions for the recovery, capping, home position etc. The magnetic patterns on these lines are read by the circuit on the board 72, through a magnetic head 69' incorporating two MR devices, the flexible circuit board 70' and the contact portion 11', and are processed in the circuit shown in FIG. 23. The reading of said two lines is achieved by two sets of the reading circuit shown in FIG. 5 or 24, and such circuits are incorporated in the head 69' and the board 72.

FIGS. 35 (a1) to 35 (c2) show the magnetic patterns for recording and for the absolute positions for other functions, shown in FIG. 34, and the output wave forms obtained by the detection circuit shown in FIG. 5 or 24. More specifically, FIG. 35(a1) shows the magnetic pattern for recording; FIG. 35(a2) schematically shows the magnetized absolute positions for other functions; FIG. 35(b1) shows the input signals to the comparators 107, obtained by the detection of magnetization for recording with an MR device; FIG. 35(b2) shows the input signals to the comparator (not shown), obtained by the detection of the magnetization for absolute positions for the specified functions, obtained by another MR device; FIG. 35(c1) shows the output wave form of the comparator 107, obtained by comparison with the reference voltage supplied to the other input terminal thereof; and FIG. 35 (c2) shows the output wave form of the comparator, obtained by comparison with the reference voltage supplied to the other input terminal thereof.

Figure 36:
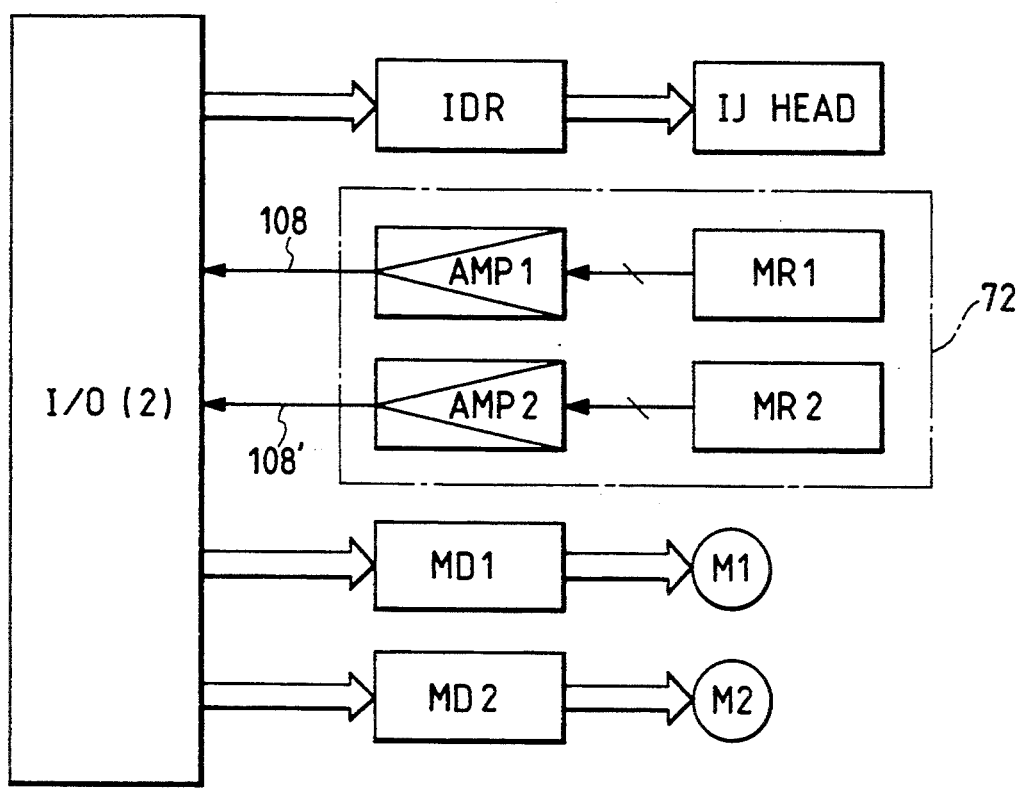
FIG. 36 is a block diagram of a part of the control circuit of a recording apparatus provided with the magnetic linear encoder shown in FIG. 34.

These output signals are read by the MPU shown in FIG. 23, through the signal lines 108, 108' and the port I/O(2) shown in FIG. 36, and the operations of printing, recovery, capping, home positioning etc. are executed in respective positions according to a program stored in the ROM.

Figure 37:
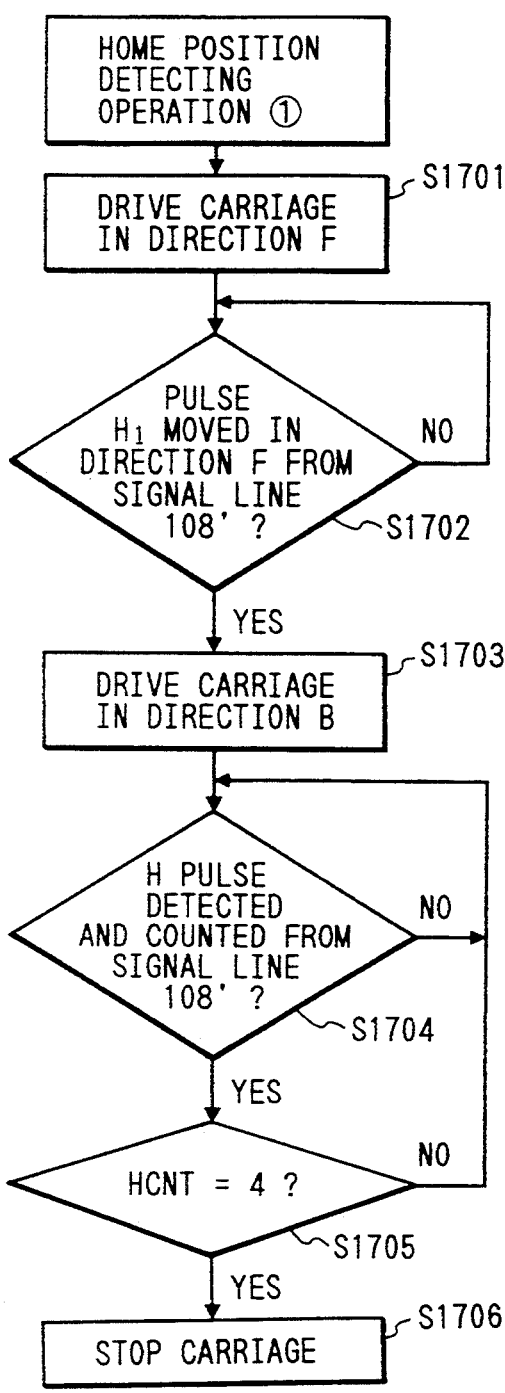
FIG. 37 is a flow chart of the home position detecting sequence of the carriage when the carriage position is uncertain, based on various position signals of the magnetic linear encoder shown in FIG. 34.
Figure 38:
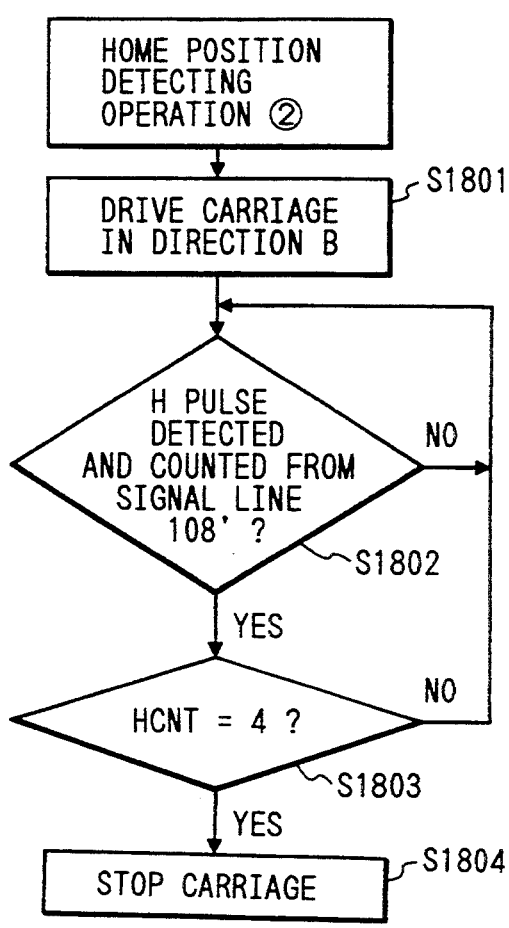
FIG. 38 is a flow chart of the home position detecting sequence of the. carriage when the carriage is in the recording area, based on various position signals of the magnetic linear encoder shown in FIG. 34.

FIGS. 37 and 38 are flow charts of the home position detecting operation, based on the magnetic linear encoder shown in FIG. 34 and the output signals shown in FIGS. 35 (a1) to 35 (c2) . The flow of the recording operation is same as that shown in FIG. 27.

FIG. 37 contemplates a case in which the carriage is in the capping position or in the position of the recovery system, including the home position. At first a step S1701 moves the carriage in the F direction. Then a step S1702 counts the high level pulses from the signal line 108' and compares the low level period after the signal H1', thus confirming that the carriage has been moved to the F direction from the position H1', upon detection of a period sufficiently longer than the low level period between H1' and H5'. Then a step S1703 moves the carriage in the B direction, and a step S1704 detects the high level pulses from the signal line 108' and accumulates the count in the HCNT area of the RAM as already explained before. In response to the detection of HCNT=4 in a step S1705, namely the signal H4 corresponding to the position 68e on the scale, and a step S1706 stops the carriage at this position constituting the home position. As explained in the foregoing, this home position also serves as the recovery position for the yellow ink jet head.

FIG. 38 shows the home position detecting operation from a carriage stopped position in the recording area. A step S1801 moves the carriage in the B direction, and a step S1802 detects the high level pulses from the signal line 108' and accumulates the count in the HCNT area of the RAM. Then, in response to the detection HCNT=4 in a step S1803, a step S1804 stops the carriage at this home position.

Figure 39:
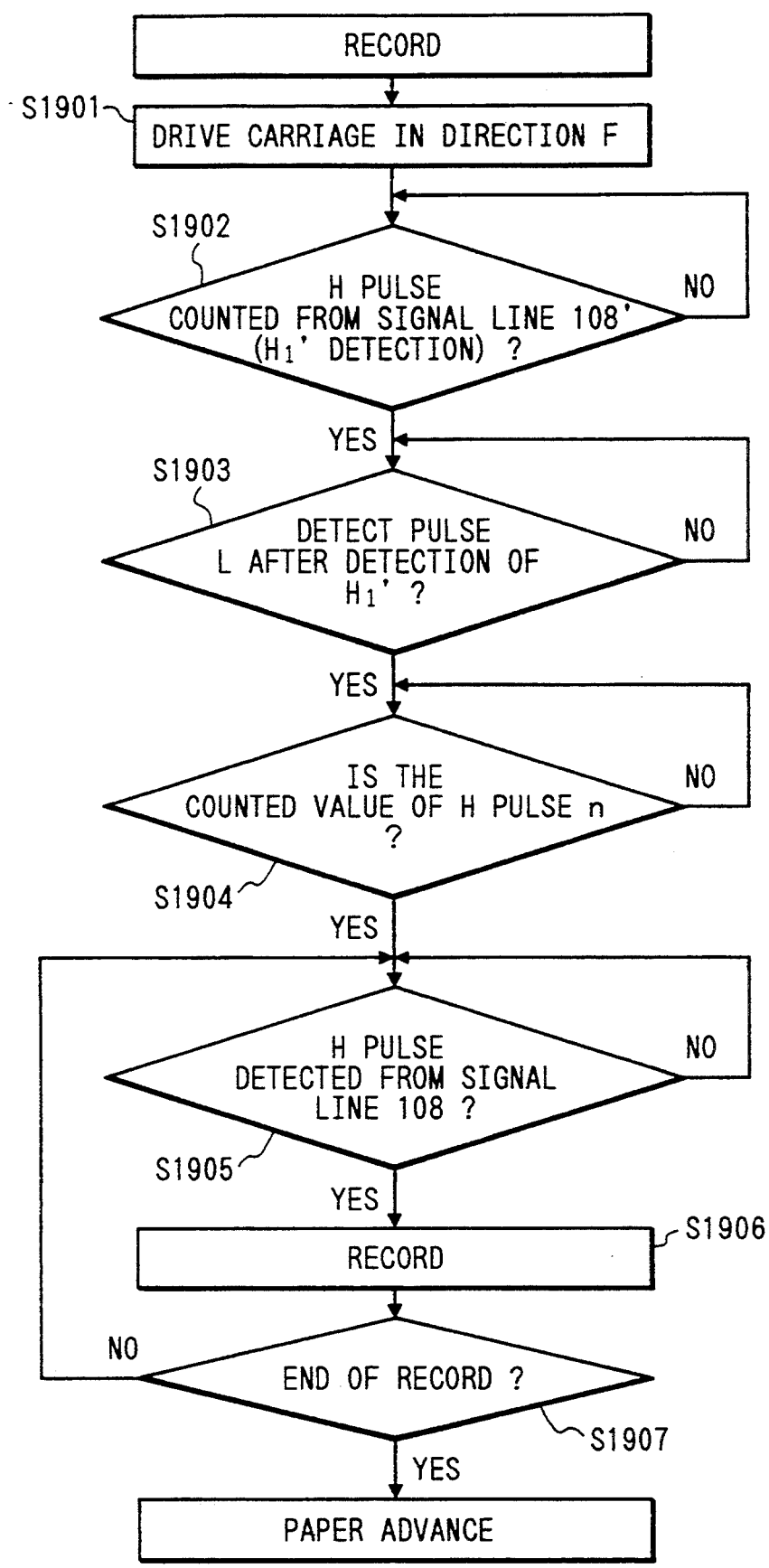
FIG. 39 is a flow chart of the control sequence for recording from the home position, based on various position signals of the magnetic linear encoder shown in FIG. 34.

FIG. 39 is a flow chart of recording operation, starting from the home position, as explained in the foregoing, and the recording operation in this flow chart is executed by detection of the recording positions 68a'. A step S1901 drives the carriage in the F direction, and a step S1902 counts the high level pulses from the signal line 108' in order to detect the position H1'. If HCNT=4 at the home position, the count of the subsequent high level pulses is substracted, and the position H1' is detected when the count reaches "1". A next step S1903 detects the subsequent low level pulse, and a step S1904 detects the high level pulse in FIG. 35(c1), namely a signal corresponding to 68a', from the signal line 108. Thus said step S1904 detects the pulses P1, P2, P3 and accumulates the count in a PCNT area provided in the RAM, until said count reaches n. Then, in response to the detection of the (n+1)-th high level pulse in a step S1905, a step S1906 effects the recording operation. A next step S1907 discriminates whether the recording operation is completed, and, if not, the sequence returns to the step S1905. When the completion of recording of the image data in the RAM is identified, the sequence proceeds to the next step for sheet advancement.

Figure 40:
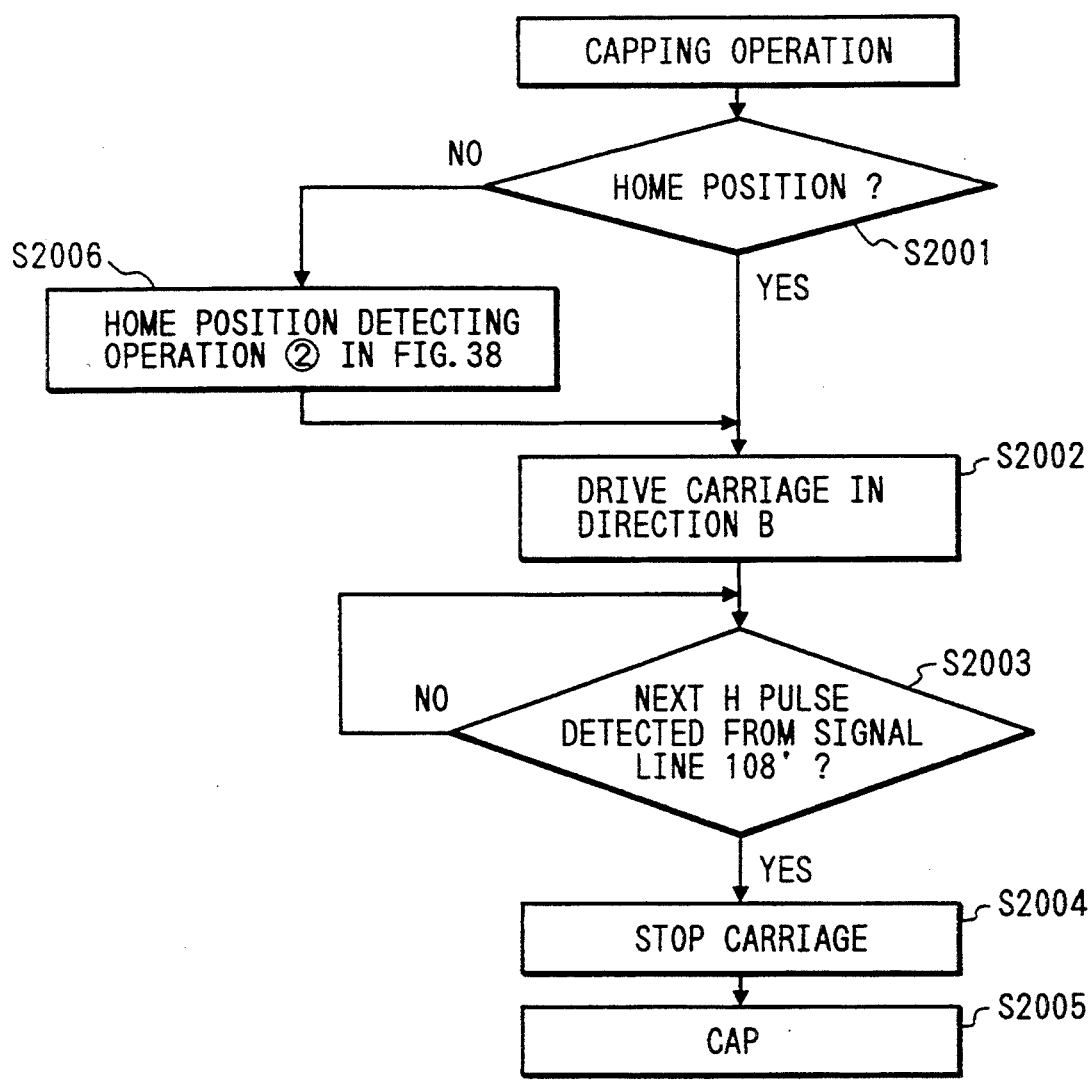
FIG. 40 is a flow chart of the control sequence for the capping operation of the carriage, based on various position signals of the magnetic linear encoder shown in FIG. 34.

FIG. 40 is a flow chart for capping operation. In this flow chart, the carriage is moved to the position 68f in such a manner that the capping mechanism (cf. FIG. 22) is opposed to the ink jet heads 62a-62d, and the capping operation is executed as explained before, in response to the signals from the signal line 108'. A step S2001 discriminates whether the carriage is in the home position or in a stopped position after recording, and, if in the home position, a step S2002 drives the carriage further in the B direction, and a next step S2003 detects the next high level pulse from the signal line 108', corresponding to the position H5 next to the position H4 in FIG. 35(c2). This position H5 corresponds to the position 8 on the scale, at which the ink jet heads 62a-62d are opposed to the capping mechanism 74 and can therefore be capped.

A step S2004 stops the carriage, and a step S2005 initiates the capping operation. If the step S2001 identifies that the carriage is stopped in the recording range after a recording operation, the sequence proceeds to a step S2006 for effecting the flow (2) of the home position detecting operation in FIG. 38, and then to the above-mentioned step S2002.

Also if the carriage is stopped at the position for recovery operation, the position H5 is detected by counting the high level pulse from the respective head position, and the capping operation is executed thereafter.

Figure 41B:
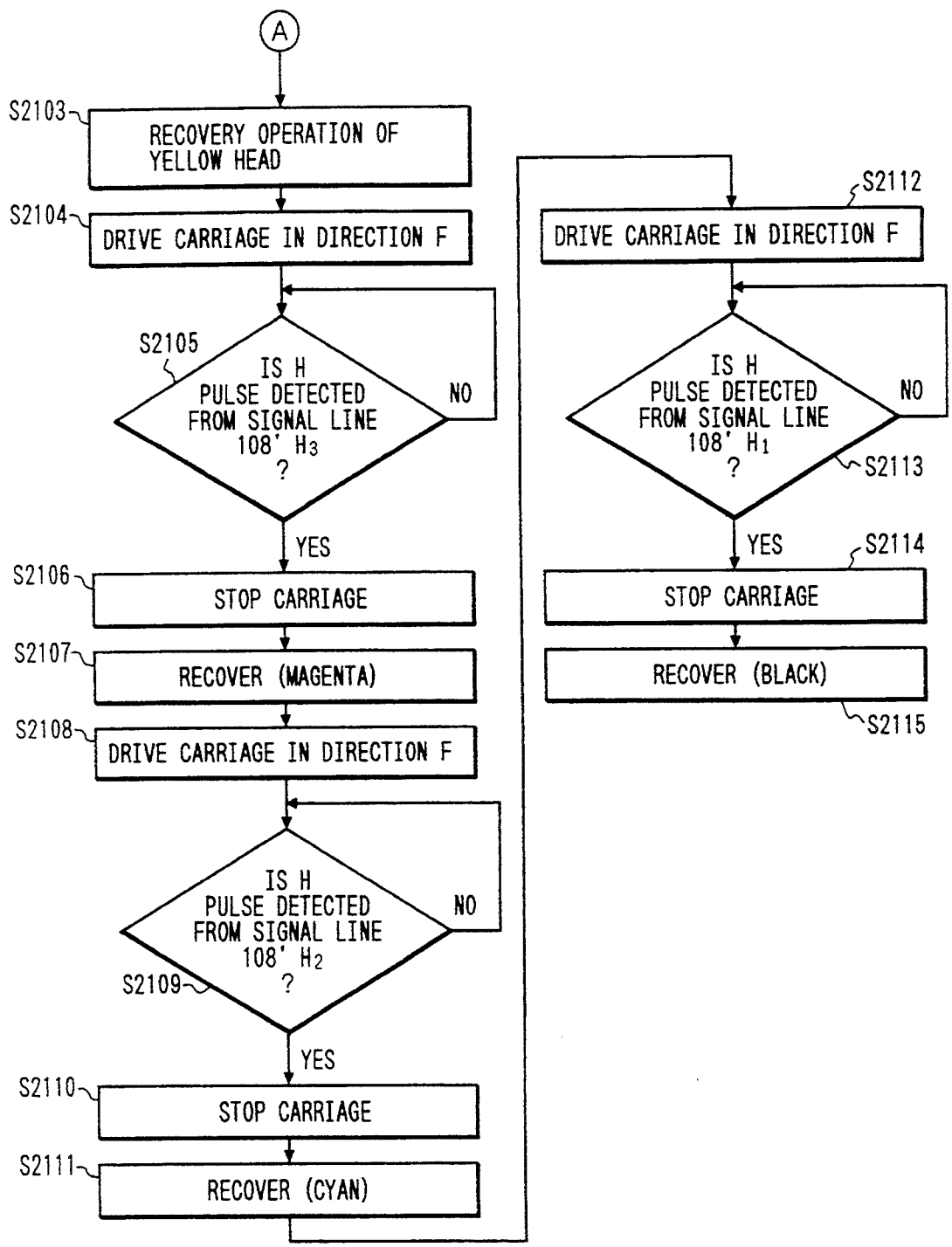
FIG. 41 is comprised of FIGS. 41A and 41B showing flow charts of the control sequence for the recovery operation of the carriage, based on various position signals of the magnetic linear encoder shown in FIG. 34.
Figure 42B:
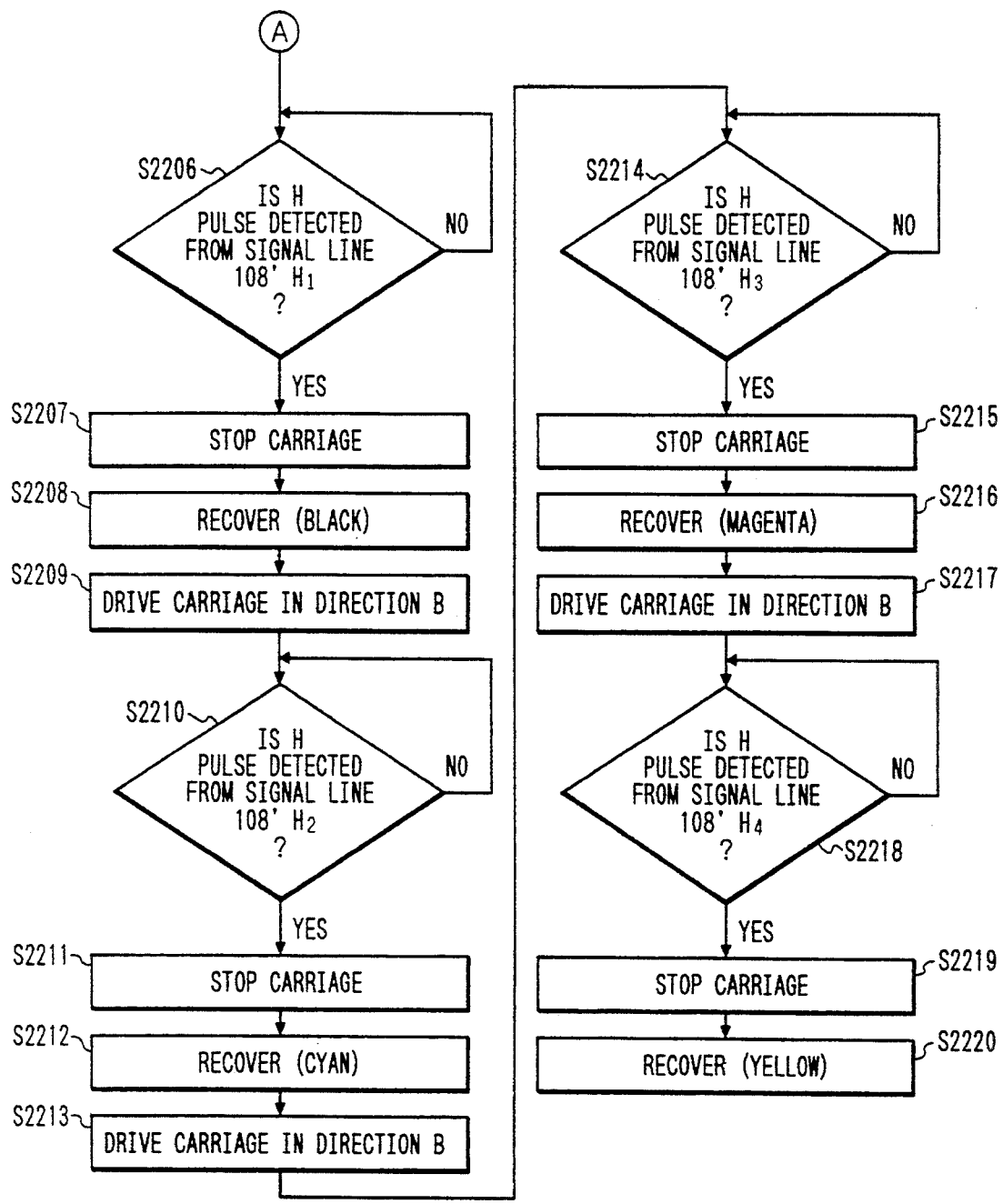
FIG. 42 is comprised of FIGS. 42A and 42B showing flow charts supplemental to the flow charts shown in FIGS. 41A and 41B.

FIG. 41 comprised of FIGS. 41A and 41B, and FIG. 42, comprised of FIGS. 42A and 42B, are flow charts for the recovery operation, in which the carriage positions H1'-H4' are detected by the signals from the signal line 108'. Said positions H1'-H4' respectively correspond to the ink jet heads 62a-62d as explained before, and the recovery operations for respective ink jet heads are rendered possible by said position detections.

The flow charts shown in FIGS. 41A to 42B are similar to those shown in FIGS. 31 to 32B except that, in FIGS. 31 to 32B, the positions H1-H4 are detected by the signals from the signal line 108 while, in FIGS. 41A to 42B, the positions H1'-H4' are detected by the signals from the signal line 108'. For this reason these flow charts will not be explained further. However, the detection of the position H1' starting from the stopped position in the recording range is made easier than the detection of the position H1 in FIGS. 33A and 33B, because the detection of $T_{LM}$ is unnecessary.

Figure 43A:
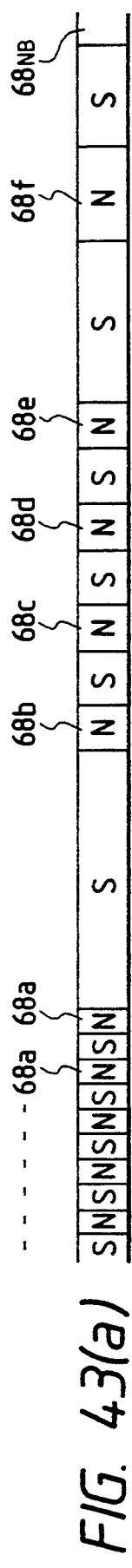
FIGS. 43(a) and 43(c) are views showing another example of magnetization of the scale of the magnetic linear encoder shown in FIG. 25 and a wave form chart of the detected outputs.

In the foregoing example, the magnetized portions (N poles) for the recording operation and those for the positions for other functions have a same width on the scale of the linear encoder. FIGS. 43(a) to 44(c2) show other examples of the scale in which the positional information for the recording operation and that for other functions are magnetized with different widths.

Figure 43C:
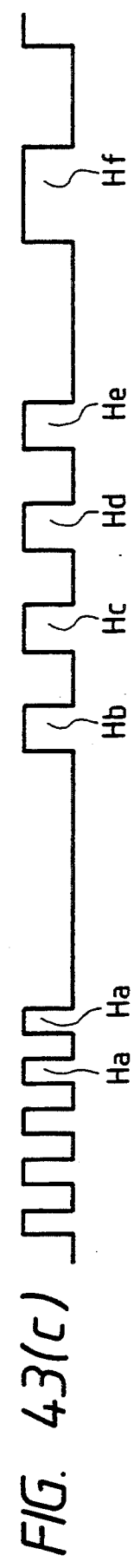

More specifically, the N poles indicating the positions for specified functions are magnetized with a larger width. As shown in FIGS. 43(c), 44(c1) and 44(c2) (wave forms corresponding to FIGS. 26(b), 35(b1) and 35(b2) being omitted for the purpose of simplicity), the high level pulses Ha in the recording area, those Hb-He representing the position for recovery system and the home position, and the high level pulse Hf indicating the capping position are mutually different in duration, and the detection of the positional information can be further facilitated by including the comparison of such pulse duration.

Also as shown in FIGS. 45(a1) to 45(c2), in plural lines, the pitch of magnetization may be maintained constant in each line but is made larger in the line for the specified functions since said line does not require a high precision. In this manner the preparation of the scale of the linear encoder can be facilitated. In such case, the positional information for the specified functions may be limited to the positions for such specified functions, and the magnetized portions may be shortened in such case. Also the positions Hb-Hf can be detected by the counting of the high level pulses. More specifically, by moving the carriage from the B direction in FIGS. 45(a1) to 45(c2) and counting the high level pulses H1, H2,..., the high level signal H6 corresponds to the capping position 68f, or Hf in FIGS. 43(a), 43(b), 44(a1) to 44(c2). Also the synchronization between the recording positions and the specified position is facilitated if the width of the positional information for the specified functions in selected as a multiple of that of the pulse relating to the recording operation.

In the foregoing examples, the positional information is represented by an N magnetization while other portions are S magnetized, but the portions not related to the positional information need not be magnetized. FIGS. 46(a) to 46(c) illustrate a configuration including the positional information and the non-magnetized portions on a same line. In FIG. 46(a), there are provided a magnetized portion 68a for the recording operation; positions 68b, 68c, 68d, 68e for recovery operations including the home position; and a capping position 68f; and unmagnetized portions $68_{NB}$.

FIG. 46(b) shows the input signal to the comparator 107, obtained by reading the above-explained magnetized portions with the MR device in the magnetic head 69, and FIG. 46 (c) shows the output signal to the line 108, obtained by comparison with the reference voltage, which is selected higher because the non-magnetized portion provides a wave height between those of the N and S poles.

The operations of home positioning, recording, recovery, capping etc. can be executed in a similar manner as explained before, utilizing the output signal shown in FIG. 46(c). Thus the various functional operations can be attained by constructing the scale of the magnetic linear encoder in the above-mentioned manner, without magnetization in the unnecessary portions.

FIGS. 47 to 53(b) show other examples of the scale of the magnetic linear encoder adapted for use in the recording apparatus, and the output signals thereof. In these examples the magnetic portion of said scale is provided with a stepped portion.

Figure 47:
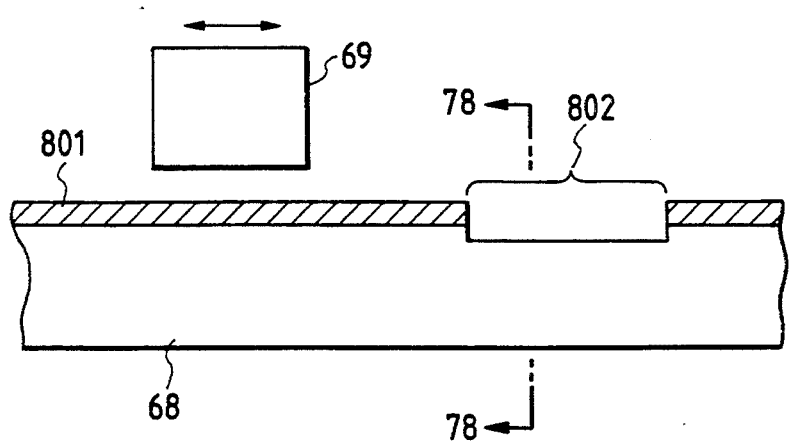
FIG. 47 is a cross-sectional view of a scale, provided with a stepped portion, of the magnetic linear encoder shown in FIGS. 43(a) and 43(c)
Figure 48:
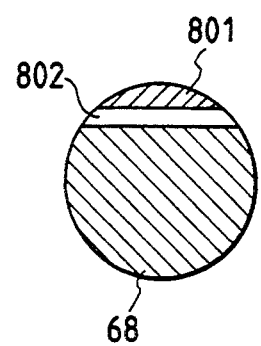
FIG. 48 is a cross-sectional view, along a line 78—78 of the scale of the magnetic linear encoder shown in FIG. 47.

FIG. 47 is a cross-sectional view of a rod-shaped scale, and FIG. 48 is a cross-sectional view along a line 78—78 in FIG. 47. In these drawings, a magnetized portion 801 of the scale 68 is formed by longitudinal magnetization of the external periphery of said scale, and, in said magnetized layer, there is provided a partial step (notch) 802 so formed as to completely remove the magnetized layer in the radial direction. Thus, in reading the magnetized pattern by moving the magnetic head 69 along the scale, the MR device in the magnetic head (not shown in FIGS. 47, 48) provides a zero output in said stepped portion 802, whereby the absolute position of said stepped portion can be obtained.

Figure 49:
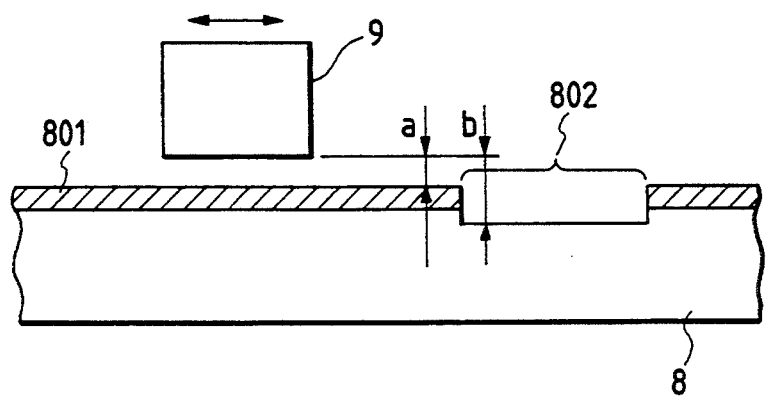
FIG. 49 is a cross-sectional view of another example of the scale, provided with the stepped portion, of the magnetic linear encoder shown in FIG. 47.

FIG. 49 is a cross-sectional view of the scale which is similar to that shown in FIG. 47, but is different in the depth of said stepped portion. In FIG. 49, said stepped portion is formed by partially eliminating the magnetized layer in the radial direction. The distance a between the MR device of the magnetic head 69 and the upper face of the magnetized portion 801, and the depth b of the step are so selected that the distance a is readable with said magnetic head but the distance b is not readable. The selection of the values a, b depends on the sensitivity of the MR device and the magnetic field intensity of the magnetized portion, but there is only required a basic relationship a<b. For example, for a relation b≧1.2a, the output of the MR device in the portion a becomes 1.44 times of the output in the portion b, whereby the distinction is facilitated. Also for a relation b ≧√2·a, the output of the MR device in the portion b becomes about 2 times of the output in the portion a, whereby the distinction is further facilitated and achieved in stable manner.

Figure 50:
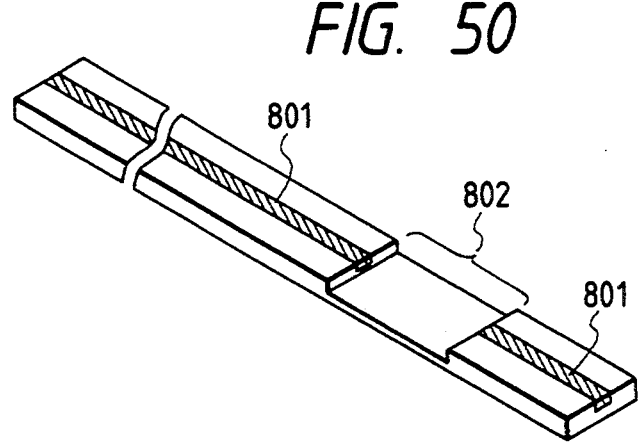
FIG. 50 is a perspective view of still another example of the scale, provided with the stepped portion, of the magnetic linear encoder shown in FIG. 47.

FIG. 50 is a perspective view of still another example of the scale of the magnetic linear encoder. In this example, different from the scales shown in FIGS. 47 to 49, the scale is shaped as a plate bearing a magnetized portion 801, including a stepped portion 802. The depth of stepped portion may be so selected, as explained in the foregoing, as to completely or partially eliminate the magnetized layer.

Figure 51A:
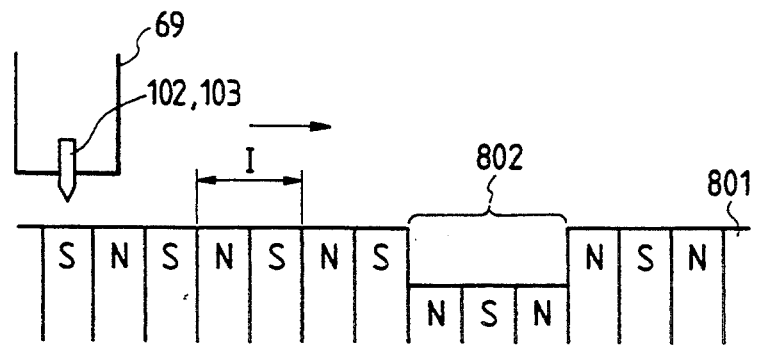
FIGS. 51(a) and 51(b) are a view showing an example of magnetization of the scale of the magnetic linear encoder, provided with the stepped portion, shown in FIG. 50 and a wave form chart of the detected output.
Figure 51B:
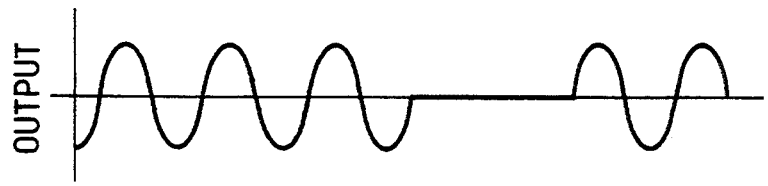

FIG. 51(a) shows the scale of this example, and FIG. 51(b) shows the output signal obtained from said scale. The magnetized portion 801 is magnetized alternately with the S and N poles, with a pitch 1. When the MR devices 102,103 of the magnetic head move along said scale, there is obtained an output signal shown in FIG. 51(b). Thus, in the magnetized portion, there is obtained a sinusoidal wave of a cycle time 1, and, in the stepped portion 802, there is obtained an unspecified (zero) output. The absolute position of the stepped portion 802 can be determined by detecting said zero output.

Figure 52A:
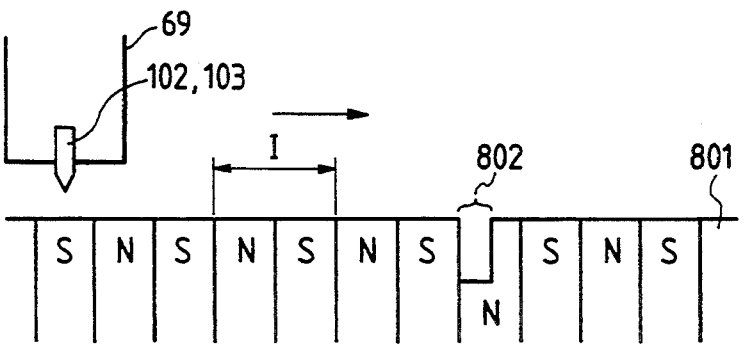
FIGS. 52(a) and 52(b) are views for explaining the width of the stepped portion, affecting the output wave form, of the magnetic linear encoder shown in FIGS. 51(a) and 51(b).
Figure 52B:
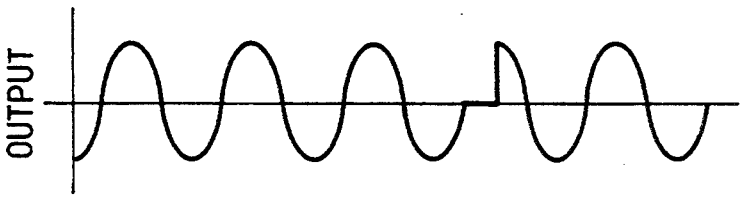

However, if the stepped portion 802 is less than a half of the pitch of magnetization as shown in FIG. 52(a) (the stepped portion being about ¼ of the pitch), there is still obtained an output because the zero output corresponding to said stepped portion is limited, so that the detection of the absolute position becomes impossible. Consequently the width of the stepped portion should be at least ½ of the pitch of the magnetization.

FIGS. 53(a) and 53(b) show a scale having two stepped portions 802 in the magnetized portion 801, and the output signal therefrom. In the illustrated example, two stepped portions have mutually different widths (different by ½ of the magnetization pitch), thus enabling to detect the absolute positions thereof.

As explained in the foregoing, the third embodiment of the present invention is featured by forming the position information relating to the recording operation and the absolute position information such as of the recovery system for ink jet heads or the capping position on the scale of a single magnetic linear encoder, thereby achieving advantages of easy detection of the absolute positions, elimination of the various switches which have been indispensable in the conventional configuration, ease of control and cost reduction, and thereby enabling to provide a simple recording apparatus of a low cost.

Also the pitch of magnetization in the magnetized portion for other functions is selected as a multiple of that in the magnetized portion for the recording operation, in order to facilitate the synchronization, and such magnetization may be made only in the required portions. In this manner there can be obtained a recording apparatus of easier control and of a further reduced cost.

Furthermore, the magnetized portion of the scale of the magnetic linear encoder may be provided with a stepped portion, for providing similar effects in the recording apparatus.

Figure 54:
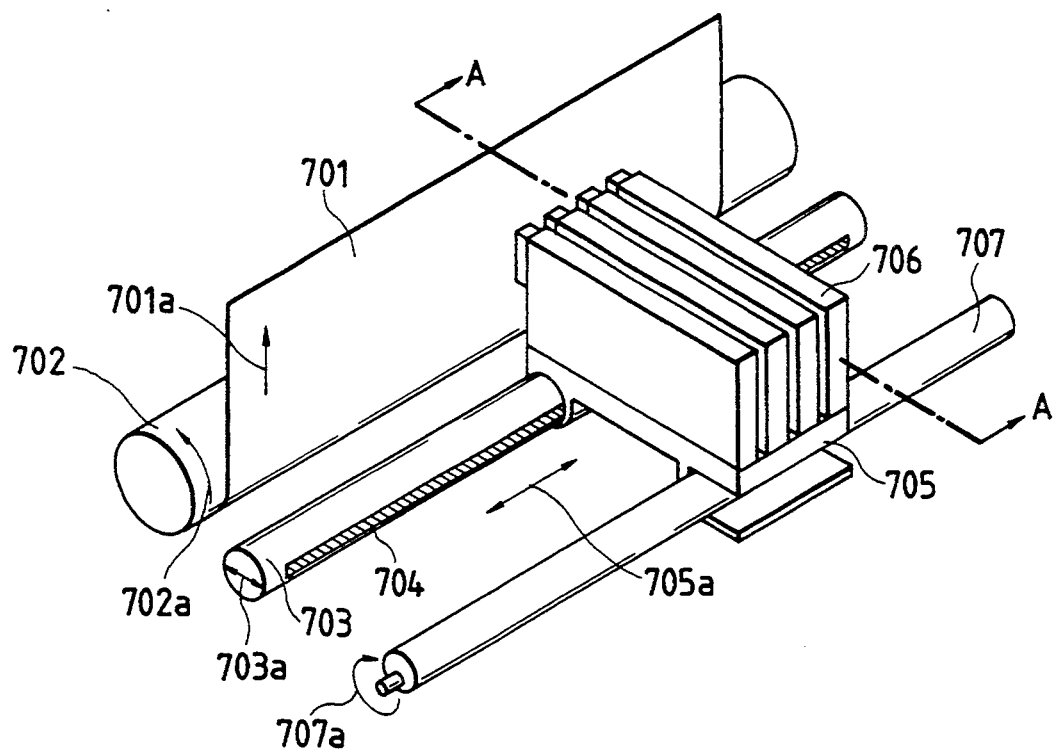
FIG. 54 is a perspective view of a recording apparatus employing a magnetic linear encoder, constituting a fourth embodiment of the present invention.

In the following there will be explained a fourth embodiment of the present invention. FIG. 54 shows the principal portion of a recording apparatus, in which shown are a recording sheet 701; a feed roller 702 for advancing the recording sheet 701; a guide shaft 703 positioned opposed to the feeding roller 702; a scale 704 of a magnetic linear encoder provided on said guide shaft 703; a carriage 705 movable along the guide shaft 703; a recording head 706 mounted on said carriage 705, for effecting the recording operation on the recording sheet 701; and a support shaft 707 rotatably mounted about the guide shaft 703, for maintaining the position of the carriage 705.

In the above-explained configuration, the recording sheet 701 is advanced to a predetermined position by the rotation of the feed roller 702 in a direction 702a, and is thereafter advanced by a predetermined amount in a direction 701a, at each recording of a line by the recording head 706. On the guide shaft 703 positioned opposed to the feed roller 702, there is provided the scale 704 of a magnetic material, magnetized with a small pitch. The carriage 705 moves in the direction 705a along the guide shaft 703, and the recording head 706 mounted on said carriage 705 forms recording on the recording sheet 701, according to the position and speed of said carriage 705. In this operation, the position and speed of the carriage 705 are detected by a detection unit of the magnetic linear encoder, mounted on said carriage 705 and adapted to read the information on said scale 704.

Figure 55:
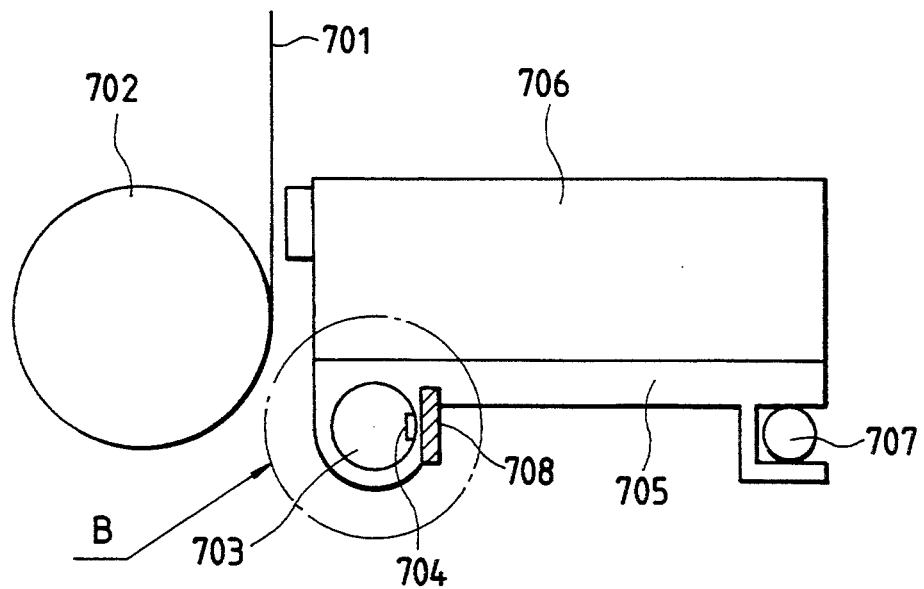
FIG. 55 is a cross-sectional view, along a line A—A, of the recording apparatus shown in FIG. 54.
Figure 56:
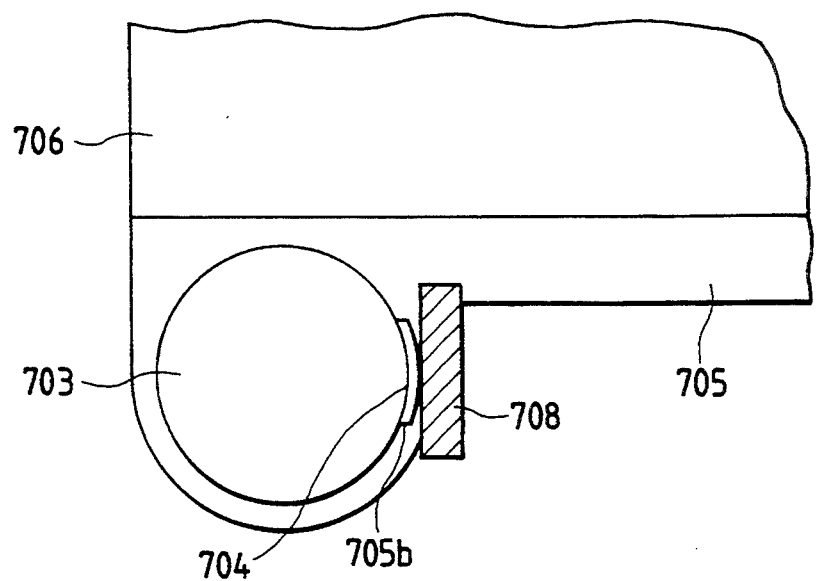
FIG. 56 is a detailed view of the; magnetic head, indicated as a portion B, of the recording apparatus shown in FIG. 55.

Now reference is made to FIGS. 55 and 56 for explaining the details of the magnetic linear encoder. In FIG. 55, components 701–707 are same as those shown in FIG. 54. A detection unit 708 of the magnetic linear encoder, mounted on the carriage so as to oppose to the scale 704, incorporates a magnetic resistance (MR) device.

In the configuration shown in FIG. 56, the scale 704 of the linear encoder is shaped as a strip of a thickness of 10 to 300 microns, and is fixed on the guide shaft 703 by means for example of adhesive material or a two-side sticking tape. In order to avoid the damage on said scale 704 by the carriage 705 moving there-along, the carriage 705 is provided with a recess 705b. The detection unit 708 is mounted on the carriage 705 so as to maintain a predetermined distance from the scale 704. The output signal of said detection unit 708 is taken out by lead wires (not shown) or a flexible cable (not shown).

The above-explained configuration, in which the scale of the magnetic linear encoder is incorporated as a part of the guide shaft, simplifies the assembling operation and does not require an additional space for said scale, thereby realizing a more compact apparatus. Also since the detection unit of the linear encoder is mounted on the carriage, the precision of the gap between said detection unit and the scale is easier to assure, thereby the precision of detection by said linear encoder can be improved, and the recording apparatus can achieve the recording of higher quality. Also the recording apparatus can be prepared more inexpensively, because the assembling of the linear encoder into the apparatus is made simpler and the precision of the gap between the scale and the detection unit can be more easily assured.

Figure 57:
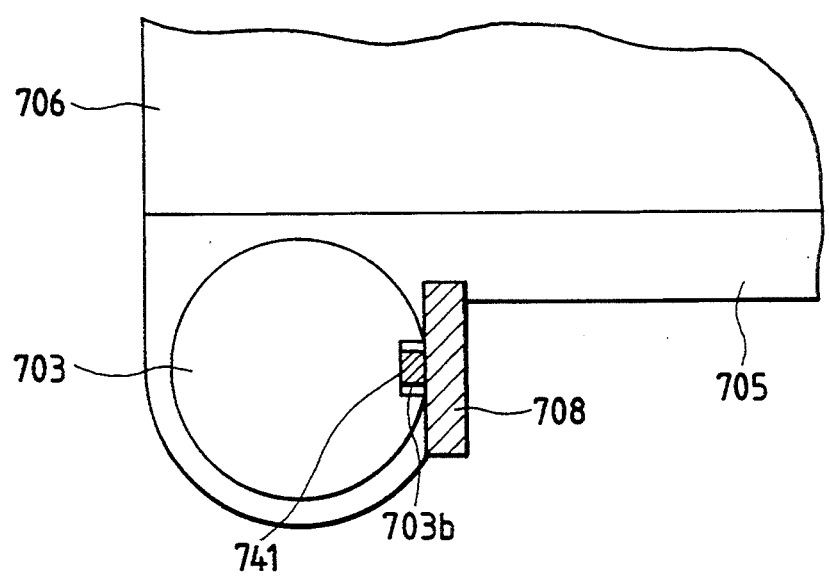
FIG. 57 is a view showing a second example of the apparatus shown in FIG. 55.

FIG. 57 illustrates another example of the configuration shown in FIG. 55, wherein the scale 741, provided on the guide shaft 703 is shaped differently from the scale 704 in the first example shown in FIG. 56. Said scale 741 is shaped as a plate, and the guide shaft 703 is provided with a groove 703b for securely supporting said scale 741, which is fixed to said guide shaft 703 by means of adhesive material, both-side sticking tape or screws. The configuration of this example is identical with that of the first example, except for the shape of the scale 741 and the groove 703b formed on the guide shaft 703. This configuration provides the same effects as those in the first example.

Figure 58:
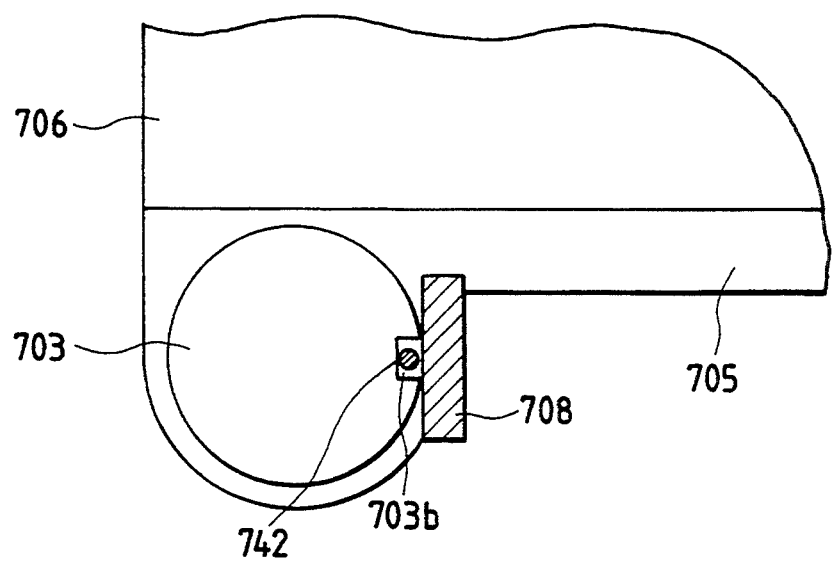
FIG. 58 is a view showing a third example of the apparatus shown in FIG. 55.

FIG. 58 shows a third example of the apparatus shown in FIG. 55, wherein a scale 742, mounted on the guide shaft 703, is shaped differently from the scale 704 in the first example. Said scale 742 is shaped as a rod, and the guide shaft 703 is provided with a groove 703b for accommodating said scale 742. The scale 742 is fixed to said guide shaft 703 by means for example of adhesive material. This configuration is identical with that of the first example except for the shape of the scale 742 and the groove 703b provided in the guide shaft 703, and this configuration provides the same effects as those of said first example.

Figure 59:
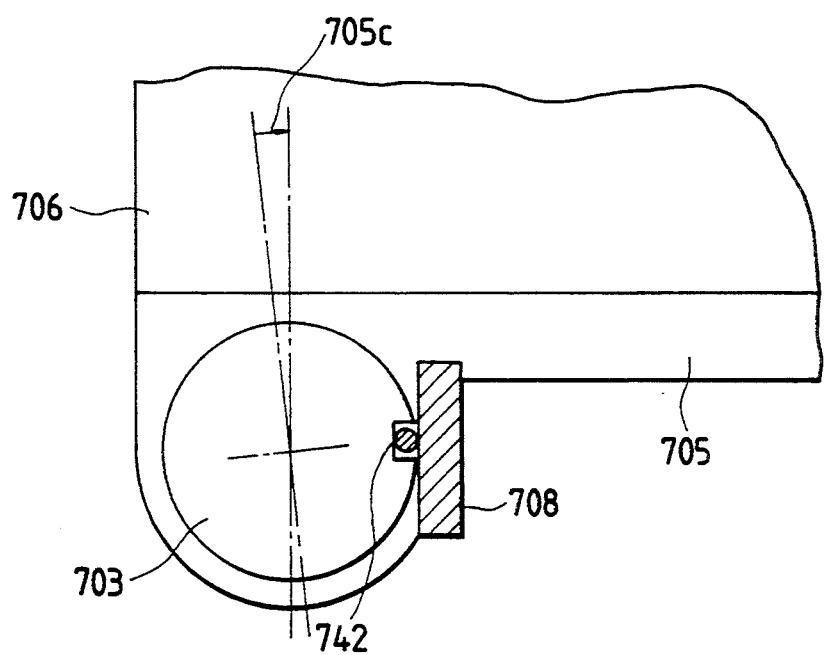
FIG. 59 is a view showing a fourth example of the apparatus shown in FIG. 55.

FIG. 59 shows a fourth example of the apparatus shown in FIG. 55. In the configuration shown in FIG. 54, the distance between the recording sheet 701 and the recording head 706 may vary, depending on the thickness of said recording sheet 701. In order to compensate for such variation in distance, there is known a recording apparatus in which the guide shaft 703 is moved in parallel manner in a direction 703a. Also known is a recording apparatus in which the support shaft 707 is eccentrically rotated in a direction 707a to shift the rear position of the carriage 705, thereby rotating the carriage 705 in a direction 705c about the guide shaft 703 as shown in FIG. 59 and varying the distance between the recording sheet 701 and the recording head 706. Also in such recording apparatus, the configurations of the first to third examples provide the same effects as those in said first example.

Figure 60:
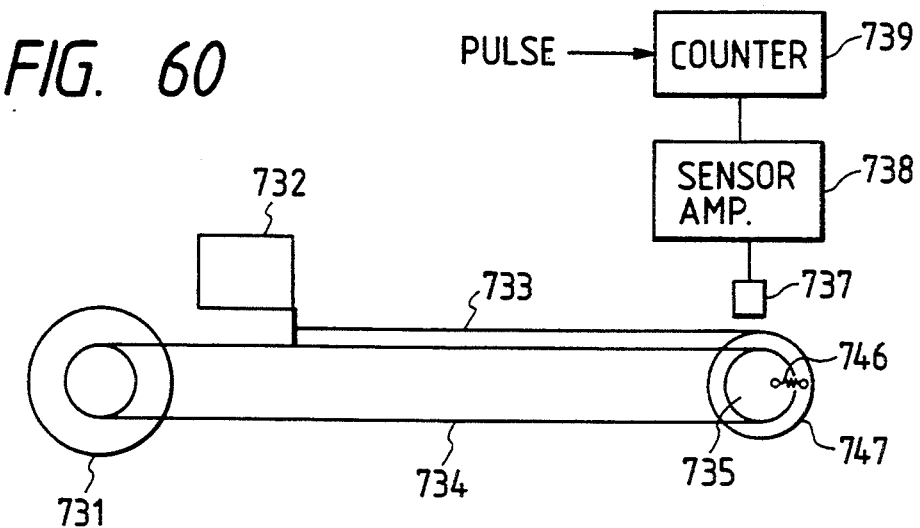
FIG. 60 is a view in which, in the recording apparatus shown in FIG. 54, the magnetic head is fixed on the recording apparatus and the scale is fixed on the carriage.

FIG. 60 shows another configuration in which the scale of the magnetic linear encoder is shaped as a wire, which is rendered movable with respect to a fixed sensor, thereby reducing the weight of the carriage. Referring to FIG. 60, a scale 733 is composed of a material containing a magnetic material, shaped as a wire and so magnetized that the N and S poles appear at regular intervals. An end of the scale 733 is fixed to a carriage 732, which is fixed to a carriage belt 734. Said belt 734 is supported between a driving motor 731 and a belt pulley 735, while the other end of the scale 733 is fixed on a pulley 747, which is rotatable on a shaft of the belt pulley 735. Said pulley 747 and the belt pulley 735 are elastically connected by a spring 746. As a result, the scale 733 is taken up, without slack, on the pulley 747, regardless of the movement of the carriage 732. A magnetic head 737 is fixed on the main frame of the recording apparatus, in such position that can read the information on the scale 733, without hindering the movement of the carriage 732. A sensor amplifier 738 and a counting circuit 739 are similar to those employed in the conventional recording apparatus.

The present example functions in the following manner. When the carriage 732 moves to the left or to the right, the scale 733 is respectively extracted from the pulley 747 or taken up thereon. The sensor 737 reads the magnetized information, in the course of movement of the scale 733. The read information is processed as in the prior art, for detecting the speed and position of the carriage 732.

In this embodiment the carriage can be made light in weight, because the sensor is detached from the carriage. Also since the electric circuits for the detected signal are eliminated from the carriage, there can be obtained effects of relaxing the limitation in the designing of the electric circuit, such as the requirement for reducing the magnitude thereof, facilitating the measurement of the function state of the circuit in the course of movement of the carriage, reducing the cost by the elimination of electrical connections between the circuits, and reducing the number of assembling steps.

Figure 61:
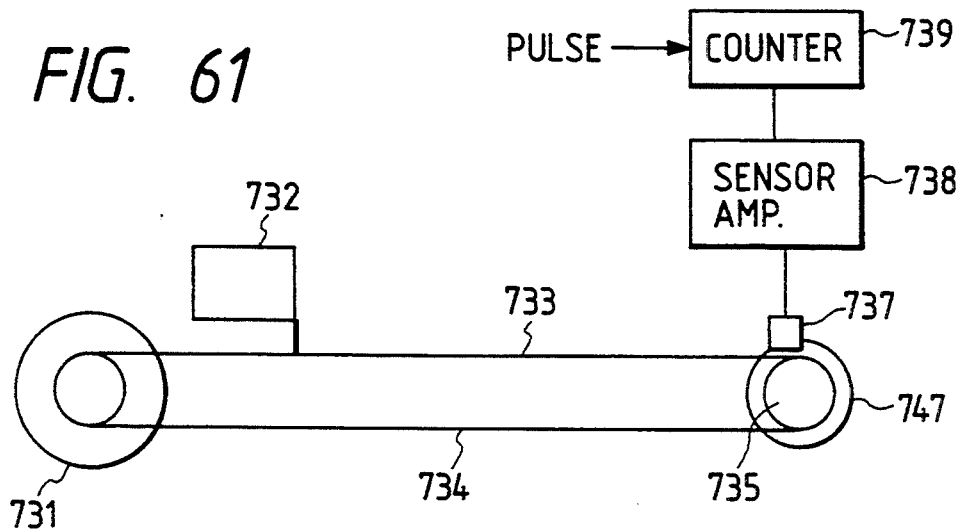
FIG. 61 is a view showing another example of the apparatus shown in FIG. 54.

FIG. 61 shows another example of the apparatus shown in FIG. 60, wherein the scale is shaped as a tape or a wire and is fixed by adhesion to the carriage driving belt, whereas the sensor or the magnetic head is fixed on the main frame of the recording apparatus.

A scale 733 is composed of a material containing a magnetic material, formed as a wire or a tape, and is so magnetized that the N and S poles appear at a regular interval. A carriage 732 is fixed on a carriage belt 734.

Figure 62:
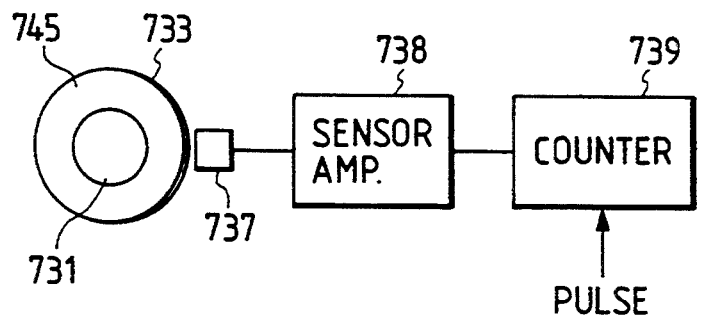
FIG. 62 is a view showing still another example of the apparatus shown in FIG. 54.

FIG. 62 shows still another example of the apparatus shown in FIG. 60. In this example the scale is shaped as a wire or a tape, which is adhered to the platen roller.

A scale 733 is composed of a material containing a magnetic material, is shaped as a wire or a tape, has a length surrounding the periphery of the platen roller 745 and is so magnetized that the N and S poles appear at a regular interval. The scale 733 is wound by one turn on the periphery of the platen roller 745 and fixed thereon. A sensor 737 is fixed on the main frame of the recording apparatus, in such a position as to read the information of the scale 733, without hindering the motion of the platen roller 745. A sensor amplifier 738 and a counting circuit 739 are similar to those employed in the conventional configuration.

The configuration of the present example functions in the following manner. As the platen roller 745 rotates, the sensor 737 reads the magnetized information, along the movement of the scale 733. The read information is processed as in the conventional system, thereby detecting the speed and position of the platen roller 745.

This example improves the precision of measurement of the length of recording sheet advanced by the platen roller. In the conventional art, the platen roller is driven by a stepping motor, and the length of advancement of the sheet is indirectly determined from the number of driving pulses for said stepping motor. This example enables more accurate measurement, since the scale is wound around the platen roller and is read by the sensor. Also the stepping motor for sheet advancement sometimes shows desynchronization, and an open loop control is insufficient for avoiding such phenomenon. This example enables a closed loop control because the information on rotation can be obtained from the platen roller which is the object of driving, so that said desynchronization can be relatively easily avoided.

Figure 63:
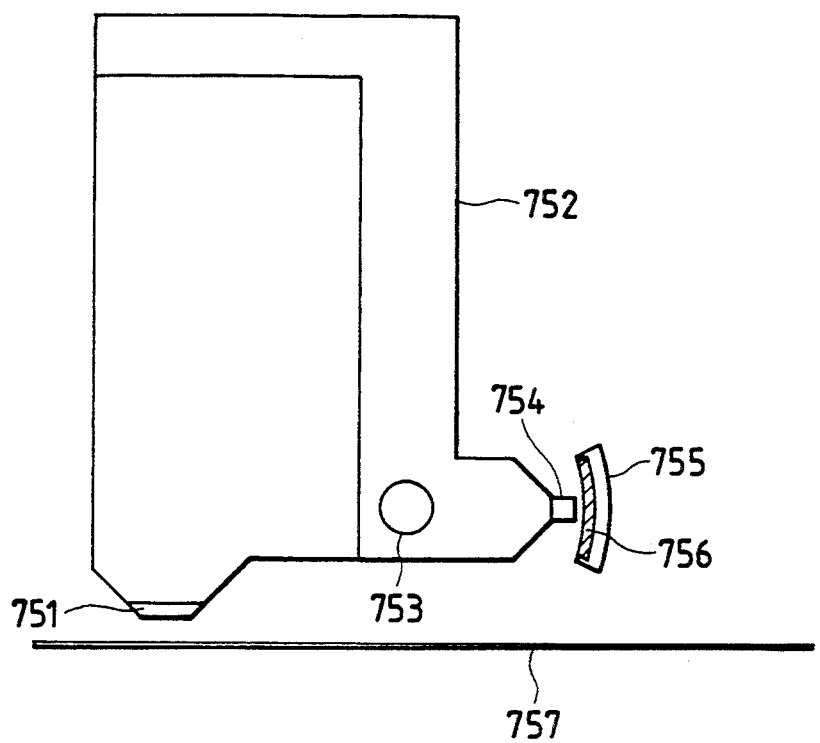
FIG. 63 is a view in which, in the recording apparatus shown in FIG. 54, the width of the magnetized portion of the magnetic linear encoder is made larger than that of the magnetic head.
Figure 64:
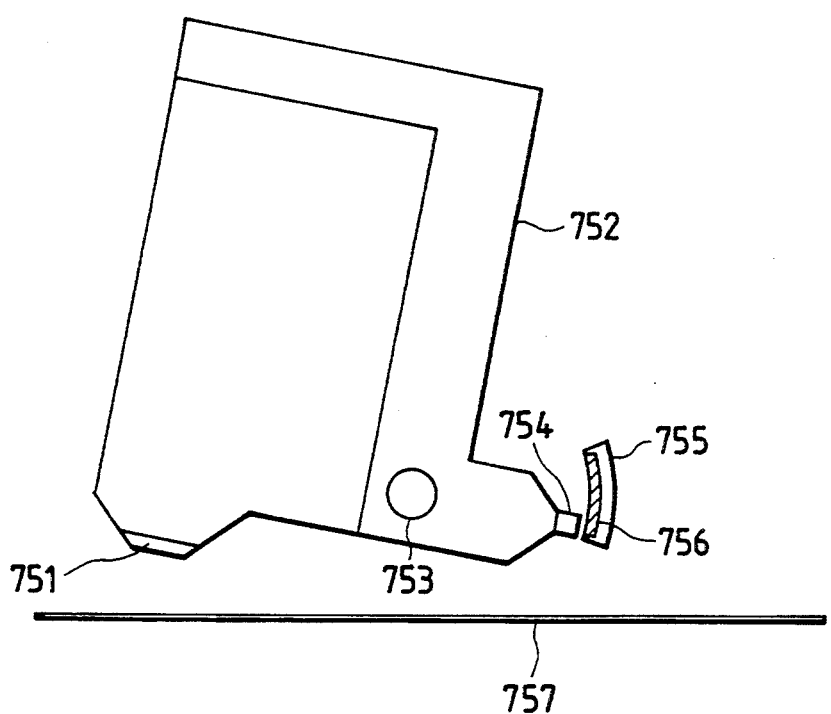
FIG. 64 is a view of a state in which the carriage shown in FIG. 63 is rotated to increase the gap between the printing head and the printing sheet.

FIGS. 63 and 64 show a configuration in which the width of the magnetized portion of the scale is made wider than that of the magnetic head, in order to avoid the deterioration of the level of the detected signal even when the magnetized portion of the scale and the MR device of the magnetic head are mutually aberrated.

In FIG. 63, the recording face of a recording head 751 is positioned parallel to the recording sheet 757, and said head 751 is mounted on a carriage 752, which is supported by a carriage shaft 753 and rendered movable therealong. A magnetic head 754 is mounted on the carriage 752. Consequently the recording head 751, the carriage 752 and the magnetic head 754 move integrally. A scale 755 of the magnetic linear encoder is positioned parallel to the carriage shaft 753, in such a manner that a magnetized portion 756 of said scale 755 opposes the magnetic head.

The distance between the recording face of the recording head 751 and the recording sheet 757 can be varied by a rotation of the carriage 752 about the carriage shaft 753. A clockwise rotation of the carriage 752 from the state shown in FIG. 63 widens the gap between the recording head 751 and the recording sheet 757, suitable for a thicker recording sheet (FIG. 64). Also an anticlockwise rotation reduces said gap, thus being suitable for a thinner recording sheet.

In the shift from the state shown in FIG. 63 to the state shown in FIG. 64, the magnetic head 754 is rotated by the rotation of the carriage 752, so that the relative positional relationship between the magnetic head 754 and the scale 755 of the magnetic linear encoder is displaced. In this example, however, since the width of the magnetized portion 756 of said scale 755 is made larger than the width of the magnetic head 754, the magnetic head 754 remains still opposed to said magnetized portion 756 even after such displacement, so that the detected signal level does not decrease. Also the decrease of the detected signal level can be avoided in the presence of production errors in the components, or errors or plays in the assembling thereof, for the same reason.

Figure 65:
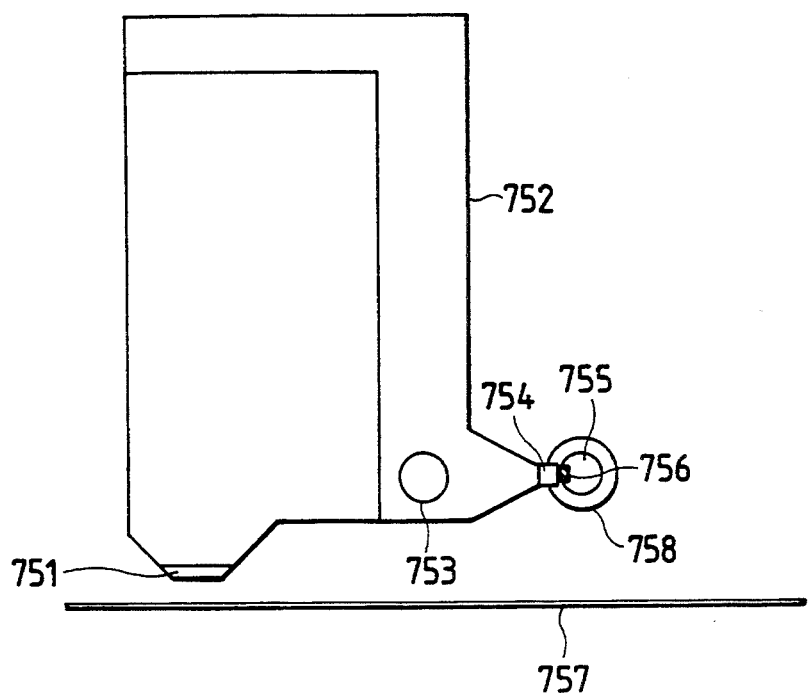
FIG. 65 is a view showing another example in which, in the recording apparatus shown in FIG. 54, the width of the magnetized portion of the magnetic linear encoder is made larger than that of the magnetic head.
Figure 66:
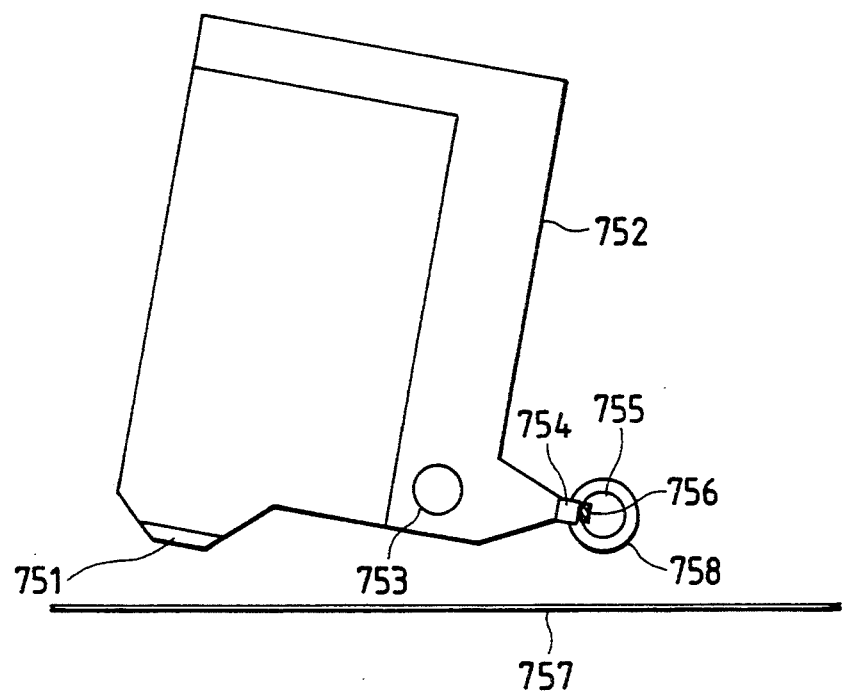
FIG. 66 is a view of a state in which the carriage shown in FIG. 65 is rotated to increase the gap between the printing head and the printing sheet.

FIGS. 65 and 66 illustrate another example of the apparatus shown in FIG. 63, wherein the recording face of a recording head 751 is positioned parallel to the recording sheet 757, and said recording head 751 is supported by a carriage 752, which is supported by a carriage shaft 753 and rendered movable therealong. A scale 755 of the magnetic linear encoder is positioned parallel to the carriage shaft 753. The scale 755 has a circular cross section and is fitted thereon with a support ring 758 for supporting the magnetic head 754. The magnetic head 754 is fixed to said support ring 758, and is fixed, at the other side, to the carriage 752.

When the carriage 752 is rotated clockwise about the carriage shaft 753, it is shifted from a state in FIG. 65 to a state shown in FIG. 66. In the latter state, the gap between the recording head 751 and the recording sheet 757 is widened, thus suitable for a thicker recording sheet. In this case, the magnetic head 754 fixed to the carriage 752 also rotates by the rotation of said carriage 752, but, because the magnetic head 754 and the scale 755 are integrated by the support ring 758, said magnetic head 754 and the scale 755 integrally move in the circumferential direction, about the carriage shaft 753. For this purpose, the mechanism supporting the ends of the scale 755 has to render said scale 755 movable in said circumferential direction. Also the magnetized portion 756 of the scale 755 has to follow the movement of the magnetic head 754, about the center of rotation of said scale, in the rotation of the carriage 752. There will therefore be required a complex mechanism, with inevitable errors or plays associated therewith.

For the purpose of simplifying the structure, the scale 755 of the linear encoder may be made flexible, and is fixed at the both ends thereof. In such case, with the rotation of the carriage 752, the magnetic head 754 fixed thereon also rotates, so that the relative positional relationship between the magnetic head 754 and the scale 755 is displaced. More specifically the magnetic head 754 is rotated about the center of the scale 755, anticlockwise in the circumferential direction of the scale 755, and is displaced from the magnetized portion 756 of the scale. However, according to the present invention, since the magnetized portion 756 of the scale 755 is made wider than the width of the magnetic head 754, it is still opposed to said magnetized portion 756 even after such displacement, so that the detected signal level is protected from decrease. Also the decrease of the detected signal level can be prevented even in the presence of production errors in the components or of errors or plays in the assembling thereof, for the same reason.

Figure 67:
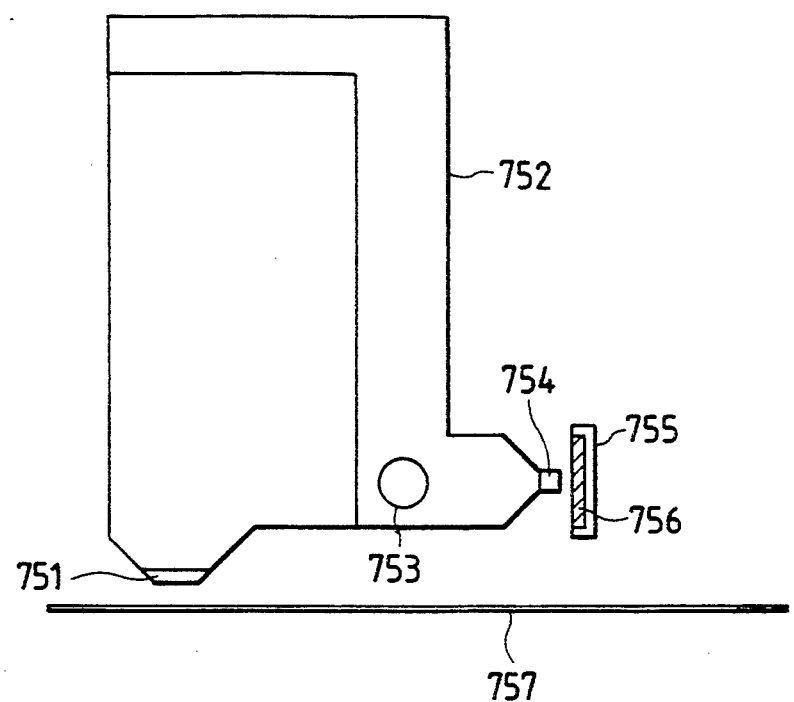
FIG. 67 is a view showing still another example in which, in the recording apparatus shown in FIG. 54, the width of the magnetized portion of the magnetic linear encoder is made larger than that of the magnetic head.
Figure 68:
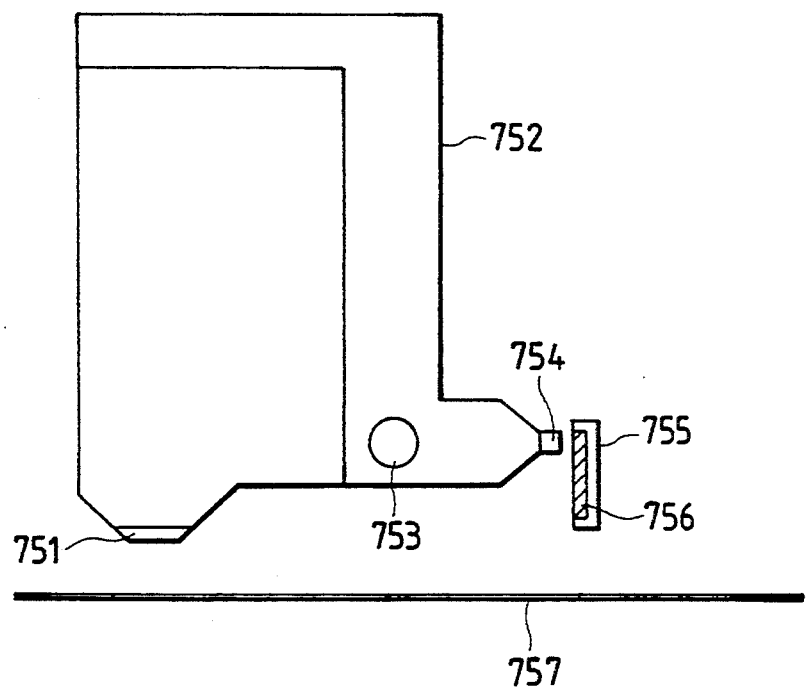
FIG. 68 is a view of a state in which the carriage shown in FIG. 67 is rotated to increase the gap between the printing head and the printing sheet.

FIGS. 67 and 68 show still another example of the apparatus shown in FIG. 63. In FIG. 67, the recording face of a recording head 751 is positioned parallel to the recording sheet 757, and said recording head 751 is mounted on a carriage 752, which is supported by a carriage shaft 753 and rendered movable therealong. A magnetic head 754 is fixed on the carriage 752. A scale 755 of the magnetic linear encoder is positioned parallel to the carriage shaft 753, in such a manner that a magnetized portion 756 of the scale 755 is opposed to the magnetic head 754. The carriage 752 can be vertically shifted together with the carriage shaft 753, whereby the distance between the recording face of the head 751 and the recording sheet 757 is varied.

The upward shift of the carriage 752 together with the carriage shaft 753 realizes a state shown in FIG. 68. In this state the distance between the recording head 751 and the recording sheet 757 is made wider, thus being suited for a thicker recording sheet. In this state the magnetic head 754 fixed to the carriage 752 also moves, so that the relative positional relationship between the magnetic head 754 and the scale 755 is displaced. However, since the magnetized portion 756 of said scale 755 is made wider than the width of the magnetic head 754, it still remains opposed to said magnetized portion 756 even after such displacement, whereby the decrease of the detected signal level can be prevented. Such decrease of the detected signal level can also be prevented, for the same reason, in the presence of production errors in the components or of errors or plays in the assembling thereof.

As explained in the foregoing, the fourth embodiment of the present invention is featured by a fact that the scale of the magnetic linear encoder is provided on a guide shaft for guiding the carriage and that a detection unit of said encoder is provided on the carriage. Thus the assembling of the linear encoder into the recording apparatus is made simpler, and there is not required an additional space for the installation of the scale, so that the recording apparatus can be made compact.

Also the precision of the gap between the detection unit and the scale of the magnetic linear encoder becomes easier to assure, whereby the detection accuracy of the linear encoder is improved and the recording of higher quality can be realized in the recording apparatus. Based on these factors, there can be obtained a more compact and less expensive recording apparatus capable of recording of higher quality.

Also according to the fourth embodiment, the scale of the magnetic linear encoder is provided along the spiral groove of the lead screw composed of a magnetic member. Thus there is not required a separate scale, so that the number of components can be decreased, and the recording apparatus can be made more compact. Also there is not required the positional adjustment between the magnetic head and the scale, and a reduction in cost can be attained.

Also by magnetizing the spiral groove of the lead screw or by fitting the scale into said spiral groove, it is rendered possible to protect the scale from the damage resulting from dusts, and to protect the memory effect of the scale. Also the precision of recording can be improved, since the carriage drive and the reading of the linear encoder can be achieved in integral manner.

Also according to said fourth embodiment of the present invention, the scale can be formed as a flexible wire or tape, whereby the sensor (magnetic head) need not be provided on the carriage. Furthermore the scale may be integrated with the carriage driving belt, or may be used for measuring the speed or position of the advancement of the recording sheet, by being wound on the platen roller, or for the closed loop control of the stepping motor therefor.

Furthermore, since the width of the magnetized portion of said scale is made larger than the width of the magnetic head, the deterioration of the detected signal level can be prevented even when the relative positional relationship between the magnetized portion of said scale and the magnetic head is aberrated.

What is claimed is:

1. A recording apparatus provided with a magnetic linear encoder, comprising:
    a carriage supporting a recording head and adapted to effect a reciprocating motion for a scanning recording operation;
    a scale of the magnetic linear encoder, positioned along the moving direction of said carriage, said scale being provided with at least two magnetized lines with mutually different pitches of magnetization;
    a magnetic head mounted on said carriage and adapted to read the magnetized lines of said scale, in the movement of said carriage, said magnetic head including at least two detection units for reading the at least two magnetized lines of said scale, said detection units being adapted to generate output signals corresponding to the different pitches of magnetization, said magnetic head constituting a magnetic linear encoder for position detection, in cooperation with said scale; and
    means for outputting a drive pulse for driving said recording head in accordance with the respective output signals from said detection units.

2. A recording apparatus according to claim 1, wherein said at least two magnetized lines of said scale are positioned in a mutually adjacent manner, and the detection units of said magnetic head are positioned also in a mutually adjacent manner.

3. A recording apparatus according to claim 1, wherein a density of magnetization of one of said at least two magnetized lines of said scale is a multiple of the magnetization density of the other line.

4. A recording apparatus according to claim 1, wherein at least one of said at least two magnetized lines in said scale contains a portion of a different pitch of magnetization within the line.

5. A recording apparatus according to claim 1, wherein at least one of said at least two magnetized lines in said scale contains an unmagnetized portion within the line.

6. A recording apparatus according to claim 1, wherein said scale is shaped as a flat plate, on which at least two magnetized lines are provided.

7. A recording apparatus according to claim 1, wherein said scale is shaped as a rod with a circular cross section, on which at least two magnetized lines are provided in a mutually adjacent manner.

8. A recording apparatus provided with a magnetic linear encoder, comprising:
    a carriage supporting a recording head and adapted to effect a reciprocating motion for scanning recording operation;
    a scale of the magnetic linear encoder, positioned along the moving direction of said carriage, said scale being shaped as a rod with a circular cross section, on which at least two magnetized lines are provided in a mutually adjacent manner, of which pitch magnetization is equal in said two lines but is mutually staggered in said two lines;
    a magnetic head mounted on said carriage and adapted to read the magnetized lines of said scale, in the movement of said carriage, said magnetic head includes at least two detection units for reading the at least two magnetized lines of said scale, said detection units being adapted to generate output signals corresponding to the different pitches of magnetization, said magnetic head constitutes a magnetic linear encoder for position detection, in cooperation with said scale, and a drive pulse for driving said recording head is obtained by combining the output signals from said detection units.

9. A recording apparatus provided with a magnetic linear encoder, comprising:

a carriage supporting a recording head and adapted to effect a reciprocating motion for scanning recording operation;

a scale of the magnetic linear encoder, positioned along the moving direction of said carriage, said scale including, in the longitudinal direction thereof, a first area in which position information relating to the recording operation is magnetized, and a second area in which specified information other than the position information is magnetized;

a magnetic head mounted on said carriage and adapted to read the magnetized information of said scale, in the movement of said carriage, said magnetic head constituting a magnetic linear encoder in cooperation with said scale;

signal generating means for generating a pulse signal in correspondence with magnetization of said scale; and discriminating means for discriminating the first area and the second area from a duration of the pulse signal from said signal generating means and generating a drive signal for driving said recording head by the pulse signal from said signal generating means when the first area is discriminated.

10. A recording apparatus according to claim 9, wherein the specified information in the second area of said scale is magnetized in a bar code format.

11. A recording apparatus according to claim 10, wherein the first area of said scale is magnetized with a same pitch, while the second area is magnetized in a bar code format with a wide width and a narrow width.

12. A recording apparatus according to claim 10, wherein said discriminating means comprises
a timer for measuring the duration of the pulse signal from said signal generation means to read a bar code of the second area by the timer.

13. A recording apparatus according to claim 9, wherein said scale further includes a third area between the first and second areas, and a fourth area positioned at an end of the second area, opposite to said third area.

14. A recording apparatus according to claim 9, wherein the first and second areas of said scale have mutually different pitches of magnetization.

15. A recording apparatus according to claim 9, wherein said discriminating means comprises
a timer for measuring the duration of the pulse signal from said signal generation means and discriminating the first area and the second area by the duration measured by the timer.

16. A recording apparatus according to claim 9, wherein the position information, not related to the recording operation, in said second area of said scale is information relating to a home position of said carriage.

17. A recording apparatus according to claim 9, wherein the recording head mounted on said carriage is an ink jet head, and the position information, not related to a recording operation, in said second area of said scale is position information of a recovery system for said ink jet head and capping position information.

18. A recording apparatus according to claim 9, wherein a part of the magnetized areas of said scale constitutes a stepped portion.

* * * * *

UNITED STATES PATENT AND TRADEMARK OFFICE
CERTIFICATE OF CORRECTION

PATENT NO. : 5,434,602
DATED : July 18, 1995
INVENTOR(S) : Yoshiaki KABURAGI, et al.

It is certified that error appears in the above-indentified patent and that said Letters Patent is hereby corrected as shown below:

AT [57] ABSTRACT:

Line 2, "or" should read --for--;
Line 4, "a" should read --the--.

COLUMN 6:

Line 8, "the;" should read --the--.

Signed and Sealed this

Nineteenth Day of December, 1995

Attest:

BRUCE LEHMAN

Attesting Officer

Commissioner of Patents and Trademarks